(12) United States Patent
Narukawa et al.

(10) Patent No.: US 8,036,520 B2
(45) Date of Patent: Oct. 11, 2011

(54) INFORMATION PROCESSING APPARATUS AND METHOD, AND PROGRAM

(75) Inventors: Yoshitaka Narukawa, Saitama (JP); Hidenori Yamaji, Tokyo (JP); Noriaki Nakagawa, Tokyo (JP); Michitomo Koda, Tokyo (JP); Kazumi Yoshimoto, Chiba (JP)

(73) Assignee: Sony Corporation (JP)

( * ) Notice: Subject to any disclaimer, the term of this patent is extended or adjusted under 35 U.S.C. 154(b) by 795 days.

(21) Appl. No.: 11/705,043

(22) Filed: Feb. 9, 2007

(65) Prior Publication Data

US 2007/0201363 A1    Aug. 30, 2007

(30) Foreign Application Priority Data

Feb. 13, 2006  (JP) .............................. P2006-034763

(51) Int. Cl.
   *G03B 17/00*    (2006.01)
(52) U.S. Cl. .......................................... 396/57; 370/230
(58) Field of Classification Search .............. 396/57, 396/242, 243, 300, 299, 56; 370/230
   See application file for complete search history.

(56) References Cited

U.S. PATENT DOCUMENTS

| | | | | |
|---|---|---|---|---|
| 6,188,431 B1* | 2/2001 | Oie | ............ | 348/211.5 |
| 7,411,607 B2* | 8/2008 | Kikugawa | ............ | 348/207.2 |
| 7,463,216 B2* | 12/2008 | Yamazaki et al. | ............ | 345/2.3 |
| 7,561,544 B2* | 7/2009 | Ganesh | ............ | 370/328 |
| 7,573,503 B2* | 8/2009 | Tanaka et al. | ............ | 348/211.3 |
| 2003/0210331 A1* | 11/2003 | Battles et al. | ............ | 348/211.2 |
| 2006/0098174 A1* | 5/2006 | Ohuchi | ............ | 353/122 |
| 2006/0268793 A1* | 11/2006 | Zanaty | ............ | 370/338 |
| 2006/0285153 A1* | 12/2006 | Park | ............ | 358/1.15 |
| 2007/0013781 A1* | 1/2007 | Kageyama et al. | ............ | 348/207.2 |
| 2007/0120955 A1* | 5/2007 | Shimosato | ............ | 348/14.01 |
| 2007/0139705 A1* | 6/2007 | Ogiwara et al. | ............ | 358/1.15 |
| 2007/0140191 A1* | 6/2007 | Kojima | ............ | 370/338 |
| 2007/0180071 A1* | 8/2007 | Koide | ............ | 709/220 |
| 2009/0128634 A1* | 5/2009 | Miura et al. | ............ | 348/207.1 |

FOREIGN PATENT DOCUMENTS

JP    2005-128869 A    5/2005

* cited by examiner

*Primary Examiner* — Clayton E LaBalle
*Assistant Examiner* — Linda B Smith
(74) *Attorney, Agent, or Firm* — Lerner, David, Littenberg, Krumholz & Mentlik, LLP

(57) ABSTRACT

Disclosed herein is an information processing apparatus configured to make a transition to one of a plurality of modes each defining processing to be executed and execute the one of a plurality of modes to which a transition has been made, which may include first selection means; second selection means; communication controlling means; determination means; and mode transition control means.

8 Claims, 33 Drawing Sheets

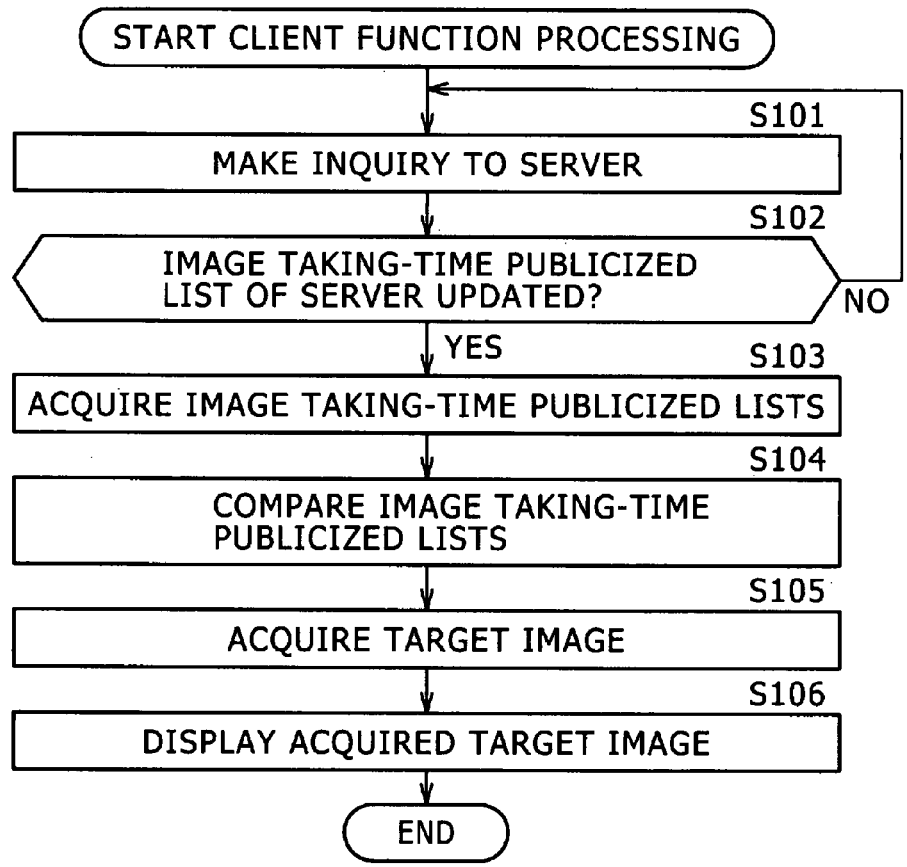

FIG. 32

| GROUP ID | GROUP NAME | CONTENTS ID | CONTENTS |
|---|---|---|---|
| 0001 | "XXXXXXXXX" | 00001 | image type "xxxxxxx"<br>thumbnailPath path="xxxxxx/xxxxxx/xxxxxx/xxxxxxxx"<br>originalPath path="xxxxxx/xxxxxx/xxxxxx/xxxxxxxx" |
| | | 00002 | image type "yyyyyyy"<br>thumbnailPath path="yyyyyy/yyyyyy/yyyyyy/yyyyyyyy"<br>originalPath path="yyyyyy/yyyyyy/yyyyyy/yyyyyyyy" |
| | | 00003 | image type "zzzzzzz"<br>thumbnailPath path="zzzzzz/zzzzzz/zzzzzz/zzzzzzzz"<br>originalPath path="zzzzzz/zzzzzz/zzzzzz/zzzzzzzz" |
| 0002 | "AAAAAAAA" | 00001 | image type "xxxxxxx"<br>thumbnailPath path="xxxxxx/xxxxxx/xxxxxx/xxxxxxxx"<br>originalPath path="xxxxxx/xxxxxx/xxxxxx/xxxxxxxx" |

FIG.37
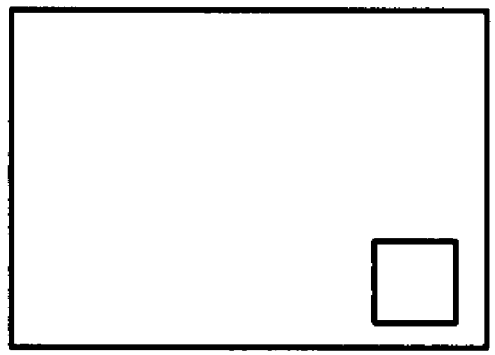
UNCHECKED
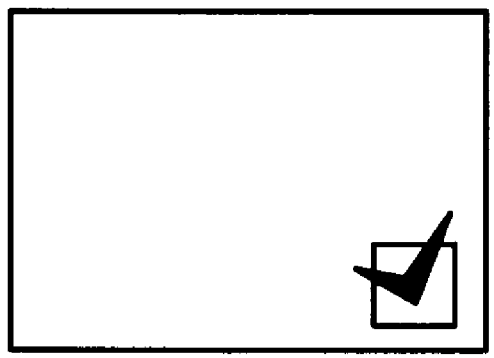
PUBLICIZE CHECKED
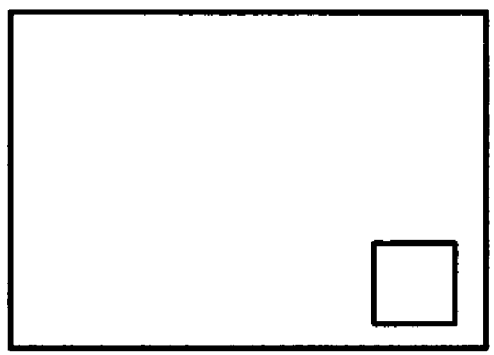
CHECK CANCELED

INFORMATION PROCESSING APPARATUS AND METHOD, AND PROGRAM

CROSS-REFERENCE TO RELATED APPLICATIONS

This application claims priority from Japanese Patent Application No. JP 2006-034763 filed in the Japanese Patent Office on Feb. 13, 2006, the entire content of which is incorporated herein by reference.

BACKGROUND OF THE INVENTION

1. Field of the Invention

The present invention relates to an information processing apparatus and method, and a program and, more particularly, to an information processing apparatus and method, and a program that execute the processing through networks.

2. Description of the Related Art

Wireless network connection modes are largely classified into an infrastructure mode in which communication is executed through an access point and an ad hoc mode in which communication is executed directly between nodes without use of any access point.

In connecting a digital camera to a network, the setting of network connection in the digital camera is executed by capturing necessary settings from a personal computer with which the digital camera is connected through USB (Universal Serial Bus) or on the setting screen of the digital camera itself. In related-art setting operations, the network setting means merely the storing of connection settings in a static manner (refer to Japanese Patent Laid-open No. 2005-128869, for example).

As described above, the network connection settings are only statically stored. Therefore, if one of image taking mode, photograph browse mode, and photograph print mode is selectable as a digital camera operating mode and different connection schemes are used for these modes for network connection, user has to set profiles for describing network connection settings before switching between these modes. Then, the user has to select the profile for the communication scheme suitable for a target mode from among the profiles set beforehand or redo the setting of network connection every time the mode switching takes place, thereby making the digital camera execute network connection processing.

The above-mentioned manual setting of network connection for every mode by the user may cause troubles that network connection cannot be made and the use of network is disabled by executing the connection setting mismatching a mode although it looks as if network connection were made. Especially, in the latter case, network connection looks as if completed, so that it is difficult for the user not familiar with the knowledge about networking to cope with this trouble.

SUMMARY OF THE INVENTION

Therefore, it is desirable to provide the information processing apparatus and method, and program for enabling the processing to be executed through a network by easily and surely connecting a digital camera for example to the network.

In carrying out the present invention and according to one aspect thereof, there is provided an information processing apparatus which may be configured to make a transition to one of a plurality of modes each defining processing to be executed and execute the one of a plurality of modes to which a transition has been made. This information processing apparatus may have first selection means for selecting, on the basis of a predetermined correlation between a single processing mode configured not to communicate with a mate of communication via a network, of the plurality of modes, and a communication scheme of the network, the communication scheme of the network related with a current mode that is the single processing mode; second selection means for selecting, on the basis of a predetermined correlation between the single processing mode of the plurality of modes and a network processing mode that is a mode configured to communicate with a mate of communication via the network of the plurality of modes, the network processing mode related with a current mode that is the single processing mode; communication controlling means for controlling communication so as to start communication with a mate of communication via the network by the selected communication scheme of the network; determination means for determining whether a mode to which a mate of communication makes a transition is a mode that is in concert with the selected network processing mode; and mode transition control means for controlling, if the mode to which the mate of communication makes a transition is found to be a mode that is in concert with the selected network processing mode, a mode transition such that a transition is made to the selected network processing mode.

The above-mentioned information processing apparatus may further have image taking means for taking an image of a subject, wherein the second selection means selects, on the basis of a correlation between an image taking mode configured to take an image of the subject that is the single processing mode and an image taking-time photo exchange mode that is the network processing mode in which an image of the subject is taken and the taken image is transmitted to a mate of communication via the network, the image taking-time photo exchange mode related with the image taking mode that is a current mode.

The above-mentioned information processing apparatus may still further have display means, wherein the second selection means selects, on the basis of a browse mode configured to display the taken image that is the single processing mode and a browse-time photo exchange mode that is the network processing mode in which the taken image is displayed and transmitted to a mate of communication via the network, the browse-time photo exchange mode related with the browse mode that is a current mode.

In the above-mentioned information processing apparatus, the second selection means may select, on the basis of a correlation between a print mode that is the single processing mode in which an image is printed and a network print mode that is the network processing mode in which a mate of communication is made print an image via the network, the network print mode related with the print mode that is a current mode.

In the above-mentioned information processing apparatus, the first selection means may select, on the basis of a predetermined correlation between the single processing mode and the network communication scheme that one of an ad hoc scheme and an infrastructure scheme, the communication scheme of the network based on one of the ad hoc scheme and the infrastructure scheme.

In carrying out the present invention and according to another aspect thereof, there is provided an information processing method which may be configured to make a transition to one of a plurality of modes each defining processing to be executed and execute the one of a plurality of modes to which a transition has been made. This information processing method may include selecting, on the basis of a predetermined correlation between a single processing mode configured not to communicate with a mate of communication via a network, of the plurality of modes, and a communication scheme of the network, the communication scheme of the network related with a current mode that is the single processing mode; selecting, on the basis of a predetermined correlation between the single processing mode of the plurality of modes and a network processing mode that is a mode configured to communicate with a mate of communication via the network of the plurality of modes, the network processing mode related with a current mode that is the single processing mode; controlling communication so as to start communication with a mate of communication via the network by the selected communication scheme of the network; determining whether a mode to which a mate of communication makes a transition is a mode that is in concert with the selected network processing mode; and controlling, if the mode to which the mate of communication makes a transition is found to be a mode that is in concert with the selected network processing mode, a mode transition such that a transition is made to the selected network processing mode.

In carrying out the present invention and according to still another aspect thereof, there is provided a program for causing a computer to make a transition to one of a plurality of modes each defining processing to be executed and execute the one of a plurality of modes to which a transition has been made. This program may include selecting, on the basis of a predetermined correlation between a single processing mode configured not to communicate with a mate of communication via a network, of the plurality of modes, and a communication scheme of the network, the communication scheme of the network related with a current mode that is the single processing mode; selecting, on the basis of a predetermined correlation between the single processing mode of the plurality of modes and a network processing mode that is a mode configured to communicate with a mate of communication via the network of the plurality of modes, the network processing mode related with a current mode that is the single processing mode; controlling communication so as to start communication with a mate of communication via the network by the selected communication scheme of the network; determining whether a mode to which a mate of communication makes a transition is a mode that is in concert with the selected network processing mode; and controlling, if the mode to which the mate of communication makes a transition is found to be a mode that is in concert with the selected network processing mode, a mode transition such that a transition is made to the selected network processing mode.

As described above, of the above-mentioned plurality of modes, the communication scheme of the network related with a current mode that is the single processing mode can be selected on the basis of a predetermined correlation between a single processing mode for not communicating with a mate of communication via a network, of the plurality of modes and a communication scheme of the network. Then the network processing mode related with a current mode that is the single processing mode can be selected on the basis of a predetermined correlation between the single processing mode and a network processing mode that is a mode for communicating with a mate of communication via the network of the plurality of modes. Thereby communication can be controlled so as to start communication with a mate of communication via the network on the basis of the selected communication scheme of the network. Then it can be determined whether a mode to which a mate of communication makes a transition is a mode that is in concert with the selected network processing mode, and, if the mode to which the mate of communication makes a transition is found to be a mode that is in concert with the selected network processing mode, a mode transition can be controlled such that a transition is made to the selected network processing mode.

A network herein may denote a mechanism in which at least two devices are interconnected to communicate information from one device to another. Each device that executes communication with another device may be either a standalone device or an internal component block of one device.

The communication used herein may be wireless communication or wired communication of a combination of both in which one section is based on wireless communication while another section is based on wired communication, for example. In addition, the communication used herein may be that communication from one device to another is based on wired communication and the communication of the opposite direction is based on wireless communication, for example.

As described above and according to one aspect of the present invention, network connection is provided.

As described above and according to another aspect of the present invention, connection to a network can be easily and surely made to execute processing.

As described above and according to another aspect thereof, processing can be executed by easy and sure network connection.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 17 is a flowchart indicative of processing for a client function in the image taking-time photo exchange mode;

FIG. 18 is a diagram illustrating an exemplary image taking-time publicized list;

FIG. 32 is a diagram illustrating an exemplary browse-time publicized list;

FIG. 37 is a diagram illustrating the checking of check boxes of thumbnail images in the image publicize mode;

DETAILED DESCRIPTION

Figure 1:
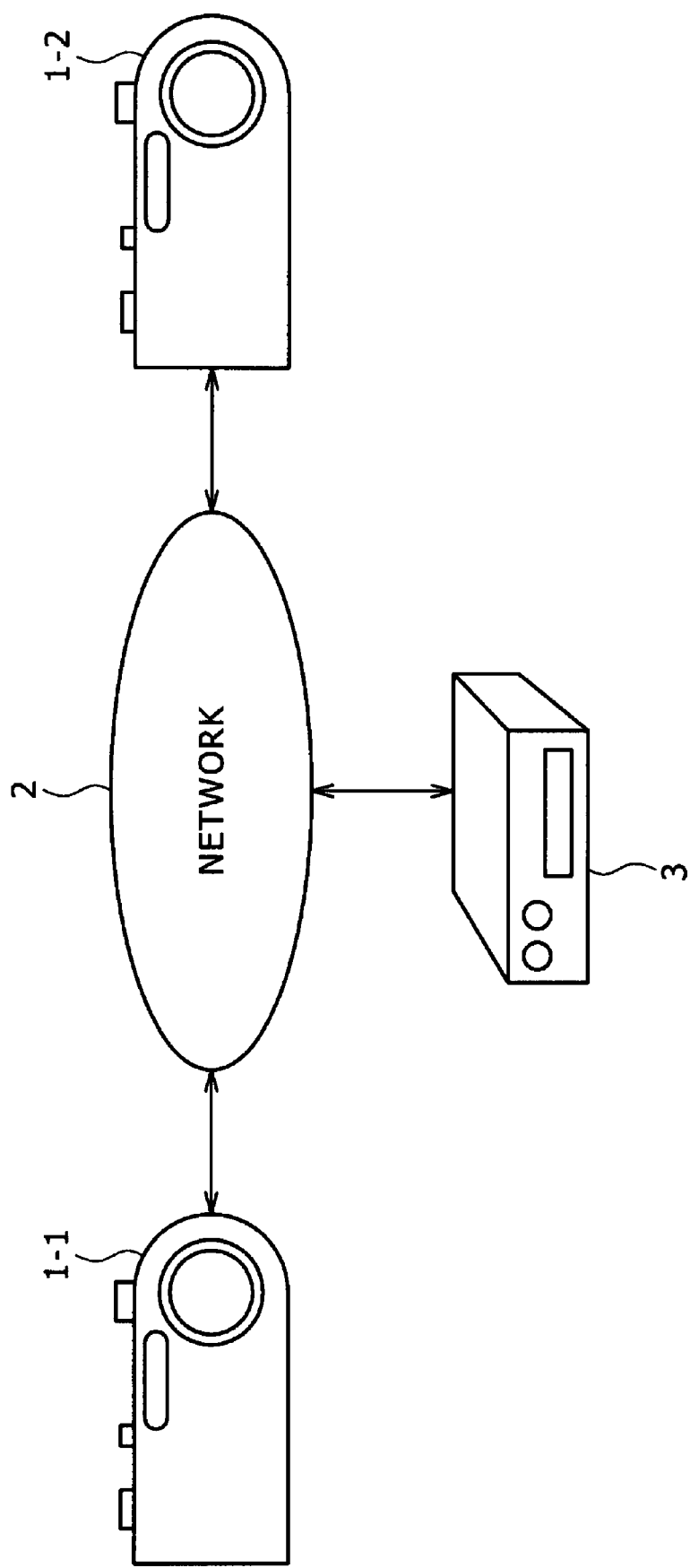
FIG. 1 is a schematic diagram illustrating an exemplary configuration of a communication system according to an embodiment of the present invention.

This invention will be described in further detail by way of examples with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

The information processing apparatus according to one aspect of the invention is an information processing apparatus (for example, a digital camera 1-1 shown in FIG. 1) configured to make a transition to one of a plurality of modes each defining processing to be executed and execute the one of a plurality of modes to which a transition has been made. This information processing apparatus has first selection means (for example, a connection scheme selection section 141 shown in FIG. 6) for selecting, on the basis of a predetermined correlation (for example, a correlation described in a mode management table 144 shown in FIG. 6) between a single processing mode configured not to communicate with a mate of communication (for example, a digital camera 1-2 shown in FIG. 1) via a network, of the plurality of modes, and a communication scheme of the network, the communication scheme of the network related with a current mode that is the single processing mode; second selection means (for example, a transition target mode selection section 142 shown in FIG. 6) for selecting, on the basis of a predetermined correlation between the single processing mode of the plurality of modes and a network processing mode that is a mode configured to communicate with a mate of communication via the network of the plurality of modes, the network processing mode related with a current mode that is the single processing mode; communication controlling means (for example, a communication driver 103 shown in FIG. 5) for controlling communication so as to start communication with a mate of communication via the network by the selected communication scheme of the network; determination means (for example, a mate mode determination section 143 shown in FIG. 6) for determining whether a mode to which a mate of communication makes a transition is a mode that is in concert with the selected network processing mode; and mode transition control means (for example, a mode transition control section 145 shown in FIG. 6) for controlling, if the mode to which the mate of communication makes a transition is found to be a mode that is in concert with the selected network processing mode, a mode transition such that a transition is made to the selected network processing mode.

The above-mentioned information processing apparatus further has image taking means (for example, a camera section 41 shown in FIG. 4) for taking an image of a subject, wherein the second selection means selects, on the basis of a correlation between an image taking mode configured to take an image of the subject that is the single processing mode and an image taking-time photo exchange mode that is the network processing mode in which an image of the subject is taken and the taken image is transmitted to a mate of communication via the network, the image taking-time photo exchange mode related with the image taking mode that is a current mode.

The above-mentioned information processing apparatus still further has display means (for example, an LCD 20 shown in FIG. 4), wherein the second selection means selects, on the basis of a browse mode configured to display the taken image that is the single processing mode and a browse-time photo exchange mode that is the network processing mode in which the taken image is displayed and transmitted to a mate of communication via the network, the browse-time photo exchange mode related with the browse mode that is a current mode.

Figure 6:
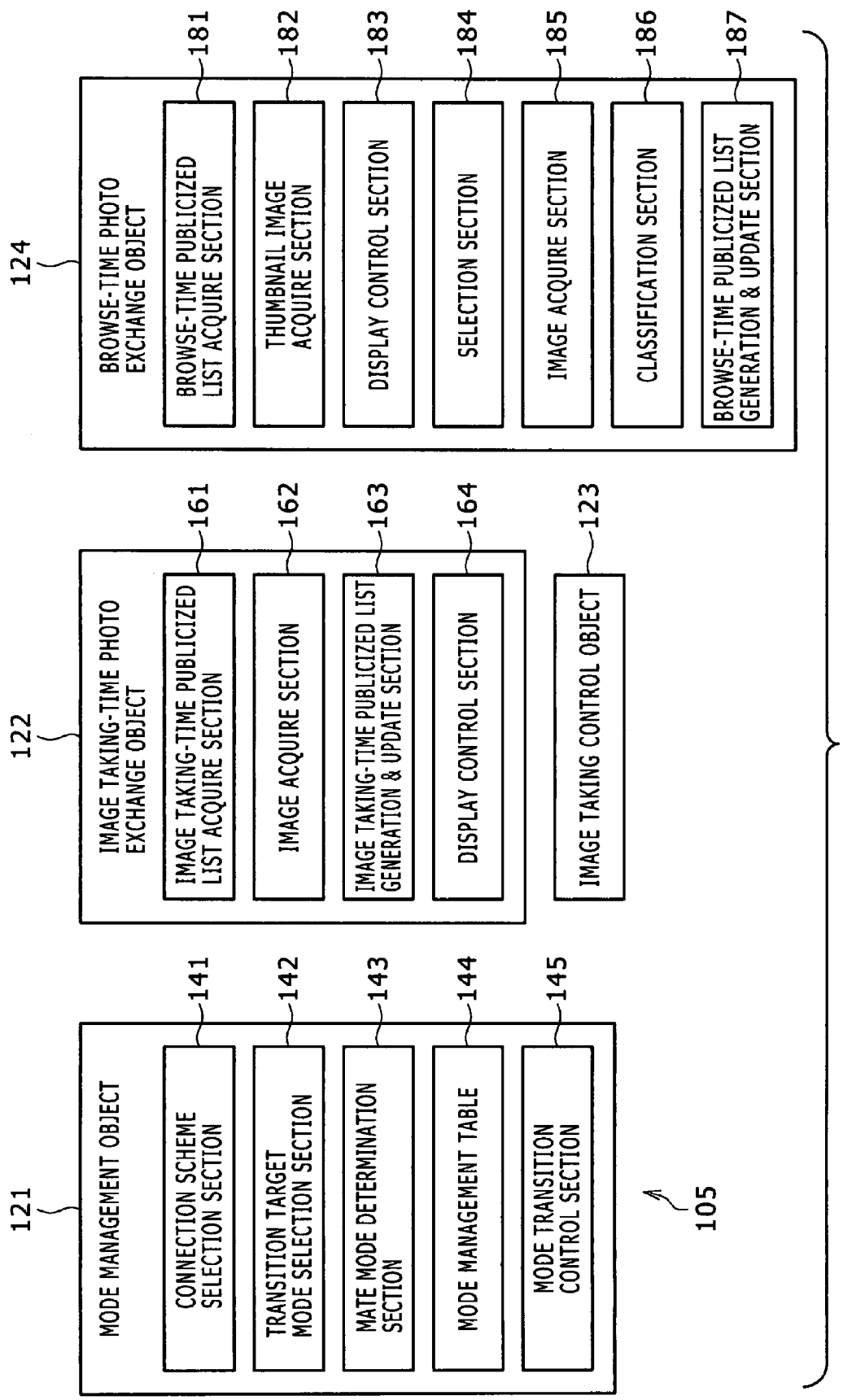
FIG. 6 is a block diagram illustrating an exemplary configuration of application programs.

The information processing method or program according to another aspect of the invention has steps of selecting (for example step S13 shown in FIG. 11), on the basis of a predetermined correlation (for example, a correlation described in the mode management table 144 shown in FIG. 6) between a single processing mode configured not to communicate with a mate of communication (for example, the digital camera 1-2 shown in FIG. 1) via a network, of the plurality of modes, and a communication scheme of the network, the communication scheme of the network related with a current mode that is the single processing mode; selecting (for example step S16 shown in FIG. 11), on the basis of a predetermined correlation (the correlation described in the mode management table 144 shown in FIG. 6) between the single processing mode of the plurality of modes and a network processing mode that is a mode configured to communicate with a mate of communication via the network of the plurality of modes, the network processing mode related with a current mode that is the single processing mode; controlling (for example, step S14 shown in FIG. 11) communication so as to start communication with a mate of communication via the network by the selected communication scheme of the network; determining (for example, step S18 shown in FIG. 11) whether a mode to which a mate of communication makes a transition is a mode that is in concert with the selected network processing mode; and controlling (for example, step S19 shown in FIG. 11), if the mode to which the mate of communication makes a transition is found to be a mode that is in concert with the selected network processing mode, a mode transition such that a transition is made to the selected network processing mode.

Now, referring to FIG. 1, there is shown an exemplary configuration of a communication system according to an embodiment of the present invention. This communication system has a digital camera 1-1, another digital camera 1-2, a network 2, and a printer 3.

The digital camera 1-1 takes a picture of a subject. The digital camera 1-1 supplies an image (or image data) acquired as a result of the image taking of the subject to the digital camera 1-2 via the network 2. In addition, the digital camera 1-1 supplies an image (or image data) stored in itself to the digital camera 1-2 via the network 2.

The digital camera 1-2 takes a picture of a subject. The digital camera 1-2 supplies an image (or image data) acquired as a result of the image taking of the subject to the digital camera 1-1 via the network 2. In addition, the digital camera 1-2 supplies an image (or image data) stored in itself to the digital camera 1-1 via the network 2.

It should be noted that both the digital cameras 1-1 and 1-2 take still images or moving images.

The network 2 is a wired network compliant with the USB (Universal Serial Bus) standard or the IEEE (Institute of Electrical and Electronic Engineers) 1394 standard for example or a wireless network compliant with the IEEE802.11a, IEEE802.11b, or IEEE802.11g standard, or the Bluetooth standard for example. The network 2 provides connection between the digital camera 1-1, the digital camera 1-2, and the printer 3. For example, the digital camera 1-1, the digital camera 1-2, and the printer 3 are interconnected by a protocol defined by DLNA (Digital Living Network Alliance).

The printer 3 prints images supplied from the digital camera 1-1 or the digital camera 1-2 via the network 2.

Hereafter, the digital camera 1-1 and the digital camera 1-2 will be generically referred to as a digital camera 1 unless otherwise specified.

Figure 2:
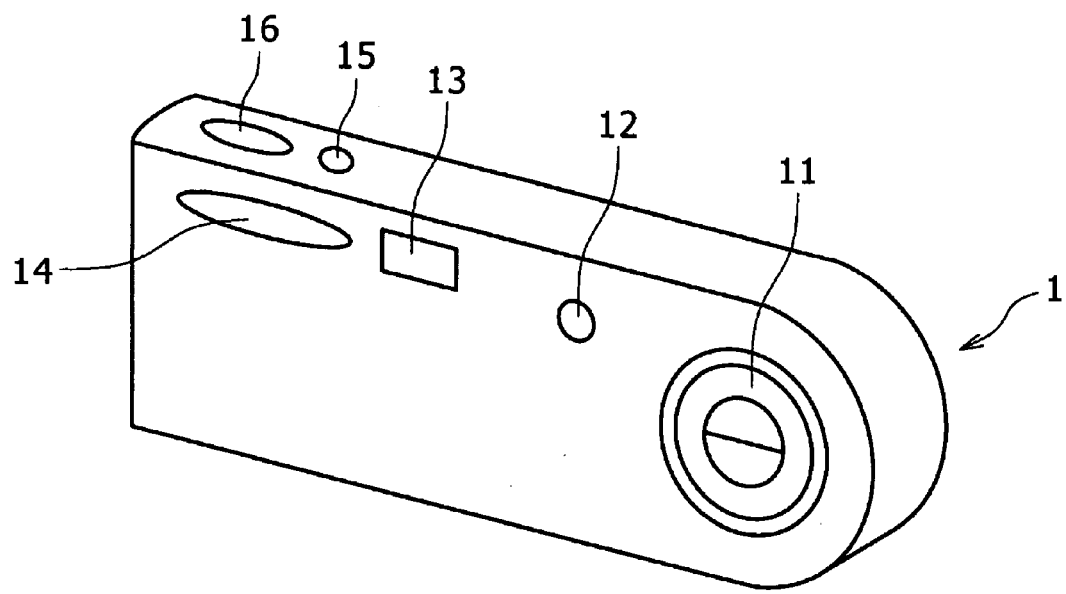
FIG. 2 is a perspective view illustrating an external front view of a digital camera.
Figure 3:
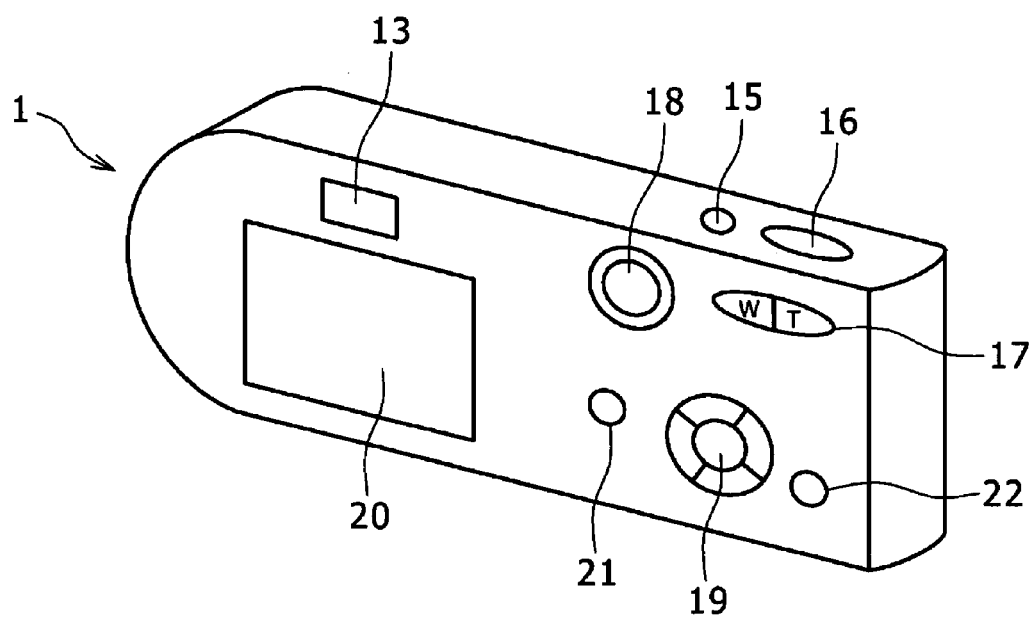
FIG. 3 is a perspective view illustrating another external rear view of the digital camera.

Referring to FIGS. 2 and 3, there are shown exemplary external perspective views of the digital camera 1.

It should be noted that FIG. 2 shows the front side of the digital camera 1 (namely, the lens thereof directed to a subject) and FIG. 3 shows the rear side (namely, the panel side of the digital camera 1 directed to the user or operator).

To the right side of the digital camera 1 as viewed from the front (FIG. 2), a lens section 11 is arranged. The lens section 11 has an optical system includes a condenser lens for collecting a ray of light coming from a subject, a focus lens for adjusting the focus of the ray of light, a diaphragm, and others (these components not shown). When the digital camera 1 is powered on, the lens section 11 is exposed or protruded from the case of the digital camera 1; when the digital camera 1 is powered off, the lens section 11 is housed in the case of the digital camera 1. FIG. 2 shows a state in which the lens section 11 is housed in the case of the digital camera 1.

At an upper right of a center position of the digital camera 1 as viewed from the front, an AF (Auto Focus) assist beam illuminator 12 is arranged. The AF assist beam illuminator 12 emits an AF assist beam along the optical axis of the optical system of the lens section 11 to a subject where there is not enough light for working a so-called auto focus function.

At an upper left of a center position of the digital camera 1 as viewed from the front, a viewfinder 13 is arranged, which goes through the case of the digital camera 1 to the rear thereof. To the left of the viewfinder 13, a flash light 14 is arranged. The flash light 14 flashes automatically or manually.

On top of the digital camera 1, a power button 15 for powering on/off the digital camera 1 is arranged at a left position as viewed from the front and a shutter button (or release button) 16 for taking an image of a subject (namely, recording an image of the subject taken) at the left end position.

On the rear side of the digital camera 1 (FIG. 3), a zoom button 17 for adjusting zooming is arranged at an upper right position. To the left of and below the zoom button 17, a mode dial 18 and a manual operation button 19 are arranged, respectively. The mode dial 18 is operated to choose an image taking mode for taking a picture of a subject, a browse mode for displaying taken images on an LCD (Liquid Crystal Display) 20, or a print mode for printing images, for example. The manual operation button 19, includes direction buttons and an enter button for example, is operated to move a cursor to a desired item on a menu screen displayed on the LCD 20 or enter the selection, for example.

The LCD 20 displays various images.

A network button 21 is pressed when connecting the digital camera 1 to the network 2. An option button 22 is pressed when displaying an option menu screen on the LCD 20.

Figure 4:
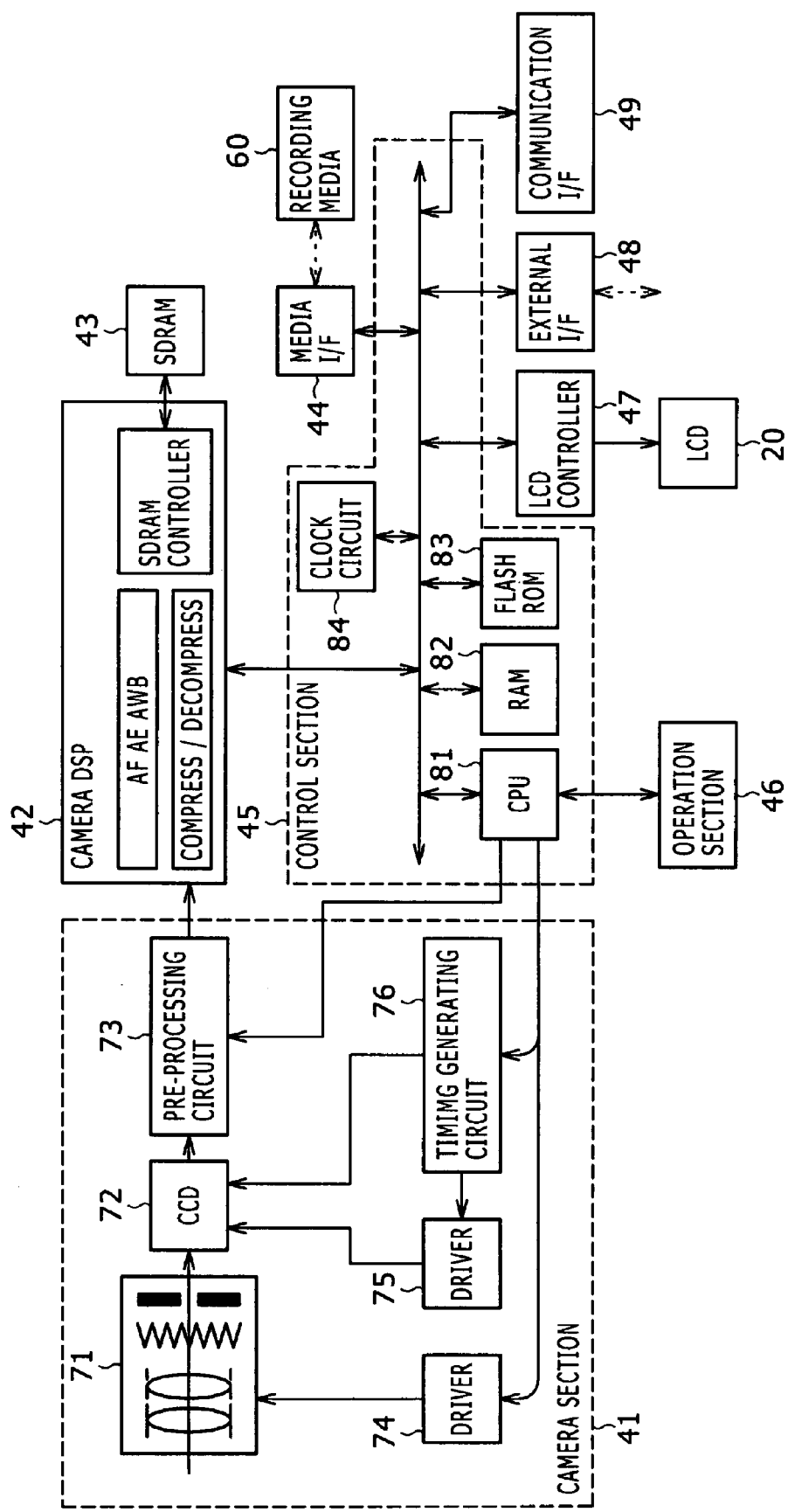
FIG. 4 is a block diagram illustrating an exemplary configuration of the digital camera.

Referring to FIG. 4, there is shown a block diagram of an exemplary configuration of the digital camera 1. The digital camera 1 according to an embodiment of the present invention is largely divided into a camera section 41, a camera DSP (Digital Signal Processor) 42, an SDRAM (Synchronous Dynamic Random Access Memory) 43, a media interface (hereafter referred to as a media I/F) 44, a control section 45, an operation section 46, an LCD controller 47, the LCD 20, an external interface (hereafter referred to as an external I/F) 48, and a communication interface (thereafter referred to as a communication I/F) 49 as shown in FIG. 4. The digital camera 1 is adapted to detachably load a recording media 60.

It is possible for the recording media 60 may be a memory card based on a semiconductor memory, an optical recording media such as a recordable DVD (Digital Versatile Disc) or a recordable CD (Compact Disc), or a magnetic disc, for example. In the present embodiment, it is assumed that a memory card based on a semiconductor memory or a hard disk drive may be used for the recording media 60.

The camera section 41 includes an optical block 71, a CCD (Charge Coupled Device) 72, a preprocessing circuit 73, an optical block driver 74, a CCD driver 75, and a timing generating circuit 76 as shown in FIG. 4. The optical block 71 includes a lens, a focus mechanism, a shutter mechanism, an iris mechanism, for example. The optical block 71 includes the lens section 11.

The control section 45 includes a CPU (Central Processing Unit) 81, a RAM (Random Access Memory) 82, a flash ROM (Read Only Memory) 83, and a clock circuit 84 that are interconnected by a system bus 85. The control section 45 may be a general-purpose built-in-type microcomputer or dedicated system LSI (Large Scale Integrated) circuit, for example. The control section 45 can control the other components of the digital camera 1.

The RAM 82 is used mainly as a work area in which intermediate results of processing are temporarily stored. The flash ROM 83 stores various programs to be executed by the CPU 81 and data necessary for the execution. The clock circuit 84 provides a current year, month, and day, the current day of the week, and the current time and the date of image taking.

In taking an image, the optical block driver 74 forms, under the control of the control section 45, a drive signal for driving the optical block 71 and supplies the formed drive signal to the optical block 71 to make the optical block 71 operate. In accordance with the drive signal supplied from the optical block driver 74, the focus mechanism, the shutter mechanism, and the iris mechanism of the optical block 71 are controlled. The optical block 71 captures an optical image of a subject to form the captured image onto the CCD 72.

The CCD 72 photoelectrically converts the optical image supplied from the optical block 71 into an electrical signal and outputs this electrical signal. Namely, the CCD 72 operates in accordance with the drive signal supplied from the CCD driver 75, captures an optical image of a subject from the optical block 71, converts the captured image (or image information) of the subject into an electrical signal on the basis of a timing signal supplied from the timing generating circuit 76 controlled by the control section 45, and supplies the electrical signal to the preprocessing circuit 73.

It should be note that, instead of the CCD 72, a photoelectric conversion device, such as a CMOS (Complementary Metal-Oxide Semiconductor) sensor, may be used.

As described above, the timing generating circuit 76 forms a timing signal for providing predetermined timing under the control of the control section 45. The CCD driver 75 forms a drive signal to be supplied to the CCD 72 on the basis of the timing signal supplied from the timing generating circuit 76.

The preprocessing circuit 73 executes CDS (Correlated Double Sampling) processing on the image information carried by the electrical signal supplied from the CCD 72 to keep an S/N ratio in a good condition, AGC (Automatic Gain Control) processing to control gain, and A/D (Analog/Digital) conversion, thereby forming image data that is a digital signal.

The digital signal image data acquired in the preprocessing circuit 73 is supplied to the camera DSP 42. The camera DSP 42 executes camera signal processing, such as AF (Auto Focus), AE (Auto Exposure), and AWB (Auto White Balance), for example, on the supplied image data. The image data thus signal-processed is then encoded by a predetermined encoding algorithm, such as JPEG (Joint Photographic Experts Group) or JPEG 2000, for example. The encoded image data is then supplied to the recording media 60 loaded on the digital camera 1 of this embodiment via the system bus 85 and the media I/F 44, being recorded to the recording media 60 as a file, which will be described later. It is also practicable to encode an image data group by an encoding algorithm for moving images, such as MPEG (Motion Picture Experts Group) for example, thereby recording a resultant moving image file to the recording media 60.

The image data recorded to the recording media 60 is read from the recording media 60 via the media I/F 44 in accordance with commands entered by the user through the operation section 46 made up of a touch panel and control keys, for example, the read image data being supplied to the camera DSP 42. The operation section 46 includes the zoom button 17, the mode dial 18, the manual operation button 19, the network button 21, and the option button 22 as described above.

The camera DSP 42 decodes the encoded image data read from the recording media 60 and supplied through the media I/F 44 and supplies the decoded imaged data to the LCD controller 47 via the system bus 85. The LCD controller 47 forms an image signal from the supplied image data and supplies the formed image signal to the LCD 20. Consequently, the image in accordance with the image data recorded to the recording media 60 is displayed on a display screen on the LCD 20.

The digital camera 1 of this embodiment also has the external I/F 48. Through this external I/F 48, the digital camera 1 is connected to an external personal computer, for example. The digital camera 1 can receive image data from the connected personal computer to record the received image data to the recording media 60 loaded on the digital camera 1 and supply image data from the recording media 60 to the personal computer, for example.

The communication I/F 49, made up of a so-called network interface card (NIC), for example, allows the digital camera 1 to be connected to the network 2 to acquire image data and other data through the network 2.

The information including the image data acquired from external personal computers and through networks and recorded to recording media can be read and reproduced by the digital camera 1 according to the present embodiment to be displayed on the LCD 20 for use by the user.

It should be noted that the communication I/F 49 may be arranged as a wired interface compliant with the IEEE1394 standard or the USB standard or as a wireless interface compliant with the IEEE802.11a, IEEE802.11b, IEEE802.11g, or Bluetooth standard, for example. Namely, the communication I/F 49 may be either a wired interface or a wireless interface.

The following describes will be made on the supposition that the communication I/F 49 be based on the IEEE802.11a, IEEE802.11b, or IEEE802.11g standard, that is, the communication I/F 49 be a so-called wireless LAN (Local Area Network) interface.

Figure 5:
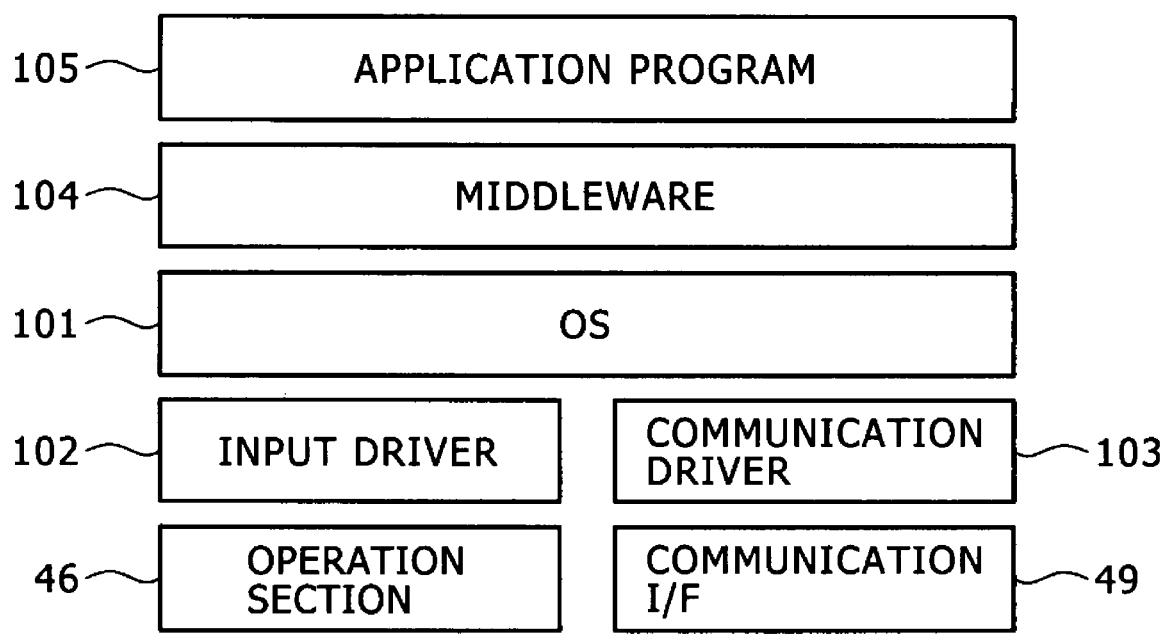
FIG. 5 is a diagram illustrating programs that are executed by a CPU of a control section.

FIG. 5 shows programs that are executed by the CPU 81 of the control section 45. The CPU 81 executes an OS (Operating System) 101, an input driver 102, a communication driver 103, a middleware program 104, and an application program 105.

The OS 101 is a so-called basic software program for managing the hardware of the digital camera 1 and providing various interfaces. The input driver 102 controls the operation section 46 through the OS 101 to acquire signals corresponding to operations done by the user through the operation section 46. The communication driver 103 controls the communication I/F 49 through the OS 101.

The middleware program 104 operates on the OS 101 to provide functions that are higher and more sophisticated than the OS 101 to the application program 105.

The application program 105 executes predetermined processing of the digital camera 1, such as taking an image of subjects and browsing and printing taken images.

FIG. 6 is a block diagram illustrating an exemplary configuration of the application program 105. The application program 105 includes a mode management object 121, an image taking-time photo exchange object 122, an image taking control object 123, and a browse-time photo exchange object 124. It should be noted that the mode management object 121, the image taking-time photo exchange object 122, the image taking control object 123, and the browse-time photo exchange object 124 are each made up of a program and data necessary for the execution thereof.

The mode management object 121 manages the modes of the digital camera 1. The modes as referred to herein include an image taking mode, a browse mode, and a print mode in which predetermined processing is executed by the digital camera 1. In other words, the mode management object 121 controls the transition between modes in the digital camera 1.

The mode management object 121 includes a connection scheme selection section 141, a transition target mode selection section 142, a mate mode determination section 143, a mode management table 144, and a mode transition control section 145.

The connection scheme selection section 141 selects a communication scheme of the network 2. For example, in accordance with a predetermined correlation between a single processing mode of a plurality of modes in which communication is not executed with a mate via the network 2 and a communication scheme of the network 2, the connection scheme selection section 141 selects the communication scheme of the network 2 related with a current mode that is the single processing mode. When the communication scheme of the network 2 is selected, the communication driver 103 controls the communication so as to start the communication with the mate via the network 2 in accordance with the selected communication scheme of the network 2.

The mate herein denotes an external device that is connected to the digital camera 1 via the network 2. For example, for the digital camera 1-1, the mate is the digital camera 1-2 or the printer 3. For the digital camera 1-2, the mate is the digital camera 1-1 or the printer 3.

The communication scheme of the network 2 herein denotes the communication mode between the digital camera 1 and network 2, such as the ad hoc mode or the infrastructure mode, or the communication scheme between the digital camera 1 and the printer 3 via the network 2, for example. In what follows, the communication scheme of the network 2 is also referred to as a connection scheme. The ad hoc mode is referred to also as an ad hoc connection (scheme) and the infrastructure mode is referred to also as an infrastructure connection (scheme).

In the following description, the mode in which communication is not made with the mate via the network 2 is also referred to as a single processing mode. A mode in which communication is made with the mate via the network 2 is also referred to as a network processing mode.

The transition target mode selection section 142 selects the mode of the destination of transition. For example, in accordance with a predetermined correlation between the single processing mode of a plurality of modes and the network processing mode in which communication is made with a mate via a network among the plurality of modes, the transition target mode selection section 142 selects the network processing mode related with the current mode that is the single processing mode.

The mate mode determination section 143 determines the mode of the mate of communication. For example, the mate mode determination section 143 determines whether the mode to which the mate of communication makes a transition is a mode that operates in concert with the processing mode of the selected network. The mode management table 144 describes a predetermined correlation between the single processing mode, the communication scheme of the network 2, and the network processing mode.

The mode transition control section 145 controls mode transitions. For example, if the mode to which the mate of communication makes a transition is found to be a mode that operates in concert with the selected network processing mode, the mode transition control section 145 controls mode transition so as to make a transition to the selected network processing mode.

The image taking-time photo exchange object 122 controls the transmission of an image acquired by taking an image of a subject to the mate of communication via the network 2 in an image taking-time photo exchange mode to be described later and, at the same time, controls the reception, from the mate of communication, of an image acquired by taking an image of a subject by the mate. The image taking-time photo exchange object 122 includes an image taking-time publicized list acquire section 161, an image acquire section 162, an image taking-time publicized list generation & update section 163, and a display control section 164.

The image taking-time publicized list acquire section 161 acquires, from the mate of communication via the network 2, an image taking-time publicized list generated by the mate, which contains addresses in the recording media 60 that is one example of the storage media of the mate storing images acquired by taking an image of subjects and thumbnail images corresponding to these images. It should be noted that the addresses in the recording media 60 provide so-called file paths (hereafter referred to simply as paths), for example.

The image acquire section 162 acquires images acquired by taking an image of subjects by the mate of communication and thumbnail images corresponding to these images from the mate via the network 2. The image taking-time publicized list generation & update section 163 generates an image taking-time publicized list. Also, the image taking-time publicized list generation & update section 163 updates the image taking-time publicized list. For example, when a subject has been taken, the image taking-time publicized list generation & update section 163 updates the image taking-time publicized list so as to add an address in the recording media 60 storing an image acquired by image taking and a corresponding thumbnail image to the image taking-time publicized list in which the addresses are arranged in the recording media 60 that is one example of storage media storing images.

The display control section 164 controls the display of the images being acquired by taking an image of subjects by both the digital camera 1-1 and the digital camera 1-2 into one screen on the LCD 20 in the time sequence of image taking.

The image taking control object 123 controls the taking an image of a subject.

The browse-time photo exchange object 124 controls the transmission of images to the mate of communication via the network 2 in a browse-time photo exchange mode to be described later and, at the same time, controls the reception of images from the mate. The browse-time photo exchange object 124 includes a browse-time publicized list acquire section 181, a thumbnail image acquire section 182, a display control section 183, a selection section 184, an image acquire section 185, a classification section 186, and a browse-time publicized list generation & update section 187.

The browse-time publicized list acquire section 181 acquires, from a plurality of mates of communication via the network 2, a browse-time publicized list generated by the mate of communication providing images, in which addresses in a storage space storing images to be provided by the mate and addresses in a storage space storing the thumbnail images for the images to be provided by the mate are arranged for each of groups into which the images are classified by the mate. For example, the grouping of images is executed by relating a group ID with an image. The images classified into one group are handled as if these groups were virtually (or logically) stored on one folder related with that group.

The thumbnail image acquire section 182 acquires thumbnail images via network 2 from addresses in the storage space storing thumbnail images, arranged in the browse-time publicized list acquired from a plurality of mates.

The display control section 183 controls the display of thumbnail images onto the LCD 20. For example, the display control section 183 displays the thumbnail images acquired from a plurality of mates onto the LCD 20 in each group and each mate.

The selection section 184 selects displayed thumbnail images specified by the user. For example, of the thumbnail images displayed on the LCD 20, the selection section 184 selects those which are specified by a signal based on an operation of the user through the operation section 46.

If a thumbnail image has been selected, the image acquire section 185 acquires the image corresponding to the selected thumbnail image provided by the mate via the network 2 from an address in the storage space storing that image corresponding to the selected thumbnail image arranged in the browse-time publicized lists acquired from a plurality of mates of communication.

The classification section 186 classifies images acquired from a mate of communication into a group of the same name as the name of a group arranged in a browse-time publicized list, into which that image is classified by the mate. The classification section 186 classifies the thumbnail images into a group of the same name as the name of a group arranged in the browse-time publicized list, into which the images corresponding to these thumbnail images are classified by the mate.

The browse-time publicized list generation & update section 187 generates a browse-time publicized list in which addresses in a storage space storing images to be provided to a mate of communication and addresses in a storage space storing thumbnail images corresponding to images to be provided to the mate are arranged for each group into which the images are classified by the source of the provision. The browse-time publicized list generation & update section 187 also updates a browse-time publicized list. For example, the browse-time publicized list generation & update section 187 generates a browse-time publicized list by arranging addresses in a storage space storing images specified by a signal based on an operation of the user through the operation section 46 and addresses in a storage space storing the thumbnail images corresponding to these images for each group into which these images are classified. Alternatively, for example, the browse-time publicized list generation & update section 187 updates a browse-time publicized list so as to add an address storing an image specified by a signal based on an operation of the user through the operation section 46 and an address storing a thumbnail image corresponding to the specified image for each group into which the specified image is classified.

The following describes mode transitions that take place in the digital camera 1.

Figure 7:
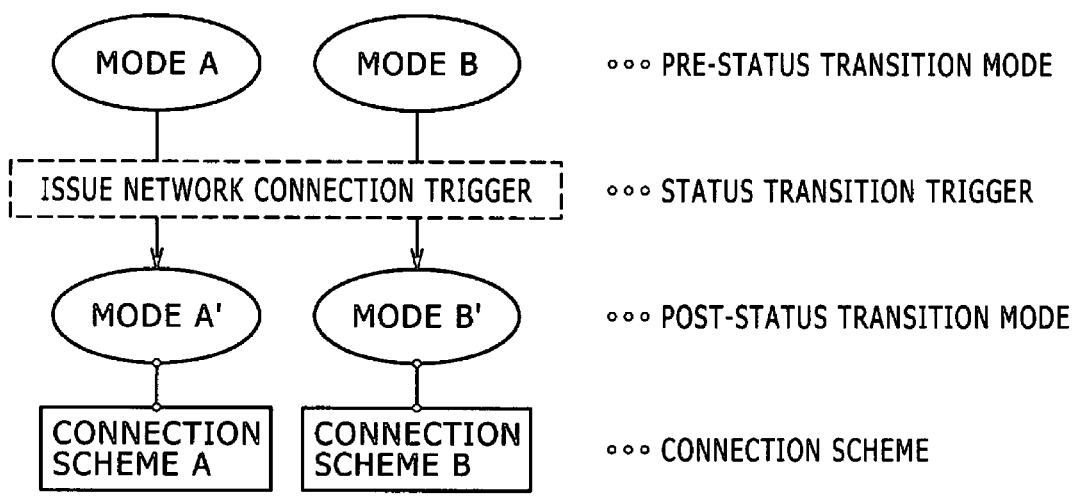
FIG. 7 is a diagram illustrating an outline of mode transitions in the digital camera.

FIG. 7 shows an outline of mode transitions that take place in the digital camera 1. If a mode of the digital camera 1 is a mode before a status transition, namely, mode A that is a mode in which communication is not made with a mate via the network 2 (the single processing mode), issuing a trigger for the connection with the network 2 selects, with this trigger used as a status transition trigger, mode A' in which communication is made with a mate via the network 2 (the network processing mode) as a mode (a post-status-transition mode) of the digital camera 1 of the transition target. In mode A', connection scheme A is selected from the connection schemes for connecting with the network 2, upon which the digital camera 1 is connected to the network 2 in connection scheme A.

Mode A, mode A', and connection scheme A are related with each other in advance.

If the mode of the digital camera 1 before a status transition is the single processing mode, namely mode B, issuing a trigger for the connection with the network 2 selects, with this trigger used as a status transition trigger, mode B' that is the network processing mode as a mode (a post-status-transition mode) of the digital camera 1 of the transition target. In mode B', connection scheme B is selected from the connection schemes for connecting with the network 2, upon which the digital camera 1 is connected to the network 2 in connection scheme B.

Mode B, mode B', and connection scheme B are related with each other in advance.

The above-mentioned setups allow the automatic connection to the network 2 with a correct connection scheme (or communication scheme) suitable for the mode to which a transition is made.

Relating beforehand the single processing mode that is a mode in which communication with a mate is not made via the network 2 with the network processing mode that is a mode in which communication with a mate is made via the network 2 on the basis of use cases (or intended uses) allows the automatic execution of applications that use the network 2 with a correct connection scheme (suitable for that mode) by the user's merely specifying the connection with the network 2.

Figure 8:
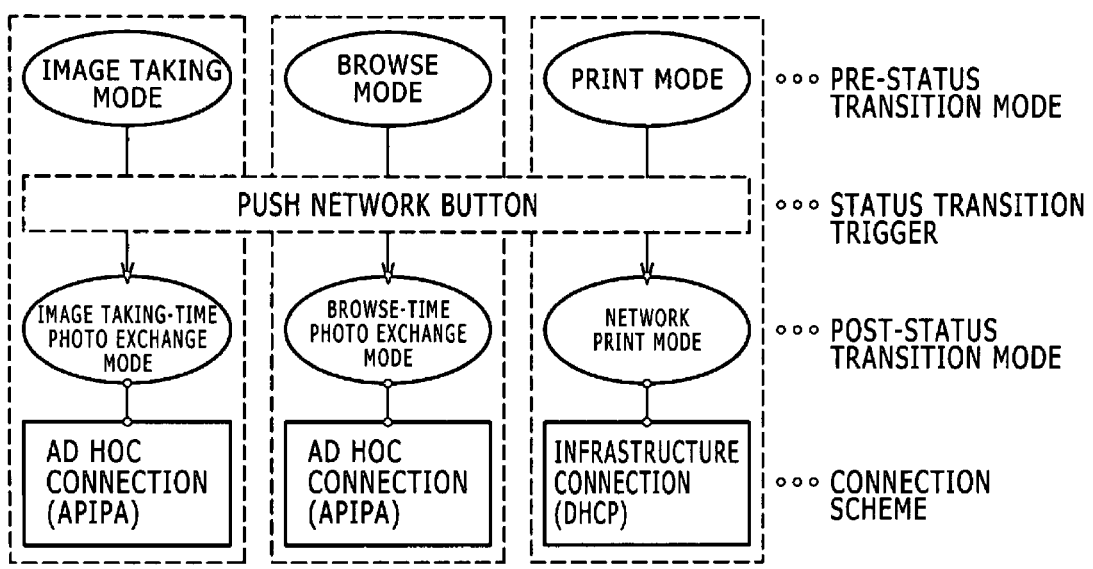
FIG. 8 is a diagram illustrating a specific example of mode transitions in the digital camera.

FIG. 8 shows a specific example of mode transitions that take place in the digital camera 1. If the mode of the digital camera 1 is an image taking mode in which communication via the network 2 is not made with a mate (the single processing mode), then issuing a trigger for the connection with the network 2 selects, with this trigger used as a status transition trigger, an image taking-time photo exchange mode in which communication with a mate is made via the network 2 (the network processing mode) as the mode of the digital camera 1 of the transition target.

In the image taking mode, the digital camera 1 can take an image of a subject. In the image taking-time photo exchange mode, if the own digital camera 1 is enabled to take an image of a subject and the mate digital camera 1 has took an image of a subject, the own digital camera 1 can acquire an image acquired as a result of the image taking from the mate digital camera 1 via the network 2. Namely, in the image taking-time photo exchange mode, upon taking an image of a subject, a resultant image is sent from the digital camera 1 that has took an image of the subject to the digital camera 1 connected thereto via the network 2.

The use case of the image taking mode is the taking of a picture of a subject. The use case of the image taking-time photo exchange mode is the image taking of subjects and the acquisition of images taken by the mate. Therefore, the image taking mode that is the single processing mode and the image taking-time photo exchange mode that is the network processing mode are common in the use case that is the image taking of subjects, so that these modes are related with each other on the base of the use case in advance.

To be more specific, the image taking-time photo exchange mode uses the network 2 when taking an image, so that it is considered to be natural and easy (or easily associable or imaginable for easy memorization) for the user to make a transition from the normal image taking mode that is the single processing mode to the image taking-time photo exchange mode by being connected to the network 2 by a trigger, such as the pressing of the network button 21.

In other words, as shown in FIG. 8, it is possible to connect the normal image taking mode before the connection to the network 2 with the image taking-time photo exchange mode after the connection to the network 2.

In the image taking-time photo exchange mode, the ad hoc connection for allocating an IP (Internet Protocol) address in the APIPA (Automatic Private IP Addressing) is selected from the connection schemes for the connection with the network 2. The digital camera 1 is connected to a mate via the network 2 in the ad hoc connection for IP address allocation in the APIPA scheme.

Taking an image of a subject may not be executed in environments in which a wireless LAN (Local Area Network) access point or a DHCP (Dynamic Host Configuration. Protocol) server is arranged. Therefore, the ad hoc connection is considered to be suitable for the scheme of the connection with the network 2 in the image taking-time photo exchange mode because wireless LAN access point or DHCP server is not necessary.

Consequently, it is possible to connect the image taking-time photo exchange mode with the ad hoc connection.

As described above, the image taking mode, the image taking-time photo exchange mode, and the ad hoc connection are related with each other in advance.

If the mode of the digital camera 1 is the browse mode that is the single processing mode in which communication is not made with a mate via the network 2, issuing a trigger for the connection with the network 2 selects, with this trigger used as a status transition trigger, the browse-time photo exchange mode that is the network communication mode in which communication is made with a mate via the network 2 as the mode of the digital camera 1 of the transition target.

In the browse mode, the digital camera 1 can display images recorded to the recording media 60 loaded on the digital camera 1 onto the LCD 20. For example, a plurality of thumbnail images representing a still image file and a moving image file recorded to the recording media 60 can be displayed on the LCD 20. In the browse-time photo exchange mode, the digital camera 1 displays the above-mentioned thumbnail images recorded to the recording media 60 loaded on the own digital camera 1 onto the LCD 20 and, at the same time, displays the thumbnail images of images recorded to the recording media 60 of the mate digital camera 1 onto the LCD 20, thereby acquiring a desired image from the mate via the network 2 from among the images corresponding the thumbnail images. Namely, in the browse-time photo exchange mode, the images taken and stored in the recording media 60 of the digital camera 1 are exchanged between a plurality of digital cameras 1.

The use case of the browse mode is the browsing of displayed images and the use case of the browse-time photo exchange mode is the browsing of displayed images and the acquisition of images recorded to the mate. Therefore, the browse mode that is the single processing mode and the browse-time photo exchange mode that is the network processing mode are common in the use case of browsing display images, so that these modes are related with each other on the basis of the use case in advance.

To be more specific, the browse-time photo exchange mode uses the network 2 when browsing images, so that it is considered to be natural and easy (or easily associable or imaginable for easy memorization) for the user to make a transition from the normal browse mode that is the single processing mode to the browse-time photo exchange mode by being connected to the network 2 by a trigger, such as the pressing of the network button 21, as with the image taking-time photo exchange mode.

In other words, as shown in FIG. 8, it is possible to connect the normal browsing mode before the connection to the network 2 with the browse-time photo exchange mode after the connection to the network 2.

In the browse-time photo exchange mode, the ad hoc connection for allocating an IP address in the APIPA is selected from the connection schemes for the connection with the network 2. The digital camera 1 is connected to a mate via the network 2 in the ad hoc connection for IP address allocation in the APIPA scheme.

Like the image taking of subjects, the browsing of images may not be executed in environments in which a wireless LAN (Local Area Network) access point or a DHCP server is arranged. Therefore, the ad hoc connection is considered to be suitable for the scheme of the connection with the network 2 in the browse-time photo exchange mode because no wireless LAN access point or DHCP server is necessary.

Consequently, it is possible to connect the browse-time photo exchange mode with the ad hoc connection.

As described above, the browse mode, the browse-time photo exchange mode, and the ad hoc connection are related with each other in advance.

Further, if the mode of the digital camera 1 is the print mode that is the single processing mode in which communication is not made with a mate via the network 2, issuing a trigger for the connection to the network 2 selects, with this trigger used as a status transition trigger, a network print mode that is a network communication mode in which communication is made with a mate via the network 2.

In the print mode, the digital camera 1 allows a printer connected thereto not via the network 2 to print images recorded to the recording media 60 loaded on the own digital camera 1. In the network print mode, the digital camera 1 allows the printer 3 connected thereto via the network 2 to print images recorded to the recording media 60 of the own digital camera 1. Namely, in the network print mode, the images taken and stored in the recording media 60 of the digital camera 1 are printed on the printer connected to the network.

The use case of the print mode is the printing of images and the use of the network print mode is also the printing of images. Therefore, the print mode that is the single processing mode and the network print mode that is the network processing mode are common in the use case of image printing, so that these modes are related with each other on the basis of the use case.

To be more specific, the network print mode uses the network 2 when printing images, so that it is considered to be natural and easy (or easily associable or imaginable for easy memorization) for the user to make a transition from the normal print mode that is the single processing mode to the network print mode by being connected to the network 2 by a trigger, such as the pressing of the network button 21.

In other words, as shown in FIG. 8, it is possible to connect the normal print mode before the connection to the network 2 with the network print mode after the connection to the network 2.

In the network print mode, the infrastructure connection for allocating an IP address in the DHCP is selected from the connection schemes for the connection with the network 2. The digital camera 1 is connected to a mate via the network 2 in the infrastructure connection for IP address allocation in the DHCP scheme.

In the network print mode, is it possible that the printer 3 already connected to the network 2 that is arranged in a home or a print service store becomes the mate of connection, so that the infrastructure connection may be suitable for the scheme of the connection with the network 2 in the network print mode.

Consequently, it is possible to connect the network print mode with the infrastructure connection.

As described above, the print mode, the network print mode, and the infrastructure connection are related with each other in advance.

It should be noted that the mode before status transition and the mode after status transition are not limited to the image taking mode and the image taking-time photo exchange mode, the browse mode and the browse-time photo exchange mode, and the print mode and the network print mode; therefore the mode before status transition and the mode after status transition may be any modes that are related with each other by the use case. For example, the mode before status transition and the mode after status transition may be a storage mode in which images are recorded (or stored) in the loaded recording media 60 and a network storage mode in which images are recorded (or stored) in a storage or a personal computer connected to the network 2.

It is determined, before making a transition to the selected network processing mode, whether the mode to which a transition is made by the mate of communication is a mode that operates in concert with the network processing mode to which the own digital camera 1 makes a transition. If the mode to which the mate of communication makes a transition is found to be a mode that operates in concert with the network processing mode to which the own digital camera 1 makes a transition, then the mode of the digital camera 1 makes a transition to the selected network processing mode.

It should also be noted that the connection scheme (or the communication scheme) is not limited to the ad hoc mode or the infrastructure mode; for example, any of the wired communication or the wireless communication, a wireless LAN based on the IEEE802.11a, IEEE802.11b, or IEEE802.11g standard, and the wireless communication based on the Bluetooth standard may be available.

Figure 9:
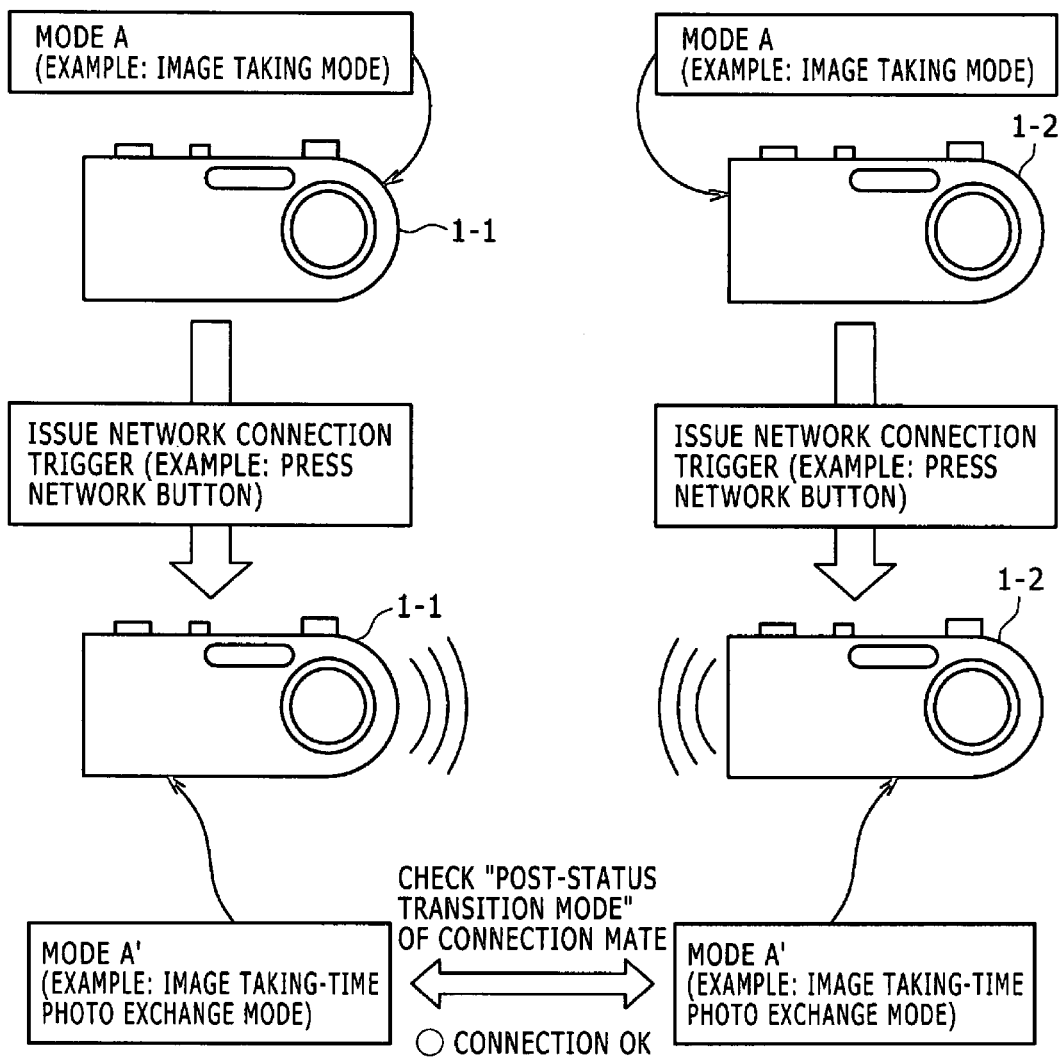
FIG. 9 is a schematic diagram illustrating processing for determining a mode of a communication mate.
Figure 10:
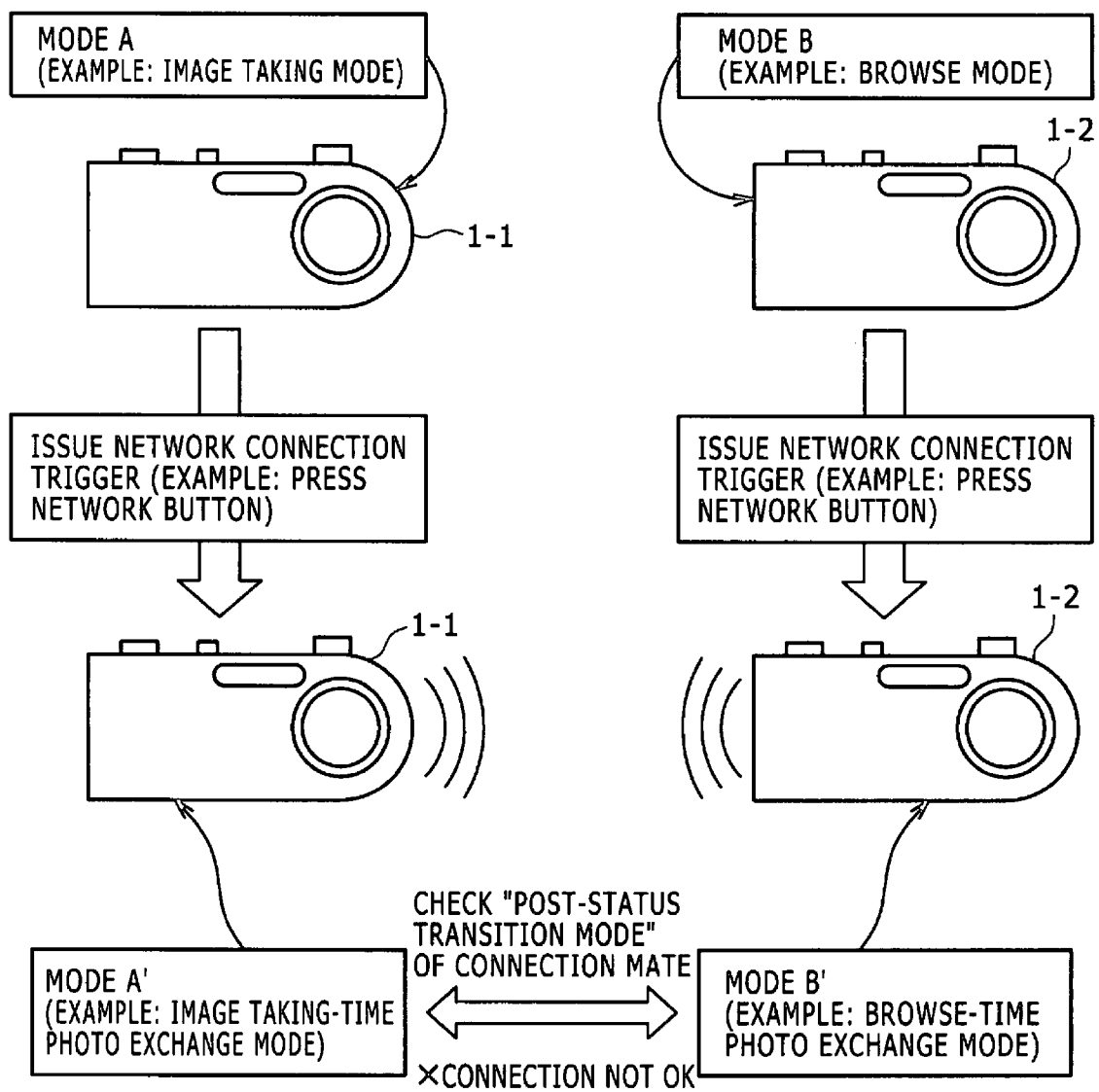
FIG. 10 is a schematic diagram illustrating other processing for determining a mode of a communication mate.

The following describes the processing of determining whether the mode to which the mate of communication makes a transition is a mode that operates in concert with the network processing mode to which the own digital camera 1 makes a transition, with reference to FIGS. 9 and 10.

As shown in FIG. 9, if the mode of the digital camera 1-1 is the image taking mode, one example of mode A that is the single processing mode in which communication is not made with a mate via the network 2, then issuing a trigger for the connection to the network 2 by pressing the network button 21 of the digital camera 1-1 selects, with this trigger used as a status transition trigger, the image taking-time photo exchange mode that is the network processing mode in which communication is made with a mate via the network 2, as the mode of the digital camera 1-2 of the transition target.

On the other hand, if the mode of the digital camera 1-2, the mate of the digital camera 1-1, is the image taking mode, one example of mode A that is the single processing mode in which communication is not made with the mate via the network 2, then issuing a trigger by pressing the network button 21 of the digital camera 1-2 selects, with this trigger used as a status transition trigger, the image taking-time photo exchange mode that is the network processing mode in which communication is made with the mate via the network 2 as the mode of the digital camera 1-2 of the transition target.

The digital camera 1-1 determines whether the mode to which the digital camera 1-2, the mate of communication, makes a transition is a mode that operates in concert with the image taking-time photo exchange mode that is the mode of the digital camera 1-1.

In this case, the mode to which the digital camera 1-1 makes a transition is the image taking-time photo exchange mode and the mode to which the digital camera 1-2 makes a transition is the image taking-time photo exchange mode. In the image taking-time photo exchange mode, when a subject is taken a picture of and the mate takes a picture of a subject, the image taken by the mate is acquired via the network 2, so that the image taking-time photo exchange mode and the image taking-time photo exchange mode are the modes that operate in concert with each other.

Consequently, the digital camera 1-1 determines that the mode to which the digital camera 1-2, the mate of communication, makes a transition is a mode that operates in concert with the image taking-time photo exchange mode of the digital camera 1-1, upon which the mode of the digital camera 1-1 makes a transition to the image taking-time photo exchange mode.

Likewise, the digital camera 1-2 determines that the mode to which the digital camera 1-1, the mate of communication, makes a transition is a mode that is in concert with the image taking-time photo exchange mode that is the mode of the digital camera 1-2, upon which the mode of the digital camera 1-2 makes a transition to the image taking-time photo exchange mode.

Consequently, the digital camera 1-1 and the digital camera 1-2 are interconnected via the network 2. For example, if the digital camera 1-1 and the digital camera 1-2 are in the image taking mode that is the single processing mode in which no communication is made with each other via the network 2, pressing the network button 21 in the digital camera 1-1 and the digital camera 1-2 provides connection between the digital camera 1-1 and the digital camera 1-2 via the network 2, upon which the digital camera 1-1 and the digital camera 1-2 enter the image taking-time photo exchange mode. Likewise, if the digital camera 1-1 and the digital camera 1-2 are in the browse mode that is the single processing mode in which no communication is made with each other via the network 2, pressing the network button 21 in the digital camera 1-1 and the digital camera 1-2 provides connection between the digital camera 1-1 and the digital camera 1-2 via the network 2, upon which the digital camera 1-1 and the digital camera 1-2 enter the browse-time photo exchange mode.

In contrast, FIG. 10 shows an example in which the digital camera 1-1 and the digital camera 1-2 are not interconnected via the network 2.

As shown in FIG. 10, if the mode of the digital camera 1-1 is the image taking mode, one example of mode A that is the single processing mode, issuing a trigger by pressing the network button 21 of the digital camera 1-1 for the connection to the network 2 selects, with this trigger used as a status transition trigger, the image taking-time photo exchange mode that is the network processing mode, in the same manner shown in FIG. 9.

If the mode of the digital camera 1-2, the communication mate of the digital camera 1-1, is the browse mode, one example of mode A that is the single processing mode, issuing a trigger for the connection to the network 2 by pressing the network button 21 of the digital camera 1-2 selects, with this trigger used as a status transition trigger, the browse-time photo exchange mode that is the network processing mode as the mode of the digital camera 1-2 of the transition target.

The digital camera 1-1 determines whether the mode to which the digital camera 1-2, the mate of communication, makes a transition is a mode that is in convert with the image taking-time photo exchange mode of the digital camera 1-1.

In this case, the mode to which the digital camera 1-1 makes a transition is the image taking-time photo exchange mode and the mode to which the digital camera 1-2 makes a transition is the browse-time photo exchange mode. In the image taking-time photo exchange mode, a subject is taken a picture of and, at the same time, when the mate of communication takes a picture of a subject, the image taken by the mate is acquired via the network 2. In the browse-time photo exchange mode, the thumbnail images corresponding to images recorded to the recording media 60 loaded on the own digital camera 1 are displayed on the LCD 20 and, at the same time, the thumbnail images of images recorded to the recording media 60 loaded on the mate digital camera 1 are displayed on the LCD 20. Of the images whose thumbnail images are displayed, a desired image is acquired from the mate digital camera 1, so that the image taking-time photo exchange mode and the browse-time photo exchange mode are not in concert with each other.

Consequently, the digital camera 1-1 determines that the mode to which the digital camera 1-2, the mate of communication, makes a transition is not a mode that is in concert with the image taking-time photo exchange mode of the digital camera 1-1, so that the mode of the digital camera 1-1 will not make a transition to the image taking-time photo exchange mode.

Likewise, the digital camera 1-2 determines that the mode to which the digital camera 1-1, the mate of communication, makes a transition is not the mode that is in concert with the browse-time photo exchange mode of the digital camera 1-2; therefore the mode of the digital camera 1-2 will not make a transition to the image taking-time photo exchange mode.

Consequently, the digital camera 1-1 and the digital camera 1-2 are not interconnected via the network 2.

Figure 11:
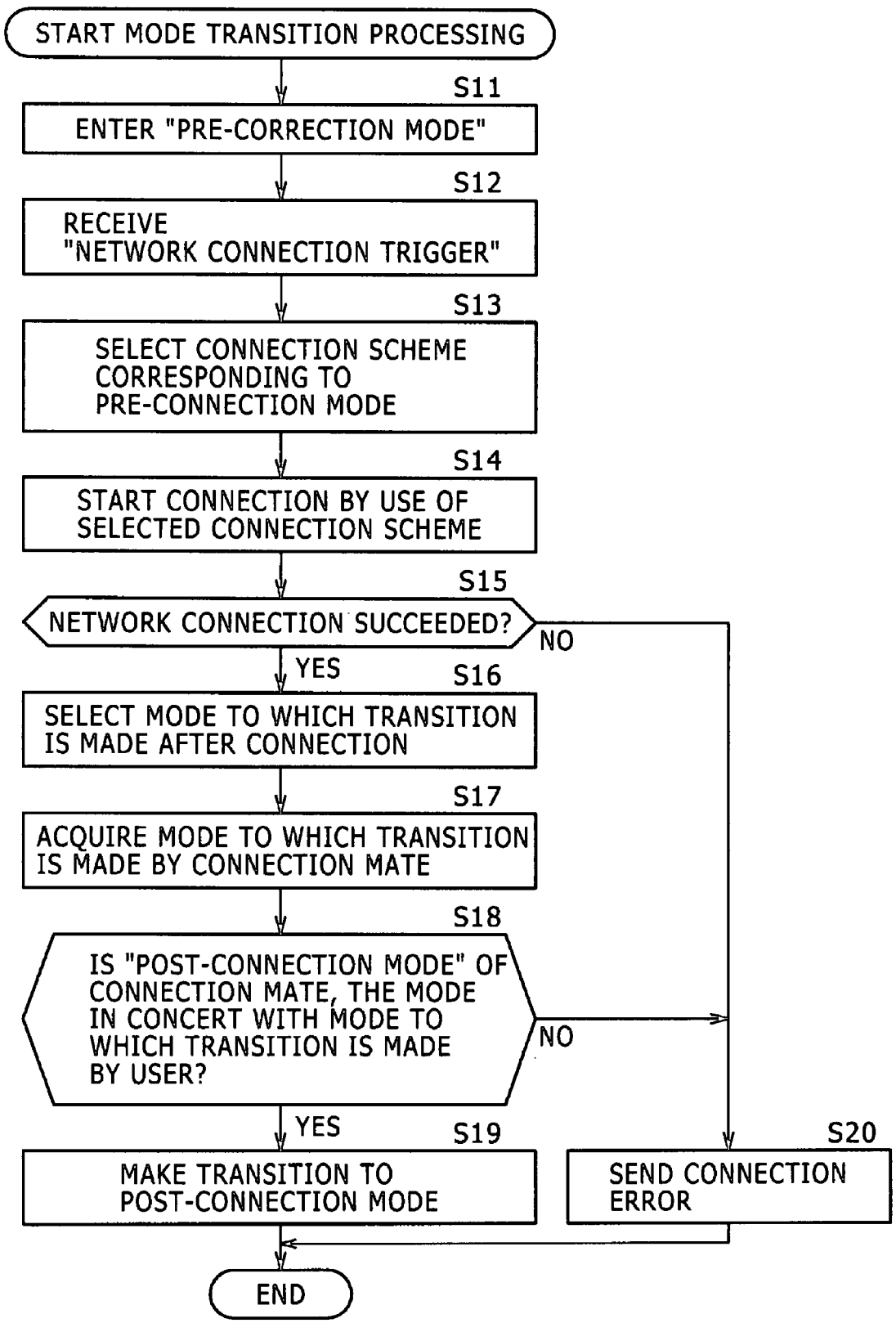
FIG. 11 is a flowchart indicative of mode transition processing.

The following describes the processing of the mode transitions that take place in the digital camera 1-1 with reference to the flowchart shown in FIG. 11. In step S11, the mode transition control section 145 of the mode management object 121 puts the digital camera 1-1 into the mode represented by a signal specified by the user through the operation section 46, this mode being a pre-connection mode that is the single processing mode. The pre-connection mode is the image taking mode, the browse mode, or the print mode, for example.

In step S12, the mode management object 121 receives a network connection trigger that is a trigger for connecting the digital camera 1-1 to the network 2. For example, a network connection trigger is issued by pressing the network button 21 of the digital camera 1-1 and the issued network connection trigger is received by the mode management object 121.

In step S13, the connection scheme selection section 141 of the mode management object 121 selects the connection scheme of the network 2 that corresponds to the pre-connection mode entered in step S11. For example, in step S13, the connection scheme selection section 141 selects one of the ac hoc connection scheme in which the IP address is allocated by APIPA and the infrastructure connection scheme in which the IP address is allocated by DHCP.

It should be noted that the pre-connection mode and the connection scheme of the network 2 are related with each other in advance. For example, because the mode management table 144 describes a predetermined correlation between the single processing mode, the communication scheme of the network 2, and the network processing mode, the connection scheme selection section 141 references the mode management table 144 in step S13 to select the connection scheme of the network 2 corresponding to the pre-connection mode.

In step S14, the mode management object 121 makes the communication driver 103 start the connection with the network 2 in the selected connection scheme via the middleware 104 and the OS 101. Namely, the communication driver 103 makes the communication I/F 49 start the connection with the network 2 or the mate via the network 2 in the selected connection scheme.

In step S15, the mode management object 121 acquires the status of the connection with the network 2 from the communication driver 103 via the middleware 104 and the OS 101 to determine whether the connection with the network 2 is successful.

If the connection with the network 2 is found successful in step S15, then the procedure goes to step S16, in which the transition target mode selection section 142 of the mode management object 121 selects a mode to which a transition will be made after the connection. Namely, in step S16, the transition target mode selection section 142 selects a network communication mode to which a transition will be made after the connection with the network 2, this network communication mode being corresponding to the pre-connection mode that is the single processing mode.

It should be noted that the pre-connection mode that is the single processing mode and the network communication mode to which a transition is made from the pre-connection mode are related with each other in advance. For example, because the mode management table 144 describes a predetermined correlation between the single processing mode, the scheme of the communication with the network 2, and the network processing mode, the transition target mode selection section 142 references the mode management table 144 in step S15 to select a network communication mode to which a transition will be made after the connection with the network 2, this network communication mode corresponding to the pre-connection mode.

In step S17, the mate mode determination section 143 of the mode management object 121 acquires, via the network 2, a mode (or the information thereof) to which the digital camera 1-2, the mate of connection, makes a transition.

For example, in step S17, via the middleware 104 and the OS 101, the mate mode determination section 143 causes the communication driver 103 to send a request to the digital camera 1-2 for the information about the mode to which a transition is made. The communication driver 103 accordingly causes the communication I/F 49 to send this request to the digital camera 1-2. Then, the digital camera 1-2 sends back this information via the network 2. The communication driver 103 causes the communication I/F 49 to receive this information supplied from the digital camera 1-2. The communication driver 103 supplies the received information to the mate mode determination section 143 via the middleware 104 and the OS 101.

In step S18, the mate mode determination section 143 determines whether the post-connection mode of the mate of connection that is the digital camera 1-2, namely a mode to which the mate makes a transition, is a mode that is in concert with the mode to which the digital camera 1-1 moves (or makes a transition).

For example, if the mode to which the digital camera 1-1 makes a transition is the image taking-time photo exchange mode or the browse-time photo exchange mode, the mate mode determination section 143 determines in step S18 whether a mode to which the digital camera 1-2 makes a transition is the same mode as the mode to which the digital camera 1-1 makes a transition.

Further, for example, if the mode to which the digital camera 1-1 makes a transition is the network print mode, then the mate mode determination section 143 receives an image from the digital camera 1-1 in the network print mode via the network 2 to determine in step S18 whether a mode to which the printer 3, the mate of the communication, is a mode for printing the received image, namely, a mode that is in concert with the network print mode.

It should be noted that the mode in concert with the network print mode can be said to be in a sub-combination relation with the network print mode.

If the post-connection mode of the mate of connection, namely, a mode to which the mate makes a transition is found, in step S18, to be a mode that is in concert with a mode to which the user (digital camera 1-1) moves (or makes a transition), then the procedure goes to step S19, in which the mode transition control section 145 of the mode management object 121 makes the mode of the digital camera 1-1 move to the mode (the post-connection mode) selected in step S16, upon which the processing of the mode transitions of the digital camera 1-1 comes to an end.

If the post-connection mode of the mate of connection, namely a mode to which the mate makes a transition is found, in step S18, to be not a mode that is in concert with the a mode to which the user (digital camera 1-1) moves (or makes a transition), then the procedure goes to step S20, in which the communication driver 103 disconnects the network 2. If this is done, the mode management object 121 notifies the user of a connection error by displaying an error message on the LCD 20, for example. In this case, no mode transition takes place, upon which the processing comes to an end in the original mode.

If the connection with the network 2 is found failed in step S15, then the procedure goes to step S20, in which the mode management object 121 notifies the user of a connection error by displaying an error message on the LCD 20, for example. In this case, no mode transition takes place, upon which the processing comes to an end in the original mode.

Figure 12:
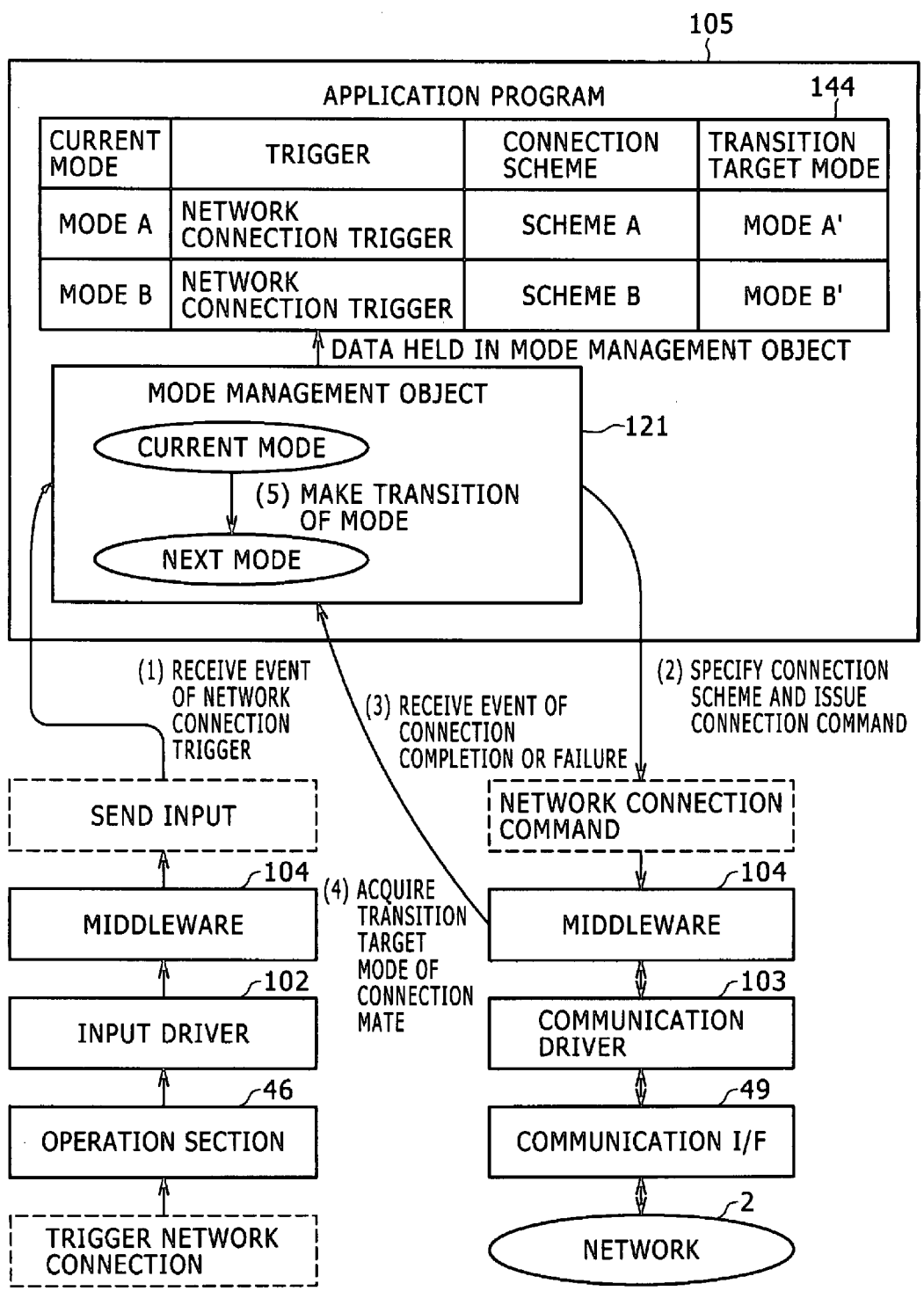
FIG. 12 is a diagram illustrating mode transition processing.

In the mode transition processing, when a network connection trigger takes place on the operation section 46, such as the pressing of the network button 21, an input notification that is a network connection trigger event is supplied to the application program 105 via the input driver 102 and the middleware 104 as shown in FIG. 12. Receiving this network connection trigger event, the application program 105 references the mode management table 144 to select a connection scheme corresponding to the current mode and specify the selected connection scheme, thereby issuing a connection command to the communication driver 103 via the middleware 104.

In the mode management table 144 shown in FIG. 12, the current mode that is mode A, the trigger that is the network connection trigger, the connection scheme that is connection scheme A, and the transition target mode that is mode A' are related with each other in advance. In addition, in the mode management table 144 shown in FIG. 12, the current mode that is mode B, the trigger that is the network connection trigger, the connection scheme that is connection scheme B, and the transition target mode that is mode B' are related with each other in advance.

The communication driver 103 causes the communication I/F 49 to connect to the network 2. An event indicative of the completion of connection or the failure of connection is issued by the communication I/F 49, the communication driver 103, and the middleware 104 to be supplied to the application program 105. If the connection is successful, the transition target mode that is the mode to which the mate of connection makes a transition is acquired by the communication I/F 49, the communication driver 103, and the middleware 104 via the network 2 and the acquired transition target mode (or the information thereof) of the mate is supplied to the application program 105.

The application program 105 determines whether the transition target mode of the mate is a mode that is in concert with a next mode (to which the own digital camera 1 makes a transition). If the transition target mode of the mate is found to be the next mode of the own digital camera 1, the application program 105 moves the own mode to that next mode.

As described above, in accordance with the predetermined correlation between the single processing mode and the communication scheme of the network 2, the communication scheme of the network 2 related with the current mode that is the single processing mode is selected; in accordance with the predetermined correlation between the single mode and the current mode, the network processing mode related with the current mode that is the single processing is selected. The communication is controlled so as to start communicate with the mate via the network 2 of the selected communication scheme. It is determined whether the mode to which the mate of communication makes a transition is a mode that is in concert with the selected network processing mode. If this mode is found to be a concerting mode, the mode transition is controlled so as to make a transition to the selected network processing mode.

The above-mentioned setup allows the sure connection to the network 2, thereby connecting to the mate of communication via the network 2. In addition, because the connection is made with the network 2 by a scheme suitable for the network processing mode, namely, a scheme suitable for the processing to be executed, the processing via the network 2 can be surely executed.

The above-mentioned setup eliminates chances of the connection to the network 2 by a scheme unsuitable for the network processing mode or the connection to the mate of communication via network 2, so that, although it appears that the connection be established, situations in which the processing via the network 2 not be executed can be surely circumvented.

Figure 13:
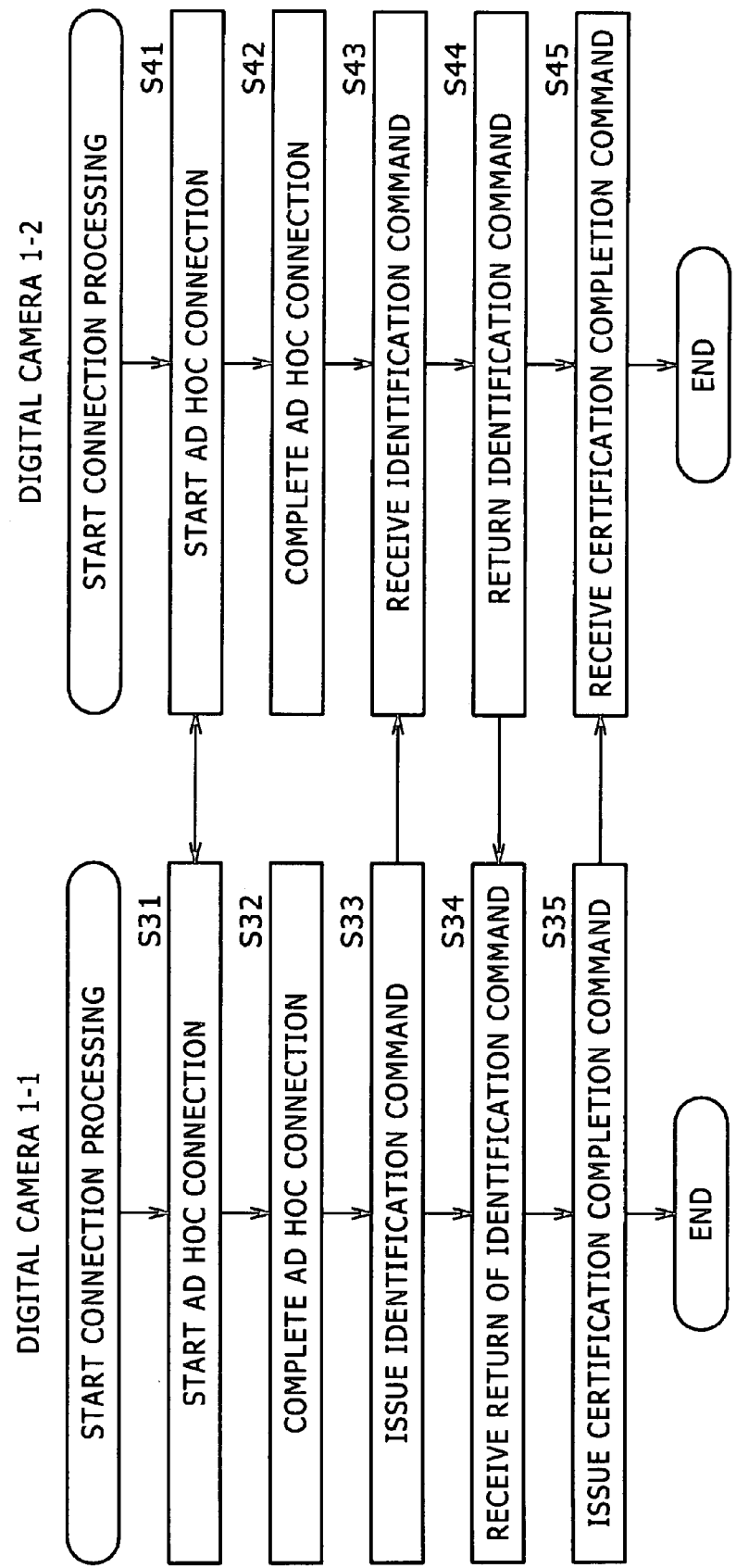
FIG. 13 is a flowchart indicative of exemplary details of connection processing.

FIG. 13 is a flowchart indicative of a detail example of the processing of connection with the digital camera 1-2 that is the mate of communication via the network 2, corresponding to step S14, to be executed when the ad hoc connection is selected as the communication scheme of the network 2. In step S31, the communication driver 103 of the digital camera 1-1 starts the ad hoc connection with the digital camera 1-2 via the network 2. For example, the communication driver 103 starts supplying the power to the communication I/F 49, thereby causing the communication I/F 49 to start scanning for peripheral devices.

In step S41, the communication driver 103 of the digital camera 1-2 starts the ad hoc connection with the digital camera 1-1 via the network 2 as with step S31.

In step S32, the communication driver 103 of the digital camera 1-1 completes the ad hoc connection with the digital camera 1-2 via the network 2. In step S42, the communication driver 103 of the digital camera 1-2 completes the ad hoc connection with the digital camera 1-1 via the network 2.

In step S33, the communication driver 103 of the digital camera 1-1 issues an identification command to the digital camera 1-2 via the network 2. In step S43, the communication driver 103 of the digital camera 1-2 receives the identification command from the digital camera 1-1.

In step S44, the communication driver 103 of the digital camera 1-2 returns the identification command to the digital camera 1-1 via the network 2. In step S34, the communication driver 103 of the digital camera 1-1 receives the identification command from the digital camera 1-2.

In step S35, the communication driver 103 of the digital camera 1-1 issues a certification completion command to the digital camera 1-2 via the network 2. In step S45, the communication driver 103 of the digital camera 1-2 receives the certification completion command from the digital camera 1-1, upon which the processing comes to an end.

If the mate of communication is found to be successfully certified in the connection processing, then the processing operations of steps S15 and on are executed; otherwise, these processing operations are not executed.

In the connection processing based on the ad hoc connection scheme, it is preferable that the connection be permitted only when two digital cameras 1 are connected at the same time. This can prevent any third party from intervening the connection of the digital cameras 1. For example, in steps S31 and S41, the number of devices to be connected is counted and, if the connection of three or more devices is attempted, the subsequent processing will not be executed, thereby disabling that connection attempt.

It should be noted that, in connecting a third digital camera 1, the network button 21 of one of the already ad-hoc-connected digital cameras 1 and the network button 21 of the third digital camera 1 are simultaneously pressed to connect the third digital camera 1 to the ad hoc connection between the two digital cameras 1. Moreover, by repeating this operation, more than three digital cameras 1 can be connected.

If the mate of connection is successfully certified and the digital camera 1 is connected to the certified mate of connection, the digital camera 1 can acquire the metadata of the mate, such as the name thereof.

Figure 14:
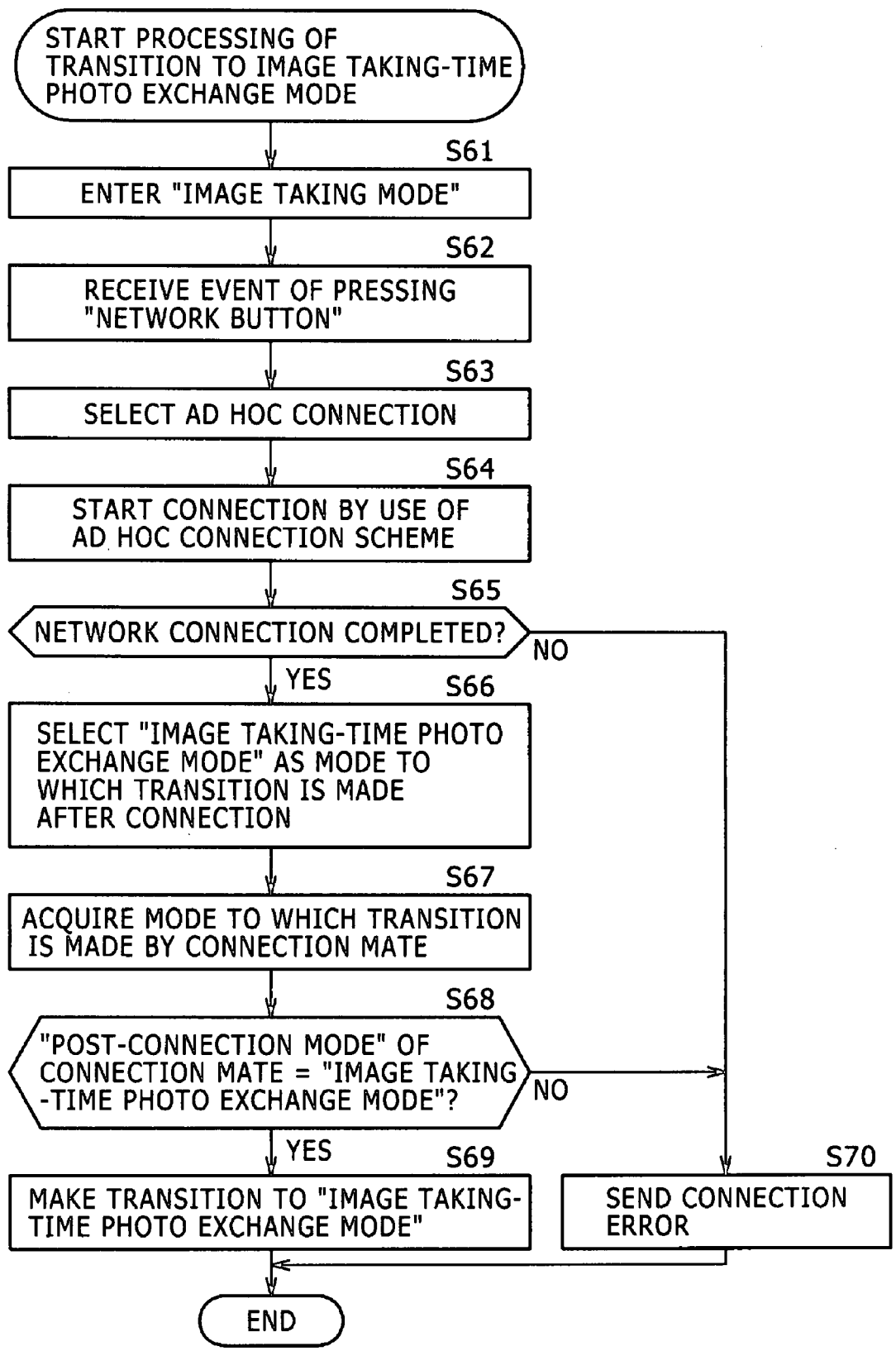
FIG. 14 is a flowchart indicative of a specific example of processing for mode transition to an image taking-time photo exchange mode.

The following describes a specific example of the processing of mode transitions that take place in the digital camera 1-1 when a transition is made from the image taking mode to the image taking-time photo exchange mode, with reference to the flowchart shown in FIG. 14. In step S61, the mode transition control section 145 of the mode management object 121 puts the digital camera 1-1 into the image taking mode specified by the user through the mode dial 18 of the operation section 46.

Figure 15:
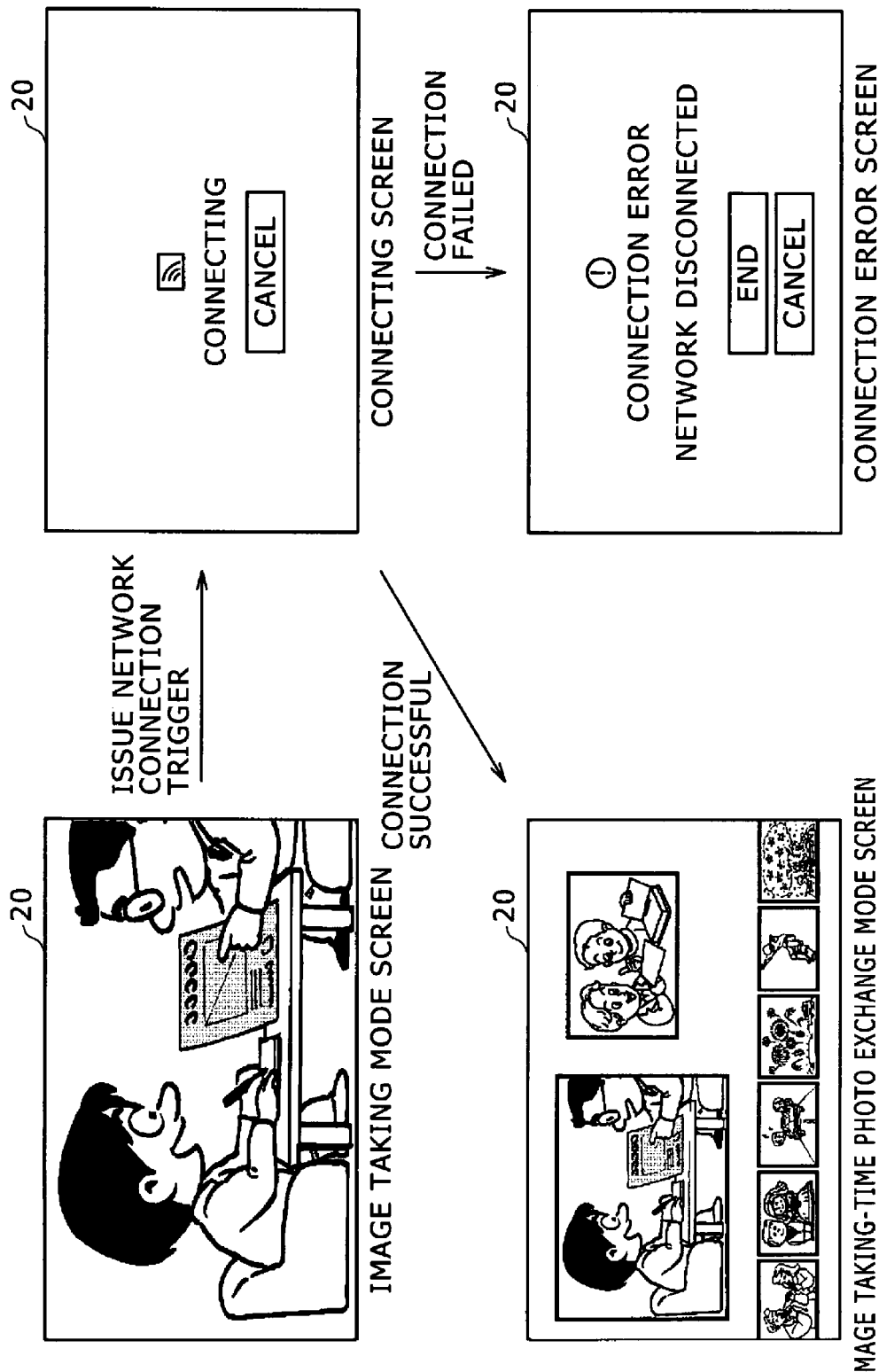
FIG. 15 is a diagram illustrating exemplary images that are displayed on an LCD.

As shown in FIG. 15, in the image taking mode, the image of a subject to be taken is displayed on the LCD 20.

In step S62, the mode management object 121 receives an event that is a network connection trigger caused by the pressing of the network button 21.

In step S63, the connection scheme selection section 141 of the mode management object 121 references the mode management table 144 that describes the correlation between the image taking mode and the ad hoc connection scheme for allocating the IP address by APIPA to select the ad hoc connection scheme for allocating the IP address by APIPA as the connection scheme of the network 2 in accordance with the image taking mode entered in step S61.

In step S64, the mode management object 121 causes, through the middleware 104 and the OS 101, the communication driver 103 to start the connection with the digital camera 1-2 via the network 2 by the ad hoc connection scheme in which the IP address is allocated by APIPA.

If the digital camera 1-1 and the digital camera 1-2 are located within the radio coverage of a wireless LAN and is the connection therebetween is to be made by the ad hoc connection scheme, then the connection of the IP layer of the network 2 between the digital camera 1-1 and the digital camera 1-2 is completed.

When the connection with the 1-network 2 is started, an image indicative of "connecting" (the connection being processed) is displayed on the LCD 20 of the digital camera 1-1 as shown in FIG. 15. Operating the manual operation button 19 to select the cancel button displayed on the LCD 20 of the digital camera 1-1 through the operation section 46 allows the digital camera 1-1 to cancel the connection with the digital camera 1-2.

In step S65, the mode management object 121 acquires a connection status of the network 2 from the communication driver 103 via the middleware 104 and the OS 101 to determine whether or not the connection of the network 2 is successful.

If the connection of the network 2 is found to be successful in step S65, then the procedure goes to step S66, in which the transition target mode selection section 142 of the mode management object 121 references the mode management table 144 that describes the correlation between the image taking mode and the image taking-time photo exchange mode to select the image taking-time photo exchange mode as the mode to which a transition is made after the connection.

After the connection of the IP layer has been completed, the mode management object 121 checks, via the network 2, that the mode to which the mate of connection makes a transition is the image taking-time photo exchange mode.

In step S67, the mate mode determination section 143 of the mode management object 121 acquires, via the network 2, the mode (or the information thereof) to which the digital camera 1-2, the mate of connection, makes a transition.

In step S68, the mate mode determination section 143 determines whether the post-connection mode of the mate of connection, the digital camera 1-2, namely the mode to which the mate of connection makes a transition, is the image taking-time photo exchange mode.

If the post-connection mode of the mate of connection, the digital camera 1-2, is found to be the image taking-time photo exchange mode in step S68, then the procedure goes to step S69, in which the mode transition control section 145 of the mode management object 121 moves the mode of the digital camera 1-1 to the image taking-time photo exchange mode selected in step S66, upon which the processing comes to an end.

As shown in FIG. 15, when a subject is taken a picture of and, at the same time, the digital camera 1-2 takes a picture of a subject, the image taken by the digital camera 1-2 is acquired via the network 2. Then, the image taken by the digital camera 1-1 and the image taken by the digital camera 1-2 acquired via the network 2 are displayed on the LCD 20 along with the image of a subject to be taken.

If the post-connection mode of the mate of connection, the digital camera 1-2, is found not to be the image taking-time photo exchange mode in step S68, namely, the modes to which the digital camera 1-1 and the digital camera 1-2 make transitions are not in concert with each other, then the procedure goes to step S70. In the communication driver 103 ends the connection (or disconnects the connection) and the mode management object 121 displays an error message for example on the LCD 20, thereby notifying the user of the occurrence of a connection error (or the failure of the connection). If this happens, no mode transition takes place and the processing ends in the image taking mode.

For example, in step S68, error message "Connection Error. Network Disconnection", for example, is displayed on the LCD 20 as shown in FIG. 15. In addition, operating the manual operation button 19 to click the cancel button or the end button displayed on the LCD 20 through the operation section 46 can discontinue or end the mode transition processing or execute subsequent processing.

If the connection with the network 2 is found failed in step S65, then the procedure goes to step S70, in which the mode management object 121 notifies the user of the connection error by displaying an error message on the LCD 20, for example. If this happens, no mode transition takes place and the processing ends in the image taking mode.

Figure 16:
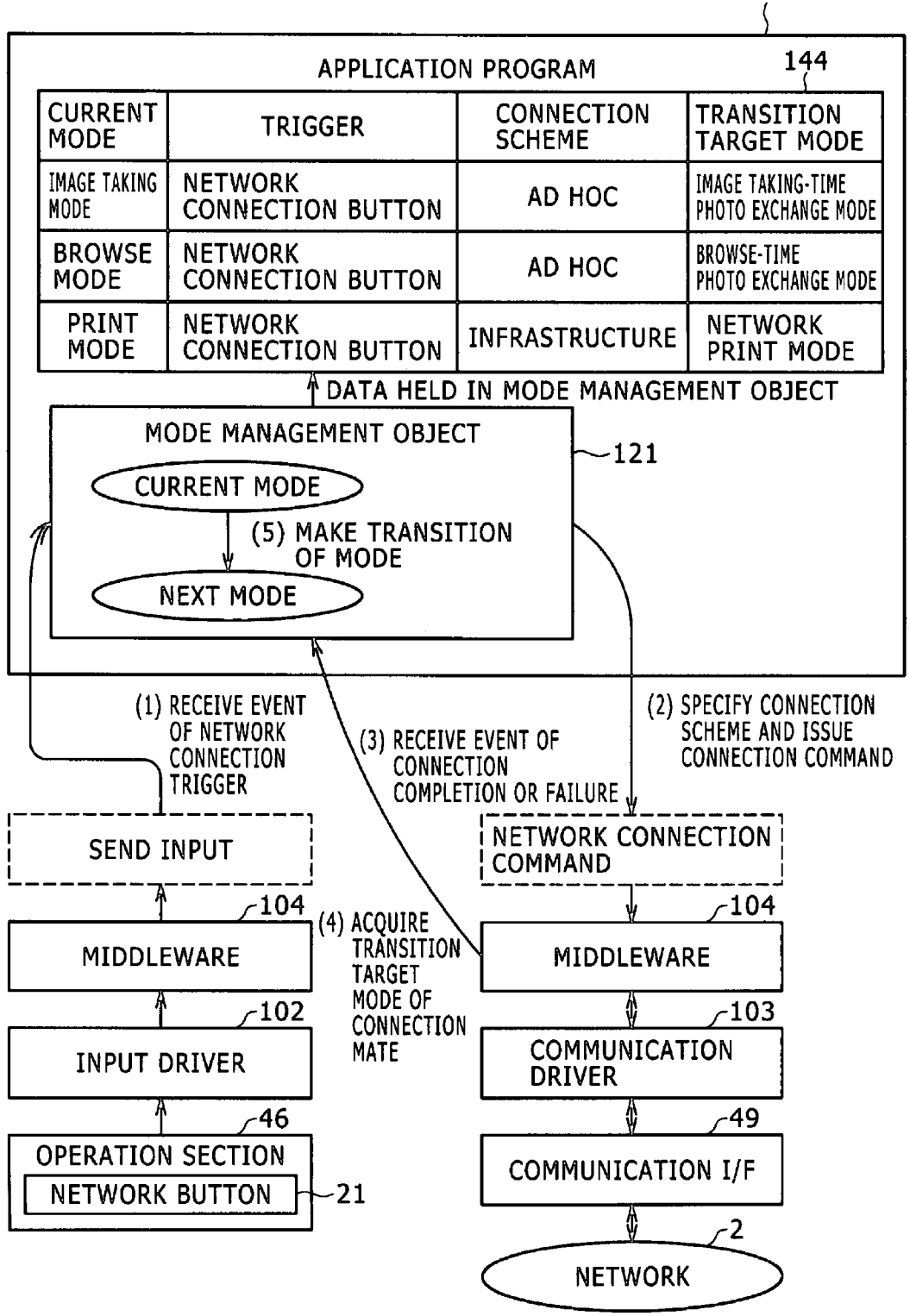
FIG. 16 is a diagram illustrating a specific example of mode transition processing.

In the processing of making a transition from the image taking mode to the image taking-time photo exchange mode, when a network connection trigger takes place through the operation section 46 by pressing of the network button 21 for example as shown in FIG. 16, an input notice that is an event of network connection trigger is supplied to the application program 105 via the input driver 102 and the middleware 104. Receiving the network connection trigger event, the application program 105 references the mode management table 144 to select the ad hoc connection scheme corresponding to the image taking mode that is the current mode and specifies the selected connection scheme to issue a connection command to the communication driver 103 via the middleware 104.

In the mode management table 144 shown in FIG. 16, the current mode that is the image taking mode, the trigger that is the pressing of the network connection button, the connection scheme that is the ad hoc connection scheme, and the transition target mode that is the image taking-time photo exchange mode are related with each other in advance. In addition, in the mode management table 144 shown in FIG. 16, the current mode that is the browse mode, the trigger that is the pressing of the network connection button, the connection scheme that is the ad hoc connection scheme, and the transition target mode that is the browse-time photo exchange mode are related with each other in advance. Further, in the mode management table 144 shown in FIG. 16, the current mode that is the print mode, the trigger that is the pressing of the network connection button, the connection scheme that is the infrastructure connection scheme, and the transition target mode that is the network print mode are related with each other in advance.

The communication driver 103 causes the communication I/F 49 to connect to the network 2. An event indicative of a successful connection or a failed connection is issued by the communication I/F 49, the communication driver 103, and the middleware 104 to be supplied to the application program 105. If the connection is successful, the transition target mode that is the mode to which the mate of connection makes a transition is acquired by the communication I/F 49, communication driver 103, and middleware 104 via the network 2 to be supplied to the application program 105.

The application program 105 determines whether the transition target mode of the mate is the image taking-time photo exchange mode. If the transition target mode of the mate is found to be the image taking-time photo exchange mode, then the application program 105 moves the mode thereof to the image taking-time photo exchange mode.

From the viewpoint of the user, if the mode to which the application program 105 of each of a plurality of digital cameras 1 including the own digital camera 1 makes a transition is the image taking-time photo exchange mode, then the user can move the mode of the digital camera 1 to the image taking mode that is the single processing mode to use the functions of the digital camera 1 in the image taking-time photo exchange mode by pressing the network button 21 without having to be aware of the connection scheme with the network 2.

It should be noted that the processing of a transition from the browse mode to the browse-time photo exchange mode is substantially the same as that of a transition from the image taking mode to the image taking-time photo exchange mode. The mode transition control section 145 of the mode management object 121 puts the mode of the digital camera 1-1 into the browse mode specified by the user through the mode dial 18 of the operation section 46.

Next, the mode management object 121 receives the trigger that is the network connection trigger caused by the pressing of the network button 21 by the user.

Then, the connection scheme selection section 141 of the mode management object 121 references the mode management table 144 that describes the correlation between the browse mode and the ad hoc connection scheme for allocating the IP address by APIPA to select the ad hoc connection scheme for allocating the IP address by APIPA as the connection scheme of the network 2 in accordance with the browse mode.

Further, the mode management object 121 causes, through the middleware 104 and the OS 101, the communication driver 103 to start the connection with the digital camera 1-2 via the network 2 in the ad hoc connection scheme for allocating the IP address by APIPA.

After the connection via the network 2 has started, the mode management object 121 acquires a status of the connection with the network 2 from the communication driver 103 via the middleware 104 and the OS 101 to determine whether the connection with the network 2 is successful.

If the connection with the network 2 is found to be successful, the transition target mode selection section 142 of the mode management object 121 references the mode management table 144 that describes the correlation between the browse mode and the browse-time photo exchange mode to select the browse-time photo exchange mode as the mode to which a transition is to be made after connection.

After the completion of the IP layer connection, that the mode to which the mate of connection makes a transition is checked through the network 2 as the browse-time photo exchange mode. The mate mode determination section 143 of the mode management object 121 acquires, via the network 2, the mode (or the information thereof) to which the digital camera 1-2, the mate of connection, makes a transition.

Then, the mate mode determination section 143 determines whether the post-connection mode of the mate of connection that is the digital camera 1-2, namely, the mode to which the mate makes a transition, is the browse-time photo exchange mode.

As a result, if the post-connection mode of the mate of connection that is the digital camera 1-2 is found to be the browse-time photo exchange mode, the mode transition control section 145 of the mode management object 121 moves the mode of the digital camera 1-1 to the selected browse-time photo exchange mode, upon which the processing comes to an end.

On the other hand, if the post-connection mode of the mate of connection that is the digital camera 1-2 is found to be not the browse-time photo exchange mode, namely, the mode to which each digital camera 1 makes a transition is found to be not a mode not in concert with each other, the communication driver 103 ends the connection (or disconnects the network) and the mode management object 121 notifies the user of a connection error by displaying an error message on the LCD 20, for example. If this happens, no mode transition takes place and the processing ends in the browse mode.

It should be noted that, if the connection with the network 2 is found to be failed, the mode management object 121 notifies the user of a connection error by displaying an error message on the LCD 20, for example. If this happens, no mode transition takes place and the processing comes to an end.

In the processing of a transition from the browse mode to the browse-time photo exchange mode, if a network connection trigger is caused through the operation section 46 as a result of the pressing of the network button 21, for example, an input notification that is the network connection trigger event is supplied to the application program 105 via the input driver 102 and the middleware 104 as shown in FIG. 16. Receiving the network connection trigger event, the application program 105 references the mode management table 144 to select the ad hoc connection scheme corresponding to the browse mode that is the current mode and specifies the selected connection scheme, thereby issuing a connection command to the communication driver 103 via the middleware 104.

The communication driver 103 causes the communication I/F 49 to connect with the network 2. An event indicative of successful connection or failed connection is issued by the communication I/F 49, the communication driver 103, and the middleware 104 to be supplied to the application program 105. When the connection is successful, the transition target mode that is a mode to which the mate of connection makes a transition is acquired by the communication I/F 49, the communication driver 103, and the middleware 104 via the network 2. The acquired transition target mode (or the information thereof) of the mate of connection is supplied to the application program 105.

The application program 105 determines whether the received transition target mode of the mate of connection is the browse-time photo exchange mode. If this transition target mode is found to be the browse-time photo exchange mode, then the application program 105 moves own mode to the browse-time photo exchange mode.

From the viewpoint of the user, if the mode to which the application program 105 of each of a plurality of digital cameras 1 including the own digital camera 1 is the browse-time photo exchange mode, the user can move the mode of the digital camera 1 to the browsing mode that is the single processing mode to use the functions of the digital camera 1 in the browse-time photo exchange mode by pressing the network button 21 without having to be aware of the connection scheme of the network 2.

The processing of a transition from the print mode to the network print mode is substantially the same as that of a transition form the image taking mode to the image taking-time photo exchange mode. The mode transition control section 145 of the mode management object 121 puts the mode of the digital camera 1-1 into the print mode. The print mode is indicated by a signal from the mode dial 18 of the operation section 46 in accordance with the operation by the user.

Next, the mode management object 121 receives the event that is a network connection trigger caused by the pressing of the network button 21.

Then, the connection scheme selection section 141 of the mode management object 121 references the mode management table 144 that describes a correlation between the print mode and the infrastructure connection scheme for allocating the IP address in DHCP to select this infrastructure connection scheme as the connection scheme of the network 2 in accordance with the print mode.

Further, the mode management object 121 causes, through the middleware 104 and the OS 101, the communication driver 103 to start connection with an access point, not shown, via the network 2 in the infrastructure connection scheme for allocating the IP address by DHCP, this access point being connected to the printer 3.

In this case, it is required that the power to the printer 3 be already on and the printer 3 be already in the successful connection with the access point, not shown, of the network 2.

In the infrastructure connection scheme, the communication driver 103 searches for an access point and completes the connection of the IP layer of the network 2 with the retrieved access point. Then, the middleware 104 or the application program 105 checks for the printer 3 connected to the network 2 via the communication driver 103 by a protocol specified by the DLNA standard, for example.

If the connection of the IP layer of the network 2 between the digital camera 1-1 and the access point, not shown, has been completed and the printer 3 connected to the network 2 is found, then the communication between the digital camera 1-1 and the printer 3 via the IP layer of the network 2 is enabled.

After the connection via the network 2 has started, the mode management object 121 acquires a status of the connection of the network 2 from the communication driver 103 via the middleware 104 and the OS 101 to determine whether or not the connection with the network 2 is successful.

If the connection of the network 2 is fount to be successful, the transition target mode selection section 142 of the mode management object 121 references the mode management table 144 that describes a correlation between the print mode and the network print mode to select the network print mode as the mode to which a transaction is to be made after connection.

After the completion of the connection of the IP layer, the mode to which the mate of connection makes a transition is a mode in which the printing from the network print mode is accepted is checked via the network 2. The mate mode determination section 143 of the mode management object 121 acquires, via the network 2, the mode (or the information thereof) to which the mate of connection makes a transition.

Then, the mate mode determination section 143 determines whether the mode to which the printer 3 makes a transition, namely, the mode to which the mate of connection makes a transition, is a mode in which the printing from the network print mode is accepted.

As a result, if the mode to which the printer 3 makes a transition is found to be a mode in which the printing from the network print mode is accepted, then the mode transition control section 145 of the mode management object 121 moves the mode of the digital camera 1-1 to the selected network print mode, upon which the processing comes to an end.

On the other hand, if the mode to which the mate of connection that is the printer 3 makes a transition is found not to be a mode in which the printing from the network print mode is accepted, namely, if the mode to which each of the digital camera and the printer makes a transition is not a mode not in concert with the other, then the communication driver 103 ends the connection (or disconnects the network) and the mode management object 121 notifies the user of a connection error (telling the failure of connection) by displaying an error message on the LCD 20, for example. If this happens, no mode transition takes place and the processing ends in the print mode.

It should be noted that, if the connection with network 2 is found to be failed, then the mode management object 121 notifies the user of a connection error by displaying an error message on the LCD 20, for example. If this happens, no mode transition takes place and the processing ends in the image taking mode.

In the processing of a mode transition from the print mode to the network print mode, if a network connection trigger is caused through the operation section 46 as a result of the pressing of the network button 21, for example, an input notification that is the network connection trigger event is supplied to the application program 105 via the input driver 102 and the middleware 104 as shown in FIG. 16. Receiving the network connection trigger event, the application program 105 references the mode management table 144 to select the infrastructure connection scheme corresponding to the print mode that is the current mode and specifies the selected connection scheme, thereby issuing a connection command to the communication driver 103 via the middleware 104.

The communication driver 103 causes the communication I/F 49 to connect with the network 2. An event indicative of successful connection or failed connection is issued by the communication I/F 49, the communication driver 103, and the middleware 104 to be supplied to the application program 105. When the connection is successful, the transition target mode that is a mode to which the mate of connection makes a transition is acquired by the communication I/F 49, the communication driver 103, and the middleware 104 via the network 2. The acquired transition target mode (or the information thereof) of the mate of connection is supplied to the application program 105.

The application program 105 determines whether the received transition target mode of the mate of connection is the mode in which the printing from the network print mode is accepted. If the transition target mode of the mate is found to be the mode in which the printing from the network print mode is accepted, the application program 105 moves the mode thereof to the network print mode.

From the viewpoint of the user, if the mode of the printer 3 connected to the network 2 is the mode in which the printing from the network print mode is accepted, the user can move the mode of the digital camera 1 to the print mode that is the single processing mode to use the functions of the digital camera 1 in the network print mode by pressing the network button 21 without having to be aware of the connection scheme of the network 2.

It should be noted that, in the above description, it is determined whether the mode to which the mate of connection that is the printer 3 makes a transition is a mode in which the printing from the network print mode is accepted; alternatively, by advance use of the mode of the printer 3 as a mode in which the printing from the network print mode is accepted, it may be determined whether the mode of the mate of connection that is the printer 3 is a mode in which the printing from the network print mode is accepted.

As described above, use of network applications (or applications that use the network 2) is restricted beforehand on the basis of use case from use form "in which mode the user is using the digital camera 1", so that a connection scheme suitable for a particular network application, such as the ad hoc connection or the infrastructure connection, can be identified. In addition, the final connection processing is completed by checking whether a combination of the own network application and the mate network application can be established after the connection in the IP layer. Therefore, even if the user is little familiar with the connection scheme of the network 2, the present embodiment of the present invention allows the user to connect devices via the network 2 by a easy and simple operation, thereby making network applications available.

Further, the connection scheme used can be automatically discriminated, thereby minimizing the chance of device connection failure due to connection setting errors by the user.

It should be noted that the trigger for the connection to the network 2 is not restricted to the pressing of the network button 21 that is a physical activating device; alternatively, the trigger may be issued by use of a GUI (Graphical User Interface) menu, for example. If a connection command is selected and entered through the GUI menu, for example, this trigger may be issued when the digital cameras 1 incorporated with FRIDs (Radio Frequency Identifications) become ready for communicating with each other. It is also practicable to issue this trigger when the digital camera 1 is mounted on a cradle arranged with an interface with the network 2.

The following describes the image taking-time photo exchange mode. In the image taking-time photo exchange mode, the digital camera 1 operates as a server and, at the same time, as a client. The digital camera 1-1 in the image taking-time photo exchange mode and the digital camera 1-2 in the image taking-time photo exchange mode connected with each other via the network 2 each operate as a server or a client.

In the image taking-time photo exchange mode, upon taking an image by the mate of connection, the taken image is supplied to the own digital camera 1 via the network 2. Therefore, when the image taken by the mate has been received, the received image is displayed on the own digital camera 1 along with an image or name indicative of the mate, thereby allowing the realtime viewing of images taken by others.

FIG. 17 shows a flowchart indicative of the processing of client functions of the digital camera 1-1 in the image taking-time photo exchange mode. In step S101, the image taking-time publicized list acquire section 161 of the image taking-time photo exchange object 122 inquires the digital camera 1-2 via the network 2 whether an image taking-time publicized list has been updated. The inquiry of step S101 is regularly issued, at intervals of five seconds, for example.

For example, the image taking-time publicized list is configured so as to be read in accordance with the DLNA standard.

FIG. 18 shows an example of the image taking-time publicized list. The image taking-time publicized list contains, for each content ID for identifying a predetermined image taken by image taking, an address in the recording media 60 at which the taken image is located, an address in the recording media 60 at which a thumbnail image corresponding to the taken image is located, and information about the size of the image, the resolution of the image, and the encoding algorithm of the image.

In the example of the image taking-time publicized list shown in FIG. 18, each address is described by a file name of a file in which taken images or thumbnail images thereof are stored and a so-called path indicated by the folder in which that file is stored.

For example, in the example of the image taking-time publicized list shown in FIG. 18, there are arranged, for content ID 0000001, a path (or an address) that is xxxxx/xxxxxx/xxxxxxxxxxxx.jpg at which a thumbnail image is stored, a path (or an address) that is xxxxxxx/xxxxxxx/xxxxxxxxxxxxxx.jpg at which a taken image is stored, and the information about an image size that is "large", an image resolution that is 1024 pixels×768 pixels, and an image encoding algorithm that is JPEG. In addition, in the example of the image taking-time publicized list shown in FIG. 18, there are arranged, for content ID 0000002, a path (or an address) that is yyyyyyy/yyyyyyy/yyyyyyyyyyyyyy.jpg at which a thumbnail image is stored, a path (or an address) that is yyyyy/yyyyyy/yyyyyyyyyyyy.jpg at which a taken image is stored, and the information about an image size that is "small", an image resolution that is 320 pixels×240 pixels, and an image encoding algorithm that is JPEG.

Further, in the example of the image taking-time publicized list shown in FIG. 18, there are arranged, for content ID 0000003, a path (or an address) that is zzzzz/zzzzzz/zzzzzzzzzzzz.jpg at which a thumbnail image is stored, a path (or an address) that is zzzzzzz/zzzzzzz/zzzzzzzzzzzzzz.jpg at which a taken image is stored, and the information about an image size that is "middle", an image resolution that is 640 pixels×480 pixels, and an image encoding algorithm that is JPEG.

In step S102, the image taking-time publicized list acquire section 161 determines whether the image taking-time publicized list of the digital camera 1-2 that is the server has been updated. If the image taking-time publicized list is found not yet updated, then the image taking-time publicized list acquire section 161 returns to step S101 to repeat the processing of inquiry and determination.

If the image taking-time publicized list is found updated in step S102, then the procedure goes to step S103, in which the image taking-time publicized list acquire section 161 acquires the image taking-time publicized list from the digital camera 1-2 that is the server via the network 2.

For example, the image taking-time publicized list acquire section 161 reads the image taking-time publicized list from an address in the storage space of the digital camera 1-2 that is the server, the address being determined beforehand to store the image taking-time publicized list, thereby acquiring the image taking-time publicized list. To be more specific, the image taking-time publicized list acquire section 161 instructs the communication driver 103 to read the image taking-time publicized list. In response, the communication driver 103 causes the communication I/F 49 to read the image taking-time publicized list from an address in the storage space of the digital camera 1-2 that is the server via the network 2. The communication driver 103 supplies the acquired image taking-time publicized list to the image taking-time publicized list acquire section 161.

It is also practicable, for example, that the image taking-time publicized list acquire section 161 requests, via the network 2, the digital camera 1-2 that is the server for the transmission of the image taking-time publicized list, the digital camera 1-2 that is the server transmits the requested image taking-time publicized list to the digital camera 1-1 via the network 2, and the image taking-time publicized list acquire section 161 causes the communication driver 103 and the communication I/F 49 to receive the supplied image taking-time publicized list, thereby acquiring the image taking-time publicized list.

In step S104, the image taking-time publicized list acquire section 161 compares the previously acquired image taking-time publicized list with the currently acquired image taking-time publicized list. The image taking-time publicized list acquire section 161 acquires the address at which the imaged added by updating is stored, namely, the address at which the image acquired by image taking is stored.

In step S105, the image acquire section 162 of the image taking-time photo exchange object 122 acquires the image added by updating from the 1-network 2 that is the server via the network 2. In other words, the image acquire section 162 acquires, via the network 2, the image acquired by image taking from the address described in the image taking-time publicized list at which the image acquired by image taking is stored.

For example, the image acquire section 162 reads, via the network 2, an image from an address at which the taken image is stored in the storage space of the digital camera 1-2 that is the server, thereby acquiring the image taken by the digital camera 1-2 that is the server. To be more specific, the image acquire section 162 instructs the communication driver 103 to read the image by specifying the address described in the image taking-time publicized list. In response, via the network 2, the communication driver 103 causes the communication I/F 49 to read the specified image from the address in the storage space of the digital camera 1-2 that is the server. The communication driver 103 supplies the acquired image to the image acquire section 162.

It is also practicable, for example, that the image acquire section 162 specifies an address described in the image taking-time publicized list to request the digital camera 1-2 that is the server for transmitting the image taken thereby, the digital camera 1-2 that is the server sends the requested image to the digital camera 1-1 via the network 2. The image acquire section 162 causes the communication driver 103 and the communication I/F 49 to receive the supplied image, thereby acquiring the image taken by the digital camera 1-2 that is the server.

In step S106, the display control section 164 of the image taking-time photo exchange object 122 displays the thumbnail image of the acquired image on the LCD 20, upon which the processing comes to an end.

It should be noted that if the three or more digital cameras 1 in the image taking-time photo exchange mode are interconnected, the client function of each digital camera 1 executes the processing described with reference to FIG. 17 on the other digital cameras 1 to acquire the image taking-time publicized list therefrom, thereby acquiring images.

To be more specific, if four digital cameras 1 in the image taking-time photo exchange mode are interconnected, each digital camera 1 acquires all the images taken by the other digital cameras 1 as soon as these images have been taken.

It should be noted that the processing of step S105 described above refers to an image that has been taken by taking an image of a subject; it is also practicable to acquire both the image taken by image taking and the thumbnail image thereof on the basis of the acquired image taking-time publicized list. In this case, the thumbnail image thus acquired is displayed in step S106.

Figure 19:
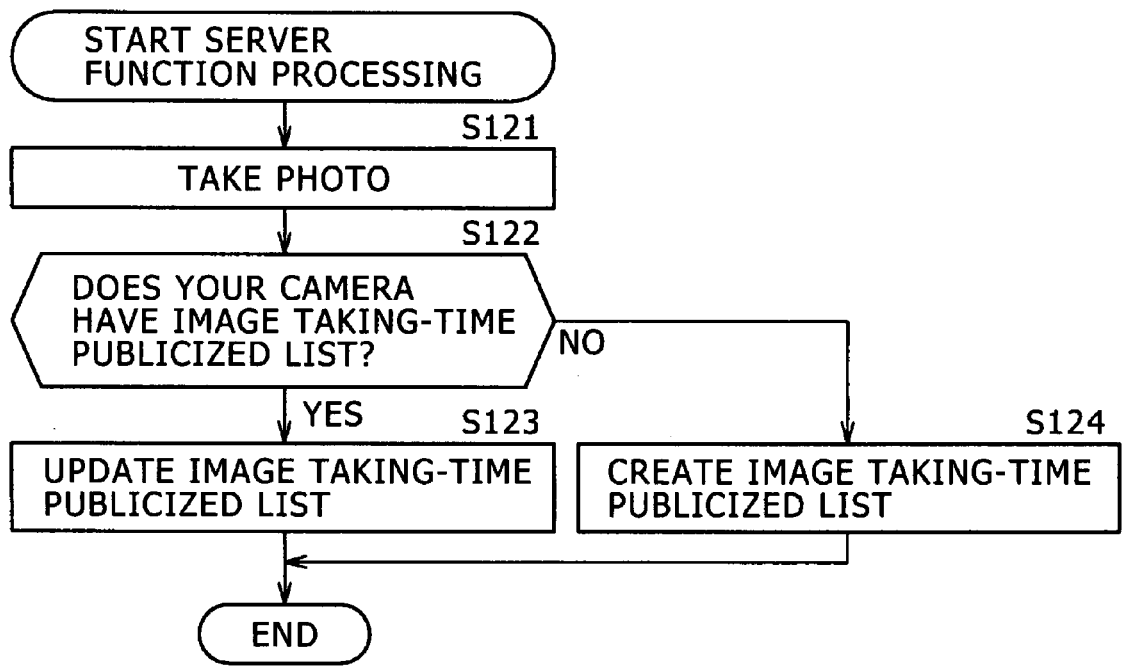
FIG. 19 is a flowchart indicative of processing for a server function in the image taking-time photo exchange mode.

FIG. 19 shows a flowchart indicative of the processing of the server function of the digital camera 1-1 in the image taking-time photo exchange mode. In step S121, the image taking control object 123 causes the camera section 41 to take a picture. To be more specific, when the shutter button 16 is pressed by user, the image taking control object 123 controls the camera section 41 so as to generates an image of a subject and then controls the camera DSP 42, the SDRAM 43, and the media I/F 44 so as to record the taken image to the recording media 60 by applying predetermined processing on the image.

It should be noted that, upon taking an image, the image taking control object 123 generates a thumbnail image corresponding to the taken image. The image taking control object 123 then records the generated thumbnail image to the recording media 60.

In step S122, the image taking-time publicized list generation & update section 163 determines whether the image taking-time publicized list is already stored in the own digital camera 1. If the image taking-time publicized list is found already stored, then the procedure goes to step S123, in which the image taking-time publicized list generation & update section 163 updates the image taking-time publicized list, upon which the processing comes to an end. In step S123, an address in the recording media 60 at which an image acquired by taking an image of a subject is located, an address in the recording media 60 at which a thumbnail image corresponding to that image is located, and the information about image size, image resolution, and image encoding algorithm are added to the image taking-time publicized list and arranged therein in correspondence with each content ID for identifying taken image for each photograph (or image) taken in step S121.

If the image taking-time publicized list found not stored in step S122, then the procedure goes to step S124, in which the image taking-time publicized list generation & update section 163 creates an image taking-time publicized list added and arranged with an address in the recording media 60 at which an image acquired by taking an image of a subject is located, and an address in the recording media 60 at which a thumbnail image corresponding to that image is located. In addition, the information about image size, image resolution, and image encoding algorithm are added to the image taking-time publicized list and arranged therein in correspondence with each content ID for identifying taken image for each photograph (or image) taken in step S121. When this image taking-time publicized list has been created, the processing comes to an end.

Figure 20:
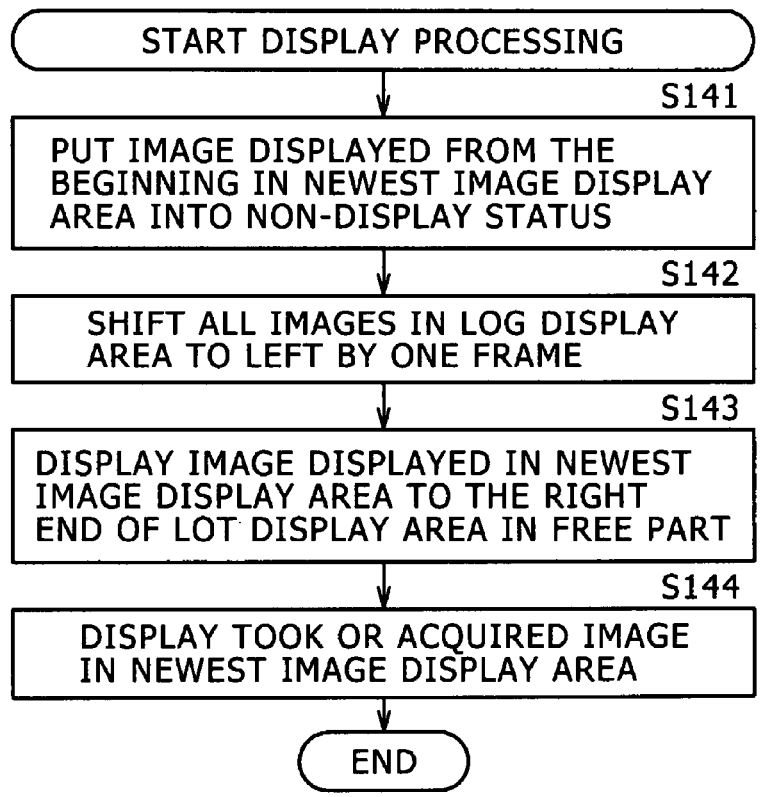
FIG. 20 is a flowchart indicative of display processing.

FIG. 20 shows a flowchart indicative of the display processing to be executed when the digital camera 1-1 in the image taking-time photo exchange mode takes an image of a subject or acquiring an image from the digital camera 1-2.

In step S141, the display control section 164 puts an image displayed on a newest image display area from the beginning into a non-display state.

Figure 21:
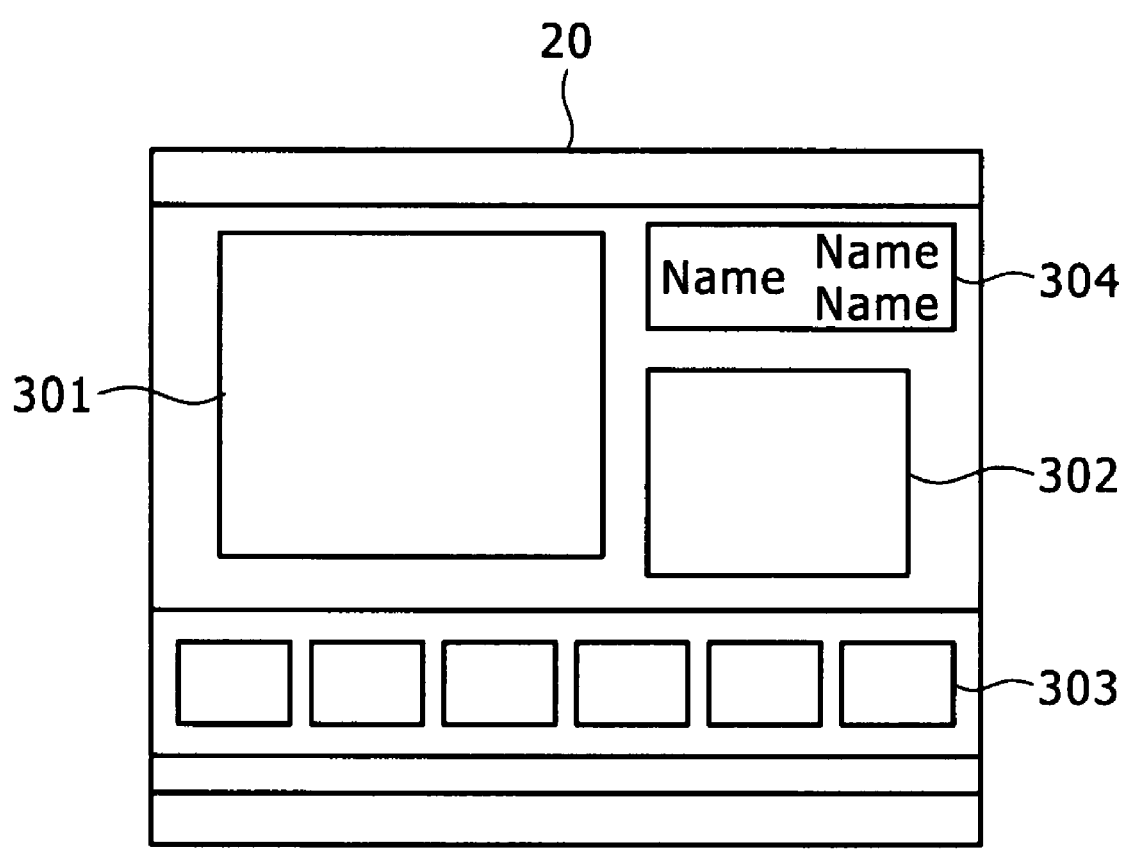
FIG. 21 is a diagram illustrating an exemplary arrangement of display areas on an LCD screen in the image taking-time photo exchange mode.

FIG. 21 shows an exemplary arrangement of a display area on the LCD 20 in the image taking-time photo exchange mode. In the image taking-time photo exchange mode, the a subject image display area 301, a newest image display area 302, a log display area 303, and a mate name display area 304 are arranged on the screen of the LCD 20 as image display areas.

The subject image display area 301 displays an image of a subject to be taken. The newest image display area 302 displays a newest image (or an image taken most recently) of the images taken by the own digital camera 1 or taken by the mate digital camera 1 and supplied therefrom.

The log display area 303 displays images taken by the own digital camera 1 or the taken by the mate digital camera 1 and supplied therefrom, in a time sequence in which these images were taken. The mate name display area 304 displays the name of mate digital camera 1 connected to the own digital camera 1 via the network 2. The name of mate is the name of a user set to the digital camera 1-2, for example. It should be noted that the name of mate may be either the name of user or the name of device.

Figure 22:
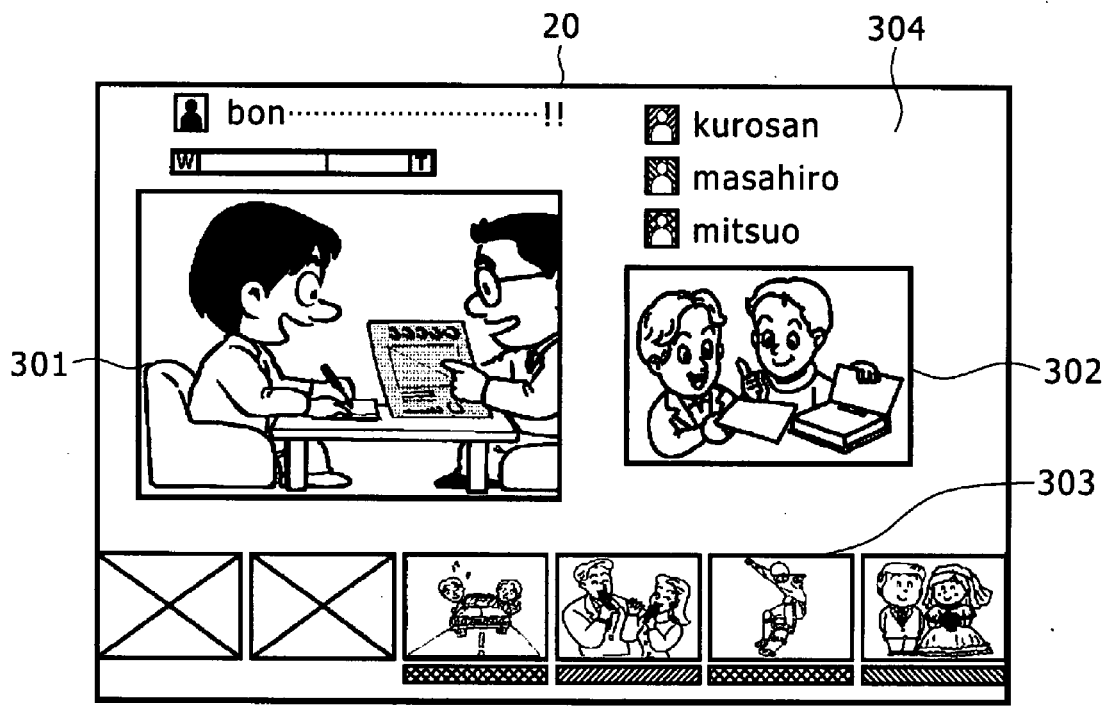
FIG. 22 is a diagram illustrating a specific example of images to be displayed on an LCD screen in the image taking-time photo exchange mode.

FIG. 22 shows a specific example of images to be displayed in display areas of a screen on the LCD 20 in the image taking-time photo exchange mode. In the example shown in FIG. 22, the subject image display area 301 displays an image of two persons talking business, for example, to be taken a picture of. The newest image display area 302 displays an image of two persons talking business, for example, that is the newest image (or the image taken last) of the images taken by the own digital camera 1 or taken by the mate network 2 and supplied therefrom.

In the example shown in FIG. 22, the log display area 303 displays images taken by the own digital camera 1 or taken by the mate digital camera 1 and supplied therefrom, in a time sequence in which these images were taken. In the example shown in FIG. 22, the log display area 303 displays four images.

In the example shown in FIG. 22, the mate name display area 304 displays "kurosan", "masahiro", and "mitsuo" that are the names of mates connected via the network 2.

Figure 23:
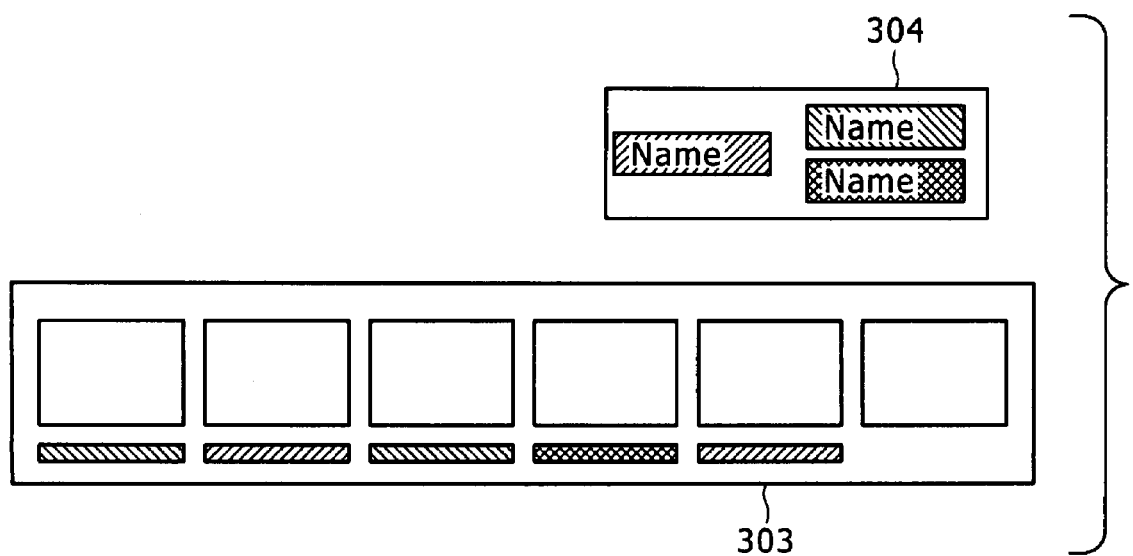
FIG. 23 is a diagram illustrating an exemplary communication mate name display area and an exemplary log display area.

For example, as shown in FIG. 23, the names displayed in the mate name display area 304 are identified by different colors. The images in the log display area 303 are displayed in the different colors that are used for the identification of the names of mates in the mate name display area 304. For example, as shown in FIG. 23, the color bars indicative of the names of mates are displayed below the images shown in the log display area 303 in a corresponding manner.

This setup allows the instant identification of the mate who took each of the images displayed in the log display area 303.

Referring to FIG. 20 again, in step S141, the display control section 164 puts the image that is newest before image-taking by the digital camera 1-1 or before image-acquisition from the digital camera 1-2 into the non-display mode. The newest image is among the images taken by the own digital camera or taken by the mate digital camera and supplied therefrom displayed in the newest image display area 302 from the beginning.

In step S142, the display control section 164 shifts each image displayed in the log display area 303 by one frame to the left side. Consequently, the right-most frame in the log display area 303 becomes empty.

In step S143, the display control section 164 displays the image displayed in the newest image display area 302 (or the image put into the non-display mode in step S141) onto the right-most empty frame in the log display area 303.

In step S144, the display control section 164 displays an image taken by the own digital camera or received from the mate digital camera onto the newest image display area 302, upon which the processing comes to an end.

As described above, a new image (or an image taken recently) of the images taken by the own digital camera or taken by the mate digital camera and supplied therefrom is displayed in the newest image display area 302. The images taken by the own digital camera or taken by the mate digital camera and supplied therefrom are displayed in the log display area 303 in a time sequence of image taking. This setup allows the instant identification of the time sequence in which images were taken. In addition, the newest image (or the image taken most recently) is displayed larger in the newest image display area 302 than each image displayed in the log display area 303, thereby allowing the user to see details of the image.

It should be noted that, if the recording media 60 is filled up, or if the recording media 60 has no more free recording space, then the image taking-time photo exchange object 122 displayed a message thereof on the LCD 20. If this happens, the processing of the client function shown in FIG. 17 and the display processing shown in FIG. 20 are not executed and the image to be displayed on the LCD 20 is not updated.

Figure 24:
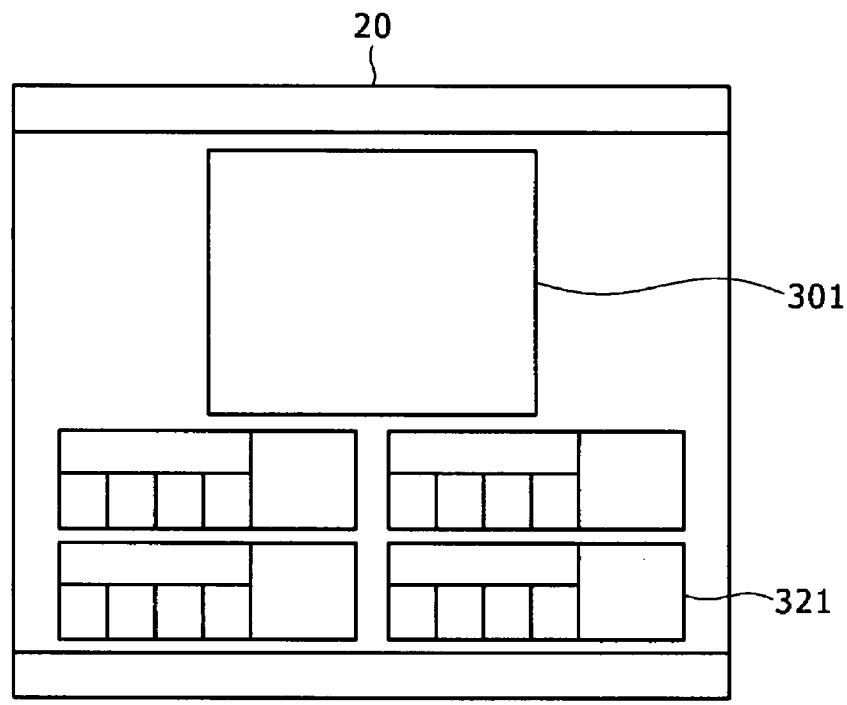
FIG. 24 is a diagram illustrating another exemplary arrangement of display areas on an LCD screen in the image taking-time photo exchange mode.

FIG. 24 shows another exemplary arrangement of display areas on the LCD 20 in the image taking-time photo exchange mode. In the image taking-time photo exchange mode, a subject image display area 301 and a log display area 321 are arranged as image display areas on the LCD 20.

The log display area 321 displays images taken by the own digital camera or taken by the mate digital camera and supplied therefrom, as classified into own and mate and in the time sequence of image taking.

Figure 25:
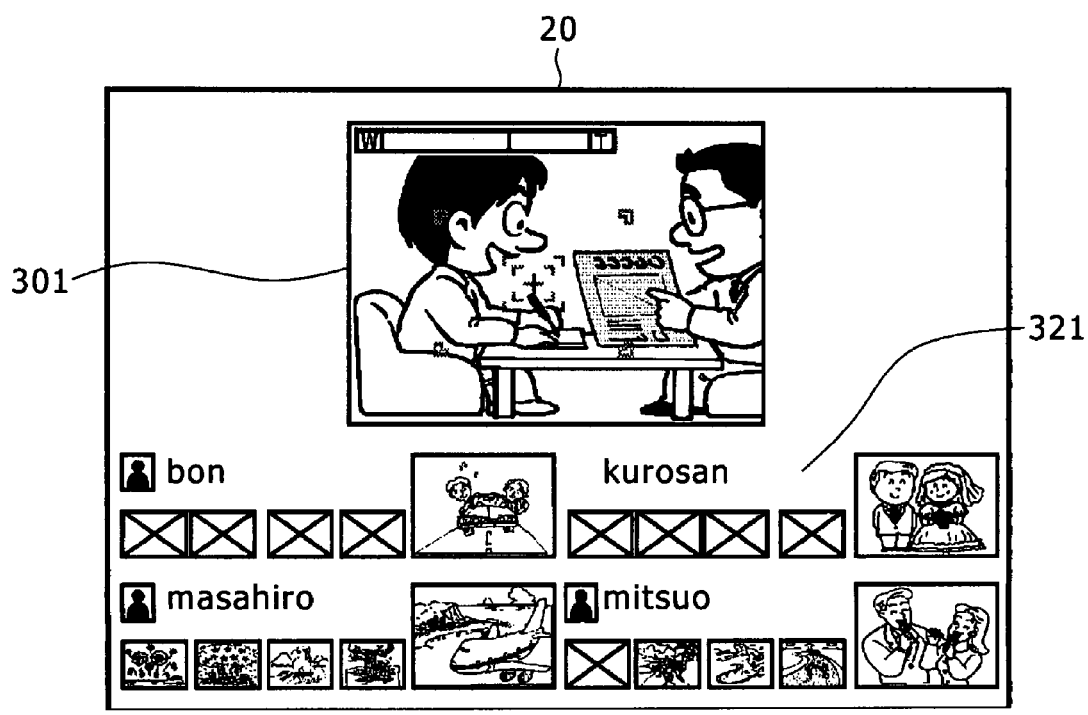
FIG. 25 is a diagram illustrating another specific example of images that are displayed on an LCD screen in the image taking-time photo exchange mode.

FIG. 25 shows a specific example of images to be displayed in the display areas on the LCD 20 in the image taking-time photo exchange mode if the log display area 321 is arranged. In the example shown in FIG. 25, images taken by the own digital camera are laterally displayed in a time sequence of image taking and are displayed in the upper left of the log display area 321 indicated by own name "bon" below the subject image display area 301. Images taken by a mate digital camera are laterally displayed in a time sequence of image taking and are displayed in the lower left of the log display area 321 indicated by mate name "masahiro". Images taken by a mate digital camera are laterally displayed in a time sequence of image taking and are displayed in the upper right of the log display area 321 indicated by mate name "kurosan" below the subject image display area 301. Images taken by a mate digital camera are laterally displayed in a time sequence of image taking and are displayed in the lower right of the log display area 321 indicated by mate name "mitsuo".

Figure 26:
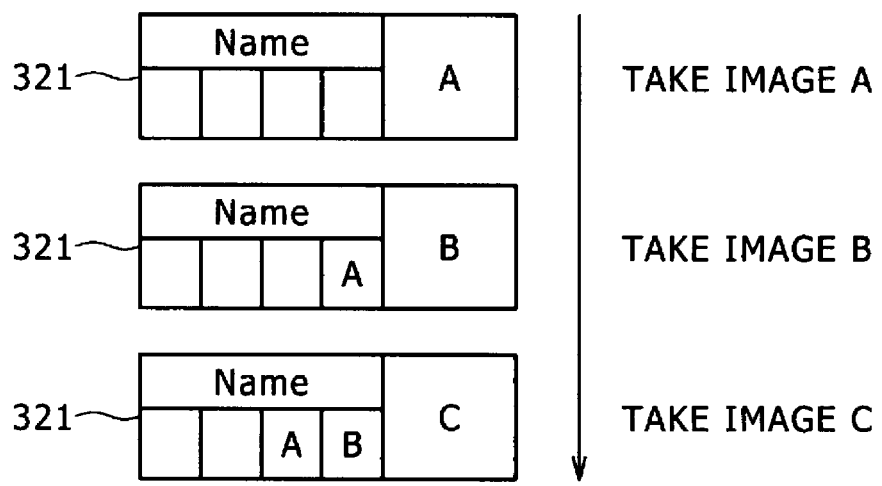
FIG. 26 is a diagram illustrating a log display area.

As shown in FIG. 26, if image A is taken, taken image A is displayed in the rightmost area of the mate who has taken image A in the log display area 321. When the mate who has taken image A takes image B, taken image B is displayed in the rightmost area of the mate who has taken image A and image B in the log display area 321, image A being displayed to the left side of image B in the log display area 321.

If the mate who has taken image A and image B further takes image C, taken image C is displayed in the rightmost area of the mate who has taken image An image B, and image C in the log display area 321, image A and image B being displayed to the left side of image C in this order in the log display area 321.

If the own digital camera takes image A, taken image A is displayed in the rightmost area of the own in the log display area 321. If the own digital camera takes image B, taken image B is displayed in the rightmost area in the log display area 321, image A being displayed to the left side of image B in the log display area 321.

If the own digital camera further takes image C, taken image C is displayed in the rightmost area of the own in the log display area 321, image A and image B being displayed to the left side of image C in this order in the log display area 321.

In this case, the image taken last is displayed larger than the previous image or images displayed in the mate or own area in the log display area 321.

Figure 27:
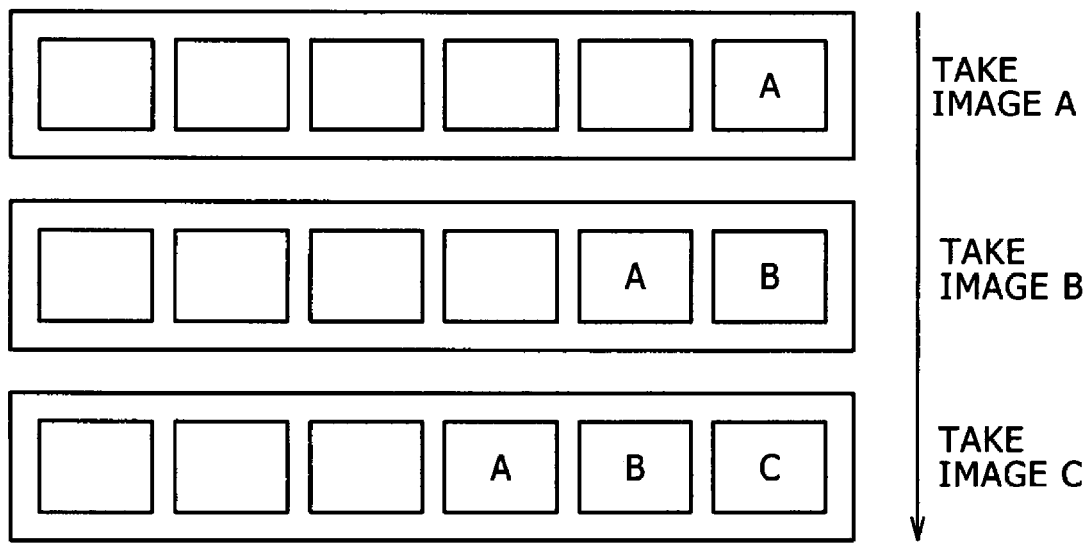
FIG. 27 is a diagram illustrating another log display area.

It should be noted that, as shown in FIG. 27, the image taken last may be displayed in the same size as the previously taken image or images displayed in the mate or own area in the log display area 321.

Figure 28:
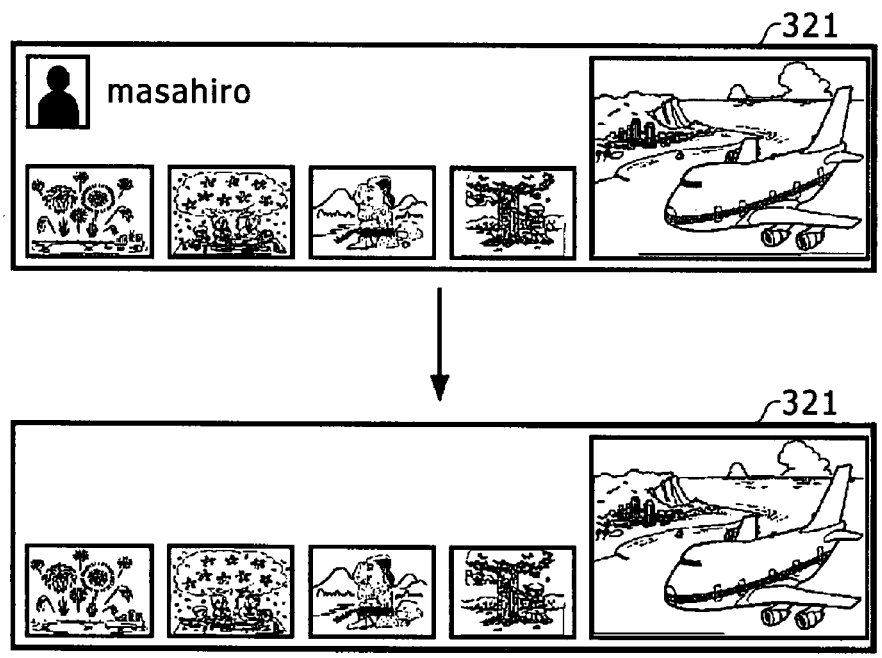
FIG. 28 is a diagram illustrating images to be displayed when the communication mate disconnects the network connection.

As shown in FIG. 28, if the mate executes the processing of disconnecting the network 2 or if the mate moves away too much to keep the connection via the network 2, the name of the mate is deleted from the log display area 321 without display any error message.

For example, if the mate having name "masahiro" shown in the log display area 321 executes the processing of disconnecting the network 2 or the connection with this mate via the network 2 is disconnected, name "masahiro" disappears from the log display area 321.

This setup allows the user to instantly know the connection status of the mate interconnected in the image taking-time photo exchange mode. Since no error message is displayed, an image taking operation can be made without being distracted thereby.

It is also practicable, in the image taking-time photo exchange mode, for the server side or the client side to select images to be provided or acquired. Further, it is practicable to provide the thumbnail images without providing the images represented by the thumbnail images. Likewise, the user may acquire the thumbnail images without acquiring the taken original images. It is practicable for the user to select, after the acquisition of thumbnail images, the acquisition of the images represented by these thumbnail images.

As described above, in the image taking-time photo exchange mode, a plurality of digital cameras can take pictures of a same event (such as a festival or a show, for example) or a same subject and then share the taken images. Since images taken by the digital camera owned by a mate can be shared between the own and mate cameras via the network 2 on site, the labor and time for sharing images after the event by use of a mass storage, for example, can be eliminated.

The following describes the browse-time photo exchange mode. In the browse-time photo exchange mode, the digital camera 1 operates as a server and, at the same time, as a client. The digital camera 1-1 in the browse-time photo exchange mode and the digital camera 1-2 in the browse-time photo exchange mode interconnected via the network 2 each operate as a server or a client.

The operation mode of the digital camera 1 as a server in the browse-time photo exchange mode is also referred to as an image publicize mode. The operation mode of the digital camera 1 as a client is also referred to as an image acquire mode. It should be noted that, in the browse-time photo exchange mode, if the digital camera 1 is in the image publicize mode, the processing as a client is still executed in the background and, if the digital camera 1 is in the image acquire mode, the processing as a server is still executed in the background.

The digital camera 1 in the image publicize mode publicizes an image selected by the user to another digital camera 1 that is the client in the image acquire mode connected via the network 2 at the time that image has been selected by the user. The digital camera 1 that is the client in the image acquire mode acquires the image list publicized by the digital camera 1 that is the server in the image publicize mode connected via the network 2 and a thumbnail image of the publicized image, thereby displaying the acquired thumbnail image. Then, when the displayed thumbnail image is selected by the user, the digital camera 1 that is the client in the image acquire mode acquires the image represented by the selected thumbnail image, namely, the publicized image, and records the acquired image.

In the browse-time photo exchange mode, a plurality of digital cameras 1 exchange and share images in accordance with the DLNA standard, for example. In the browse-time photo exchange mode, no devices other than the digital cameras 1 are necessary for exchanging and sharing images in the browse-time photo exchange mode.

Figure 29:
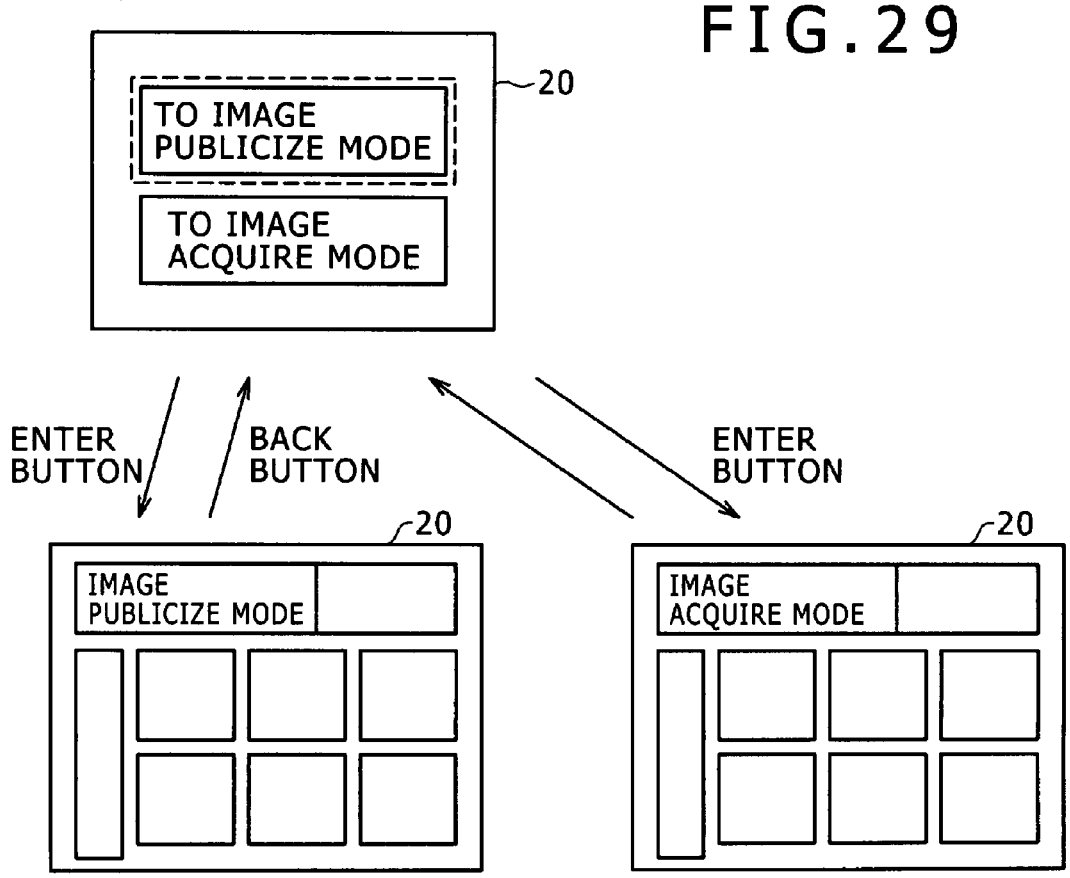
FIG. 29 is a diagram illustrating an operation for selection between an image publicize mode and an image acquire mode.
Figure 30:
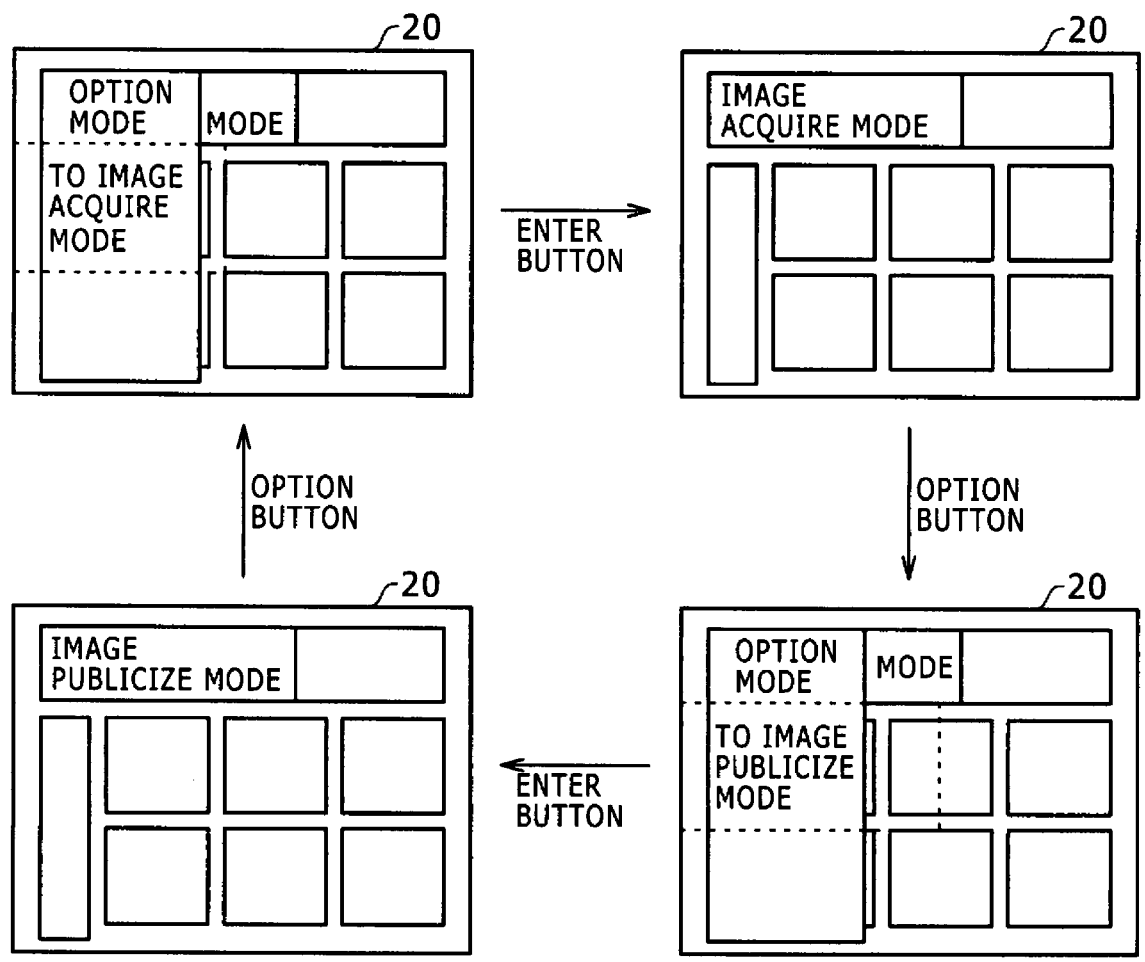
FIG. 30 is a diagram illustrating another operation for selection between an image publicize mode and an image acquire mode.

As shown in FIGS. 29 and 30, each digital camera 1 in the browse-time photo exchange mode operates and is operated by the user in the image publicize mode or the image acquire mode, namely, as the server or the client.

As shown in FIG. 29, in the browse-time photo exchange mode, a button for selecting the image publicize mode and a button for selecting the image acquire mode are displayed on the LCD 20 of the digital camera 1. When the button for selecting the image publicize mode is selected and the enter button of the manual operation button 19 is pressed, the digital camera 1 changes to the image publicize mode, upon which an image of the image publicize mode is displayed on the LCD 20. When a back button (or a return button) of the manual operation button 19 is pressed in the image publicize mode, the button for selecting the image publicize mode and the button for selecting the image acquire mode are displayed on the LCD 20 again.

When the button for selecting the image acquire mode is selected and the enter button of the manual operation button 19 is pressed, the digital camera 1 acquires into the image acquire mode, upon which an image of the image acquire mode is displayed on the LCD 20. When a back button (or a return button) of the manual operation button 19 is pressed in the image acquire mode, the button for selecting the image publicize mode and the button for selecting the image acquire mode are displayed on the LCD 20 again.

As shown in FIG. 30, in the browse-time photo exchange mode, if the digital camera 1 is in the image publicize mode, pressing the option button 22 displays an option menu arranged with a command for specifying a transition to the image acquire mode onto the LCD 20. When the command for specifying a transition to the image acquire mode is selected and the enter button of the manual operation button 19 is pressed, the digital camera 1 changes to the image acquire mode, upon which the image of the image acquire mode is displayed on the LCD 20.

In the browse-time photo exchange mode, if the digital camera 1 is in the image acquire mode, pressing the option button 22 displays an option menu arranged with a command for specifying a transition to the image publicize mode onto the LCD 20. When the command for specifying a transition to the image publicize mode is selected and the enter button of the manual operation button 19 is pressed, the digital camera 1 acquires into the image publicize mode, upon which the image of the image publicize mode is displayed on the LCD 20.

Figure 31:
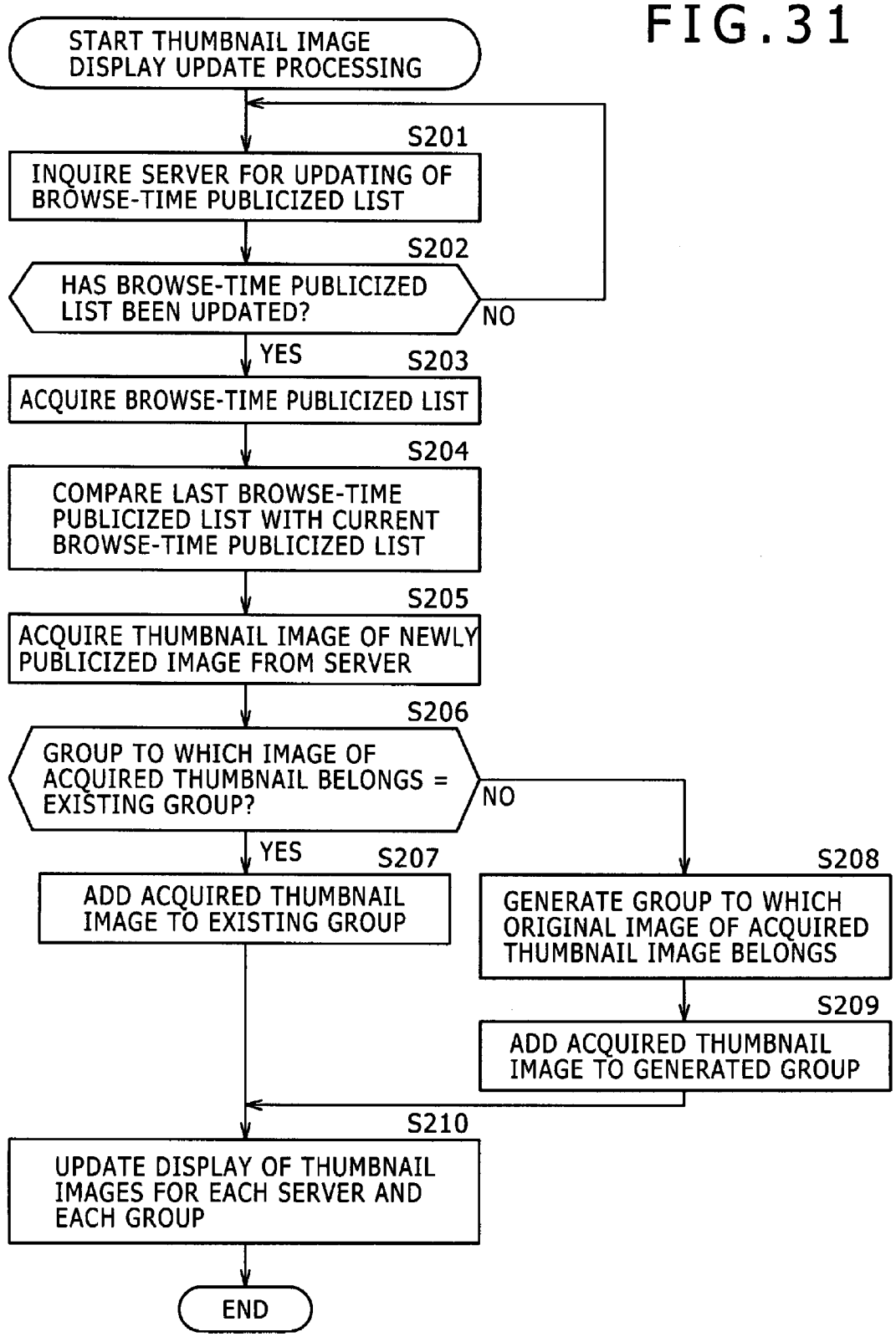
FIG. 31 is a flowchart indicative of processing for updating thumbnail image display.

FIG. 31 shows a flowchart indicative of the processing of updating the display of thumbnail images by the digital camera 1-1 that is the client in the browse-time photo exchange mode. In step S201, the browse-time publicized list acquire section 181 of the browse-time photo exchange object 124 inquires the digital camera 1-2 that is the server via the network 2 for the updating of a browse-time publicized list.

For example, the browse-time publicized list is configured so as to be read in accordance with the DLNA standard.

FIG. 32 shows an exemplary browse-time publicized list. The browse-time publicized list contains, in correspondence with each content ID for identifying a predetermined image to be provided to the mate of connection, an address in the recording media 60 at which the image to be provided to the mate is located, an address in the recording media 60 at which a thumbnail image representing that image is located, and the information about the encoding algorithm for that image. Also the browse-time publicized list contains, in correspondence with each group ID for identifying a group in which images are classified, the name of the group identified by that group ID and a content ID of an image classified into the group identified by that group ID.

In the example of the browse-time publicized list shown in FIG. 32, each address is described by a file name of a file in which taken images or thumbnail images thereof are stored and a so-called path indicated by the folder in which that file is stored.

For example, in the example of the browse-time publicized list shown in FIG. 32, there are arranged, for content ID 00001, a path (or an address) that is xxxxx/xxxxxx/xxxxxxxxx.jpg at which a thumbnail image is stored, a path (or an address) that is xxxxxxx/xxxxxxx/xxxxxxxxx.jpg at which an image to be provided to the mate of connection is stored, and the information ("image type") about the encoding algorithm of the image that is xxxxxxxx. In addition, in the example of the browse-time publicized list shown in FIG. 32, there are arranged, for content ID 00002, a path (or an address) that is yyyyy/yyyyyy/yyyyyyyyy.jpg at which a thumbnail image is stored, a path (or an address) that is yyyyyyy/yyyyyyy/yyyyyyyyy.jpg at which an image to be provided to the mate of connection is stored, and the information ("image type") about the encoding algorithm of the image that is yyyyyyyy. For content ID that is 00003, a path (or an address) that is zzzzz/zzzzzz/zzzzzzzzz.jpg at which a thumbnail image is stored, a path (or an address) that is zzzzzzz/zzzzzzz/zzzzzzzzz.jpg at which an image to be provided to the mate of connection is stored, and the information ("image type") about the encoding algorithm of the image that is zzzzzzzz.

For example, in the example of the browse-time publicized list shown in FIG. 32, a group name that is XXXXXXXXXX, a content ID that is 00001, a content ID that is 0002, and a content ID that is 0003 are arranged for the group ID that is 0001. In this case, an image identified by the content ID that is 00001, an image identified by the content ID that is 0002, or an image identified by the content ID that is 0003 belongs to a group whose name is xxxxxxxxxx identified by the group ID that is 0001.

In the browse-time publicized list shown in FIG. 32, the name of a group that is AAAAAAAAAA and the content ID that is 00001 are arranged for each group ID that is 0002. In this case, an image identified by the content ID that is 00001 belongs to a group whose name is AAAAAAAAAA identified by the group ID that is 0002.

When the browse-time publicized list acquire section 181 inquires the digital camera 1-2 that is the server via the network 2 for the updating of the browse-time publicized list, the digital camera 1-2 that is the server sends a response indicative whether or not the browse-time publicized list has been updated to the digital camera 1-1 that is the client via the network 2. Then, the browse-time publicized list acquire section 181 acquires the response indicative whether or not the browse-time publicized list has been updated from the 1-network 2 that is the server.

In step S202, on the basis of the response indicative of whether or not the browse-time publicized list has been updated received from the digital camera 1-2 that is the server, the browse-time publicized list acquire section 181 determines whether or not the browse-time publicized list has been updated. If the browse-time publicized list is found not updated in step S202, then it indicates that there is no necessity for updating the displaying of thumbnail images, so that the procedure returns to step S201 to repeat the above-mentioned processing therefrom.

If the browse-time publicized list is found updated in step S202, then the procedure goes to step S203, in which the browse-time publicized list acquire section 181 acquires the browse-time publicized list from the digital camera 1-2 that is the server via the network 2.

For example, the browse-time publicized list acquire section 181 reads, via the network 2, the browse-time publicized list from an address in the storage space of the digital camera 1-2 that is the server, this address being predetermined for storing the browse-time publicized list, thereby acquiring the browse-time publicized list. To be more specific, the browse-time publicized list acquire section 181 instructs the communication driver 103 to read the browse-time publicized list. In response, the communication driver 103 causes the communication I/F 49 to read the browse-time publicized list from an address in the storage space of the digital camera 1-2 that is the server at which the browse-time publicized list is stored. Then, the communication driver 103 supplies the retrieved browse-time publicized list to the browse-time publicized list acquire section 181.

It is also practicable that the browse-time publicized list acquire section 181 requests the digital camera 1-2 that is the server for the transmission of the browse-time publicized list via the network 2, and the digital camera 1-2 that is the server transmits the requested browse-time publicized list to the digital camera 1-1 via the network 2. The browse-time publicized list acquire section 181 causes the communication driver 103 and the communication I/F 49 to receive the browse-time publicized list, thereby acquiring the browse-time publicized list.

In step S204, the thumbnail image acquire section 182 of the browse-time photo exchange object 124 compares the browse-time publicized list acquired the last time with the browse-time publicized list acquired this time. For each content ID found newly added to the browse-time publicized list acquired this time, the thumbnail image acquire section 182 extracts, from the browse-time publicized list acquired this time, an address at which a newly publicized image is stored, an address at which a thumbnail image of the newly publicized image is stored, a group ID for identifying a group to which the newly publicized image belongs, and a name of that group arranged in the browse-time publicized list and identified by the newly added content ID.

In step S205, the thumbnail image acquire section 182 acquires the thumbnail image of the newly publicized image from the digital camera 1-2 that is the server via the network 2.

For example, thumbnail image acquire section 182 reads a thumbnail image from an address in the storage space of the digital camera 1-2 that is the server at which the thumbnail image of a newly publicized image is stored to acquire the thumbnail image of the newly publicized image via the network 2. To be more specific, the thumbnail image acquire section 182 instructs the communication driver 103 to read a thumbnail image from an address at which the thumbnail image of a newly publicized image is stored. The communication driver 103 causes the communication I/F 49 to read the specified thumbnail image from the address in the storage space of the digital camera 1-2 that is the server at which the thumbnail image of the newly publicized image is stored, via the network 2. The communication driver 103 supplies the retrieved thumbnail image to the thumbnail image acquire section 182.

It is also practicable that the thumbnail image acquire section 182 specifies, via the network 2, an address in the storage space of the digital camera 1-2 that is the server to request the digital camera 1-2 that is the server for the transmission of a thumbnail image, the digital camera 1-2 that is the server transmits the specified thumbnail image to the digital camera 1-1 via the network 2. The thumbnail image acquire section 182 causes the communication driver 103 and the communication I/F 49 to receive the supplied thumbnail image, thereby acquiring the thumbnail image.

In step S206, the classification section 186 of the browse-time photo exchange object 124 determines by the group ID for identifying a group to which the newly publicized image extracted in step S204 belongs whether the group to which the image represented by the retrieved thumbnail image belongs is an existing group.

If the group to which the image of the retrieved thumbnail belongs is found to be an existing group, then the procedure goes to step S207, in which the classification section 186 adds the thumbnail image acquired in step S205 to the existing group identified by the group ID extracted in step S204, upon which the procedure goes to step S210. For example, the classification section 186 arranges the content ID for identifying the original image of the acquired thumbnail image and the extracted group ID that is the group ID for identifying an existing group ID in correspondence with each other into a group list. In the group list, the content ID for image identification and the group ID for identifying a group to which the image identified by that content ID are arranged in correspondence with each other, thereby adding the retrieved thumbnail image to the existing group.

For example, the classification section 186 stores a thumbnail image into the folder having the same name as the name of the group identified by the extracted group ID, thereby adding the thumbnail to the existing group.

On the other hand, if the group to which the image represented by the acquired thumbnail image belongs is found not to be an existing group, then the procedure goes to step S208, in which the classification section 186 generates a group to which the image represented by the acquired thumbnail belongs. For example, in step S208, the classification section 186 arranges the extracted group ID into the group list in which the content ID for identifying an image and the group ID for identifying the group to which the image identified by that content ID are arranged in correspondence with each other, thereby generating the group to which the image represented by the acquired thumbnail belongs. It should be noted that the group ID and the name of the group identified by that group ID are arranged in correspondence with each other.

For example, the classification section 186 may generate a folder having the same name as the name of the group identified by the extracted group name, thereby generating the group to which the image represented by the acquired thumbnail image belongs.

In step S209, the classification section 186 adds the thumbnail image acquired in step S205 to the group generated in step S208, upon which the procedure goes to step S210. For example, the classification section 186 arranges the group ID newly arranged in step S208 and the content ID for identifying the image represented by the acquired thumbnail image into the group list in correspondence with each other, thereby adding the generating thumbnail image to the generated group.

For example, the classification section 186 stores each thumbnail image into a folder having the same name as the name of the group identified by the extracted group ID generated in step S209, thereby adding the acquired thumbnail image to the generated group.

In step S210, the display control section 183 of the browse-time photo exchange object 124 updates the display, on the LCD 20, of thumbnails for each server and each group, upon which the processing comes to an end.

Figure 33:
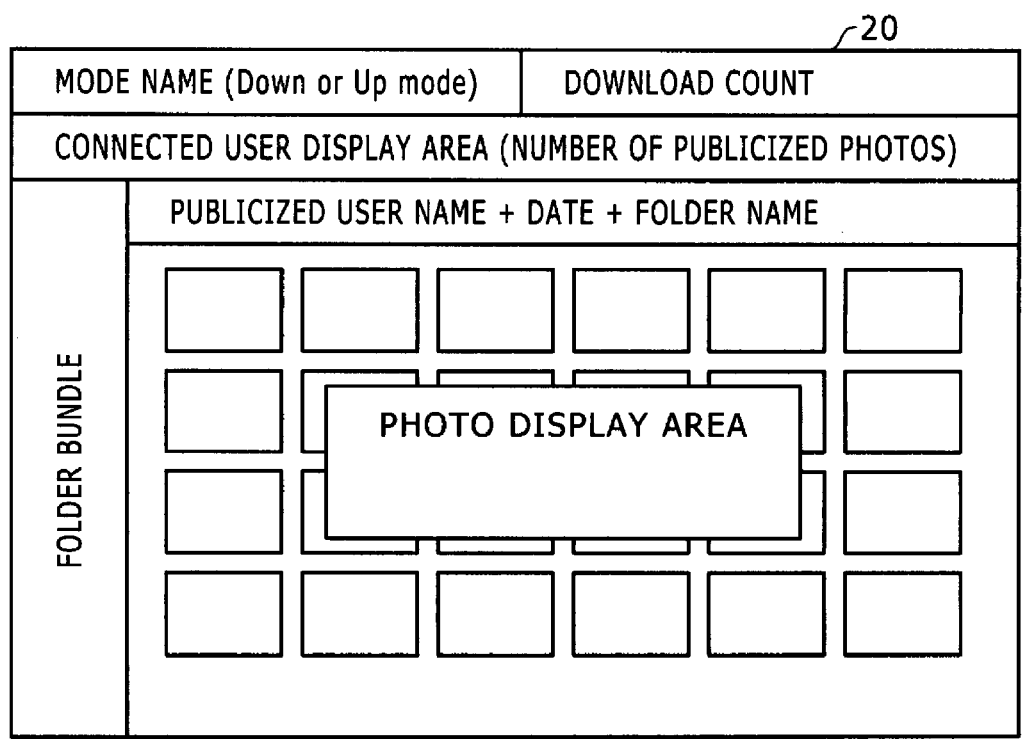
FIG. 33 is a diagram illustrating an exemplary screen for displaying thumbnail images in the browse-time photo exchange mode.

FIG. 33 shows an exemplary screen for displaying thumbnail images in the browse-time photo exchange mode. In displaying thumbnail images in the browse-time photo exchange mode, the display screen of the LCD 20 displays an area for displaying a mode name indicative of one of the names of the image acquire mode and the image publicize mode, an area for displaying the number of received thumbnails and the number of received images, an area for displaying the name of each mate of connection, and an area for displaying thumbnail images. The area for displaying the name of each mate of connection displays the number of images publicized for each mate (or the number of images permitted for provision) in correspondence with the name of each mate.

In the image acquire mode, the area for displaying thumbnail images displays the thumbnail images as bundled for each server and each group, namely, for each mate of communication and each group. At this moment, an image indicative of this bundling is shown to the left side of the displayed bundled thumbnail images. The image indicative of the bundling is similar to an image indicative of the bundling of folders, for example. The thumbnail images representing the images bundled (or classified) into one group are displayed as if these thumbnail images were stored in a virtual folder related with that group.

Above the bundle of thumbnail images for each mate and each group in the area for displaying thumbnail images, the name of mate, the date and time at which image taking was made, and the name of group (or folder) are shown.

For example, if a user called "John" classifies (or stores) his photograph (or image) into a group (or a folder) named "2005.11.29-family_travel", then, when the photograph (or image) classified (or stored) in that group (or folder) is publicized (or made public), the LCD 20 of the digital camera 1 of another user connected to the digital camera 1 owned by "John" displays the name of mate and a corresponding thumbnail image acquired from the digital camera 1 of "John" like "John-2005.11.29-family_travel" as the group (folder) name of the group (folder) in which the thumbnail image is classified (or stored).

Figure 34:
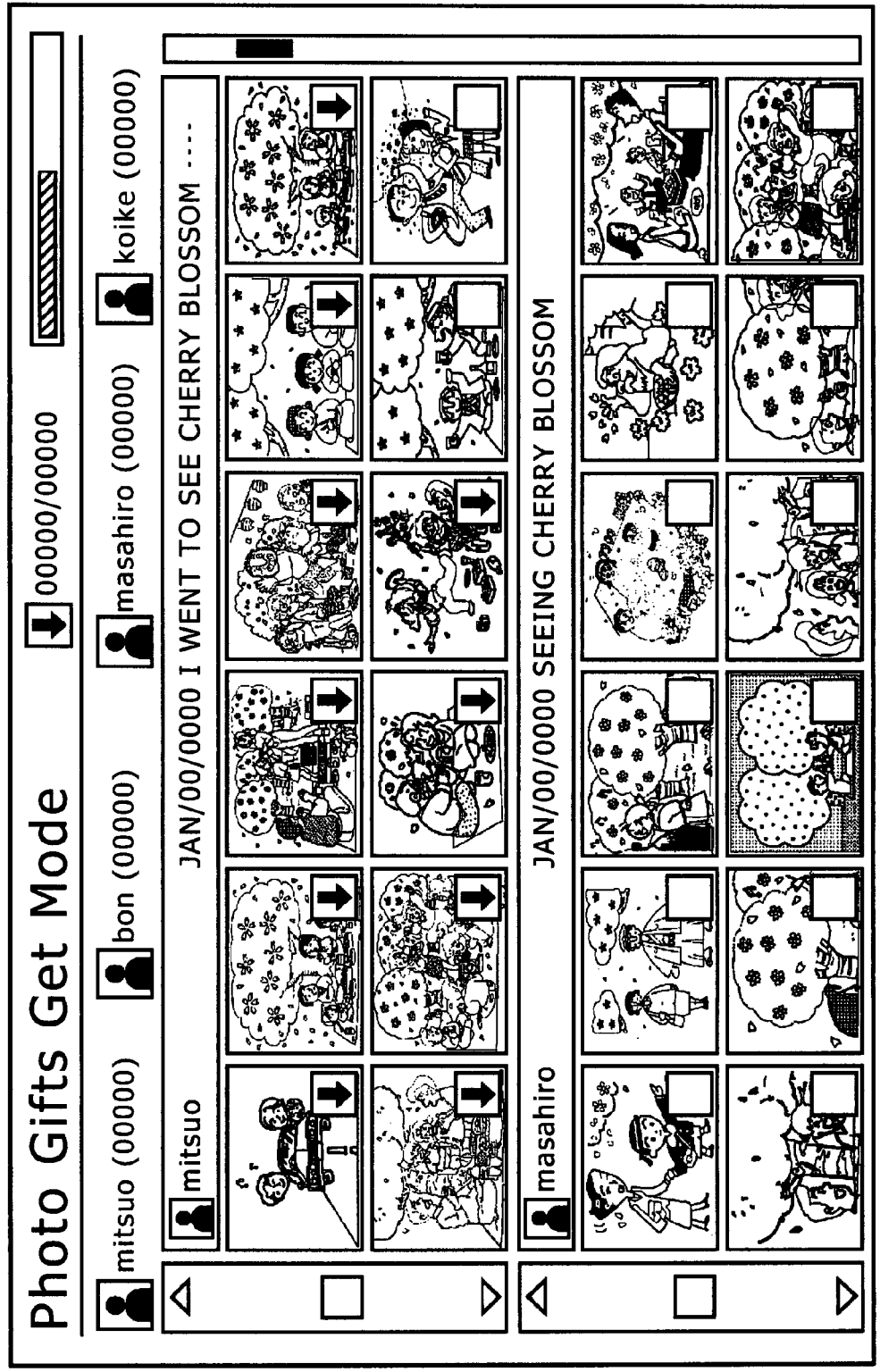
FIG. 34 is a diagram illustrating a specific example of a screen for displaying thumbnail images in the image acquire mode.

FIG. 34 shows a specific example of a screen in which thumbnail images in the image acquire mode are displayed. In the example shown in FIG. 34, an area for displaying the mode name shows mode name "Photo Gifts Get Mode" indicative of the image acquire mode. In the example shown in FIG. 34, an area in which the number of received thumbnail images and the number of received images shows the number of received thumbnails, the number of received images, and a bar graph indicative of a ratio of the number of received images to the number of received thumbnail images.

In the example shown in FIG. 34, an area for displaying the names of mate shows "mitsuo", "bon", "masahiro", and "koike".

In the example shown in FIG. 34, an area for displaying thumbnails shows a group of thumbnail images as bundled by the server named "mitsuo" and group "I went to see cherry blossom" and another group of thumbnail images as bundled by the server named "masahiro" and group "Seeing cherry blossom".

The display sequence of groups in the thumbnail image display area is a sequence in which groups are added by the updating of the browse-time publicized list.

For example, if a thumbnail image is added to the group generated in step S208, then the display control section 183 of the browse-time photo exchange object 124 bundles, in step S210, the thumbnail images by the generated group below another thumbnail image group in the thumbnail image display area.

If a thumbnail image is added to an existing group in step S207, then the display control section 183 of the browse-time photo exchange object 124 displays the thumbnail image so as to be added that existing group.

It should be noted that the thumbnail images may be sorted by server name or group name to display the thumbnail images in the order of sorting.

Each image arranged to the left of a group of thumbnail images, which is arranged with upward and downward triangle buttons around a check box, is indicative of a bundle of thumbnail images. When the upward triangle button is clicked through the operation section 46, the bundled thumbnail images (or the group of thumbnail images) are scrolled up; when the downward triangle button is clicked through the operation section 46, the bundled thumbnail images are scrolled down.

In the example shown in FIG. 34, a scroll bar at the right end of the thumbnail display area is operated to scroll the displayed thumbnail images on a bundle basis. When this scroll bar is moved upward, the bundle of thumbnail images moves down in the thumbnail image display area and the upper bundle of thumbnail images appears in this area; when the scroll bar is moved downward, the bundle of thumbnail images moves up and the lower bundle of thumbnail images appears in this area.

In the example shown in FIG. 34, the check box attached to each thumbnail image is used to specify the reception (or acquisition) of the image represented by that thumbnail image or indicative of a status of reception (or acquisition) of that image. This check box will be detailed later.

Figure 35:
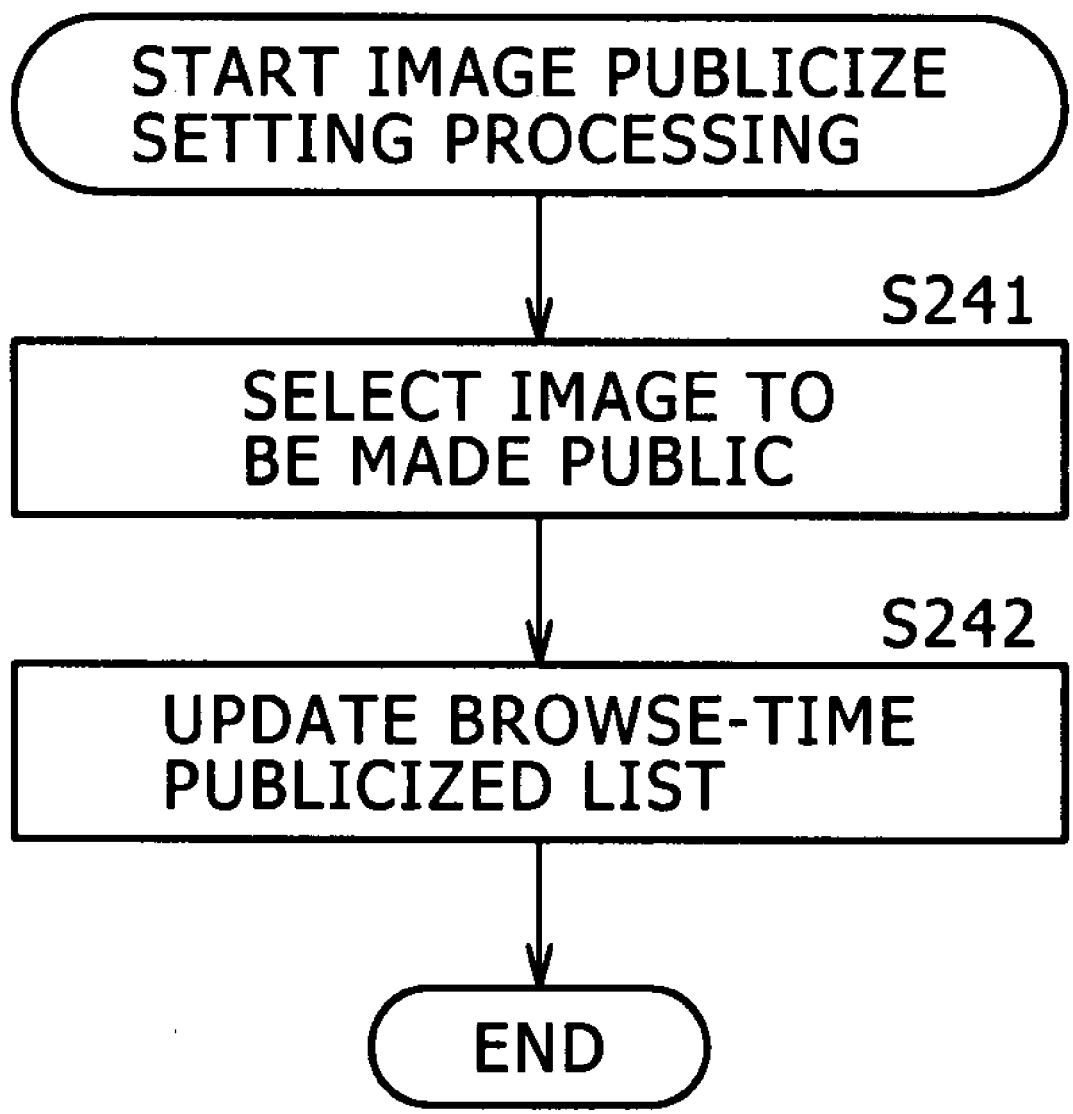
FIG. 35 is a flowchart indicative of processing to be executed by image publicize setting.

FIG. 35 shows a flowchart indicative of the processing of setting for making images public by the digital camera 1-1 that is the server in the browse-time photo exchange mode. In step S241, the selection section 184 of the browse-time photo exchange object 124 selects an image to be made public.

Figure 36:
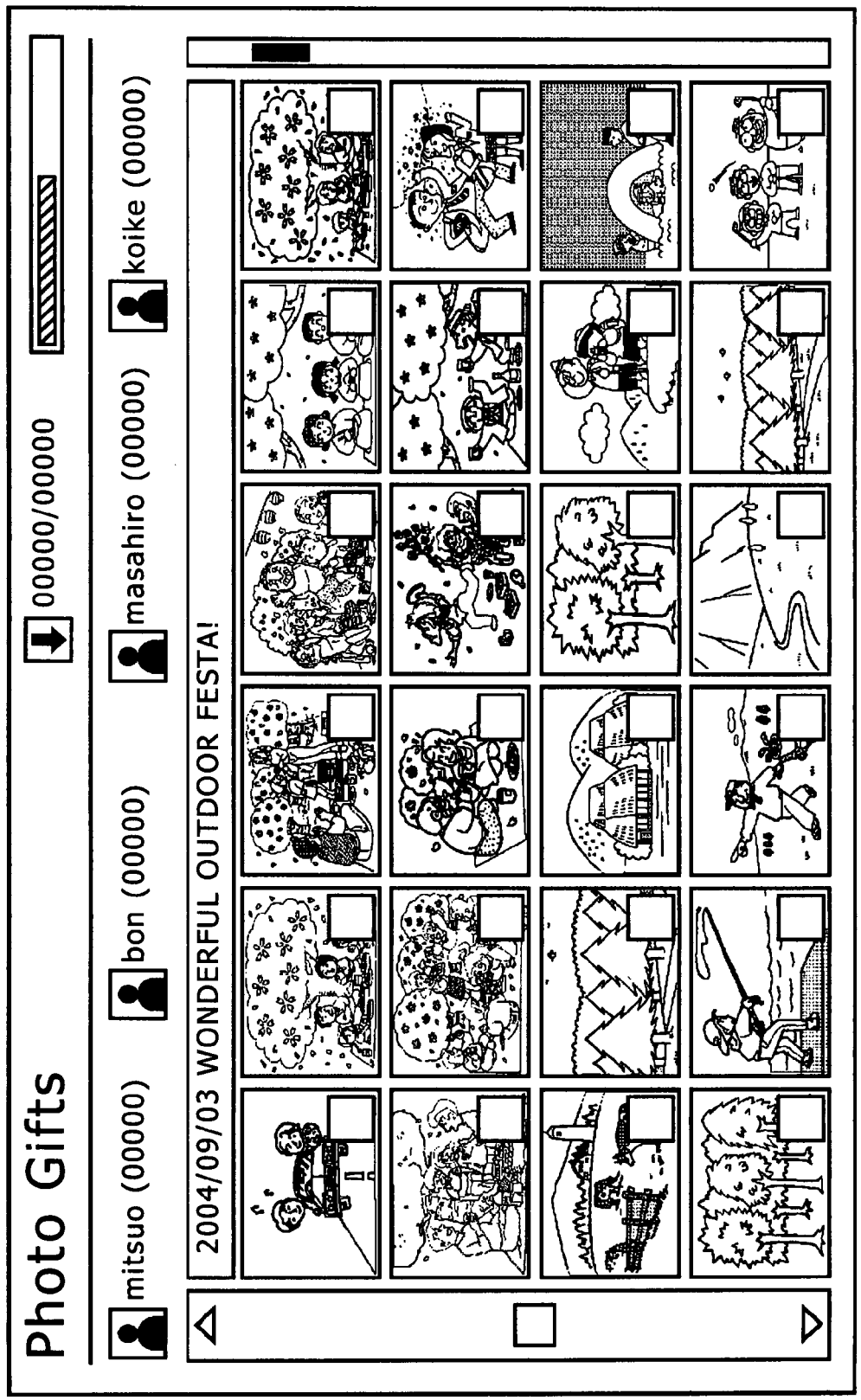
FIG. 36 is a diagram illustrating a specific example of a screen for displaying thumbnail images in the image publicize mode.

FIG. 36 shows a specific example of a screen for displaying thumbnail images in the image publicize mode. In the example shown in FIG. 36, a mode name display area shows mode name "Photo Gifts" indicative of the image publicize mode. In the example shown in FIG. 36, the area showing the number of received thumbnail images and the number received images shows numbers indicative of the thumbnail images and the images received in the processing as the client being executed in the background. Also shown is a bar graph indicative of a ratio of the number of received images to the number of thumbnail images.

In the example shown in FIG. 36, the area for showing the names of mates shows "mitsuo", "bon", "masahiro", and "koike".

In the example shown in FIG. 36, the thumbnail image display area shows thumbnail images bundled by a group "Wonderful Outdoor Festa!".

In the example shown in FIG. 36, each image arranged to the left of a group of thumbnail images, which is arranged with upward and downward triangle buttons around a check box, is indicative of a bundle of thumbnail images. When the upward triangle button is clicked through the operation section 46, the bundled thumbnail images (or the group of thumbnail images) are scrolled up; when the downward triangle button is clicked through the operation section 46, the bundled thumbnail images are scrolled down.

In the example shown in FIG. 36, a scroll bar at the right end of the thumbnail display area is operated to scroll the displayed thumbnail images on a bundle basis. When this scroll bar is moved upward, the bundle of thumbnail images moves down in the thumbnail image display area and the upper bundle of thumbnail images appears in this area; when the scroll bar is moved downward, the bundle of thumbnail images moves up and the lower bundle of thumbnail images appears in this area.

In the example shown in FIG. 36, each thumbnail image is attached with a check box.

As shown in FIG. 37, if the check box of a thumbnail image is not checked, the image represented by the unchecked thumbnail image will not be made public. Checking the check box makes public the image represented by the checked thumbnail image.

Rechecking the checked thumbnail image cancels the publicizing of the image represented by the rechecked thumbnail image.

Referring to FIG. 35 again, in step S241, the selection section 184 of the browse-time photo exchange object 124 selects the image represented by the checked thumbnail image that is made public, for example.

In step S242, the browse-time publicized list generation & update section 187 of the browse-time photo exchange object 124 updates the browse-time publicized list, upon which the processing comes to an end. For example, in step S242, the browse-time publicized list generation & update section 187 arranges the content ID for identifying the image selected in step S241, the address at which that image is stored, the address at which the thumbnail image of that image is stored, and the information indicative of the encoding algorithm of that image so as to be added to the browse-time publicized list. In this case, the browse-time publicized list generation & update section 187 further adds the group ID for identifying a group into which the image selected in step S241 is classified to the browse-time publicized list in correspondence with the content ID for specifying that image.

It should be noted that if there has been publicized no image and an image is to be newly made public, then the browse-time publicized list generation & update section 187 generates, in step S242, a browse-time publicized list in which the content ID for specifying the image selected in step S241, the address at which that image is stored, the address at which the thumbnail image of that image is stored, and the information about the encoding algorithm of that image are arranged.

As described above, in the image publicize mode, setting an image to the publicize mode generates or updates a browse-time publicized list, thereby allowing another digital camera 1 that is a client to acquire the image set to the publicize mode.

The following describes the acquisition of an image represented by a thumbnail image.

Figure 38:
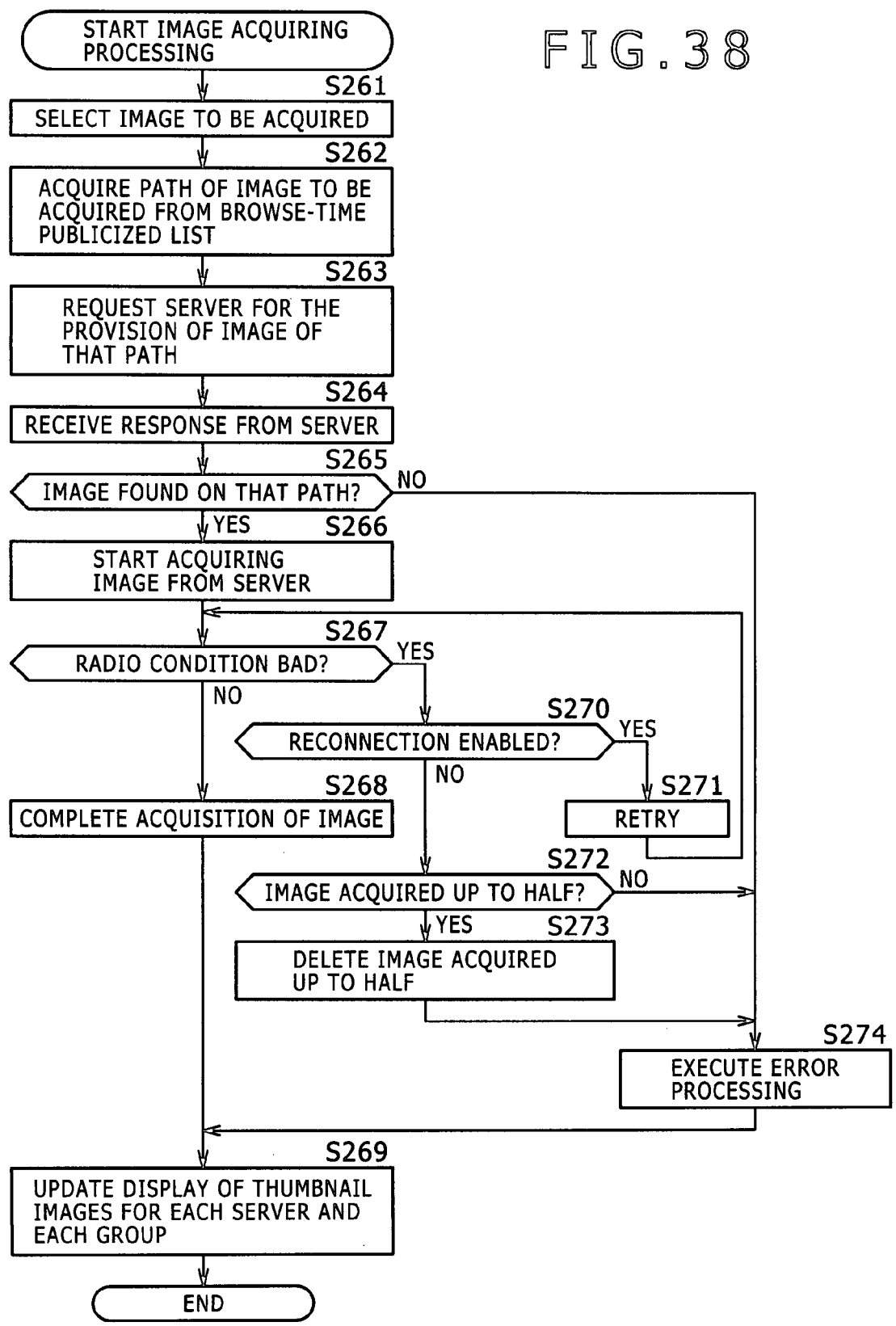
FIG. 38 is a flowchart indicative of image acquiring processing.

FIG. 38 shows a flowchart indicative of the processing for acquiring an image by the digital camera 1-1 that is the client. In step S261, the selection section 184 of the browse-time photo exchange object 124 selects an image to be acquired. For example, in step S261, the selection section 184 selects the image represented by a checked thumbnail image in the image acquire mode, as the image to be acquired.

Figure 39:
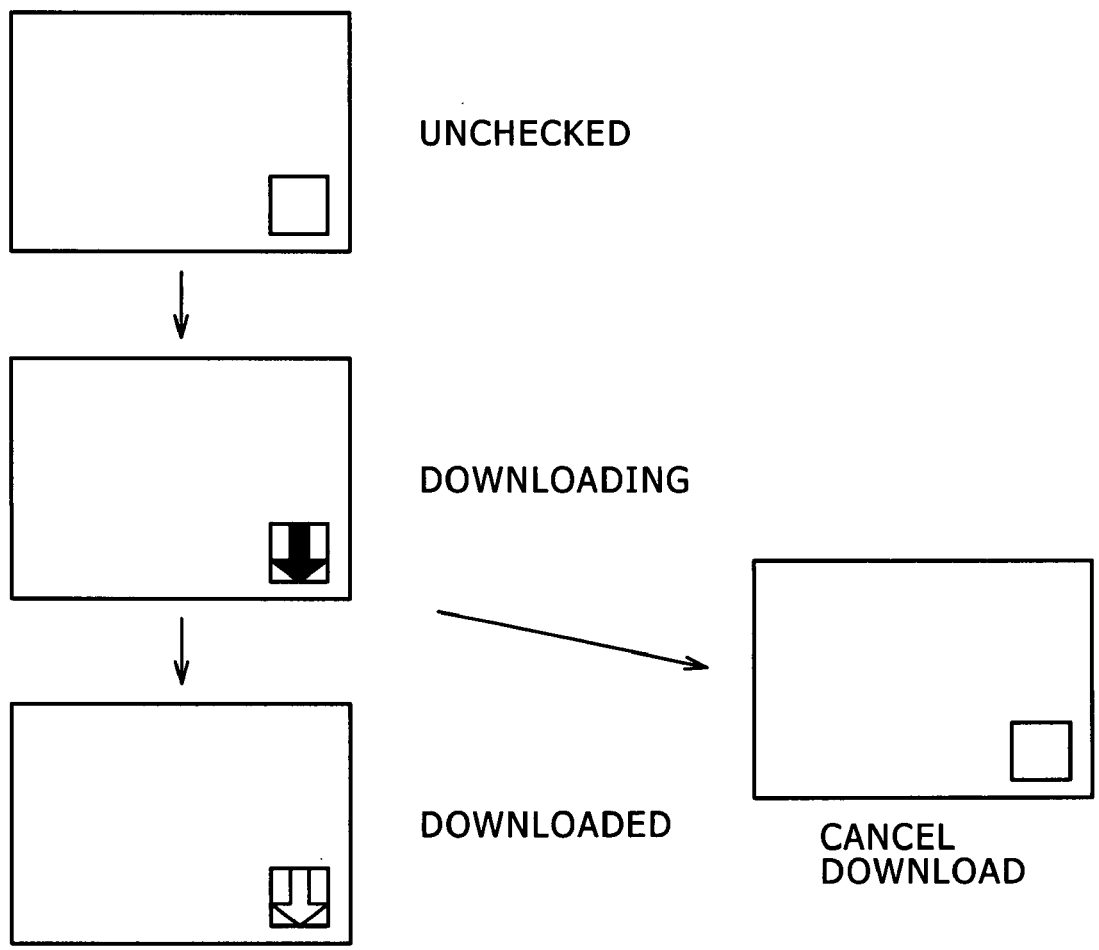
FIG. 39 is a diagram illustrating check boxes of thumbnail images in the image acquire mode.

As shown in FIG. 39, if the check box of the thumbnail image in the image acquire mode is not checked in the browse-time photo exchange mode, then the digital camera 1-1 that is the client does not select the image represented by the unchecked thumbnail image as the image to be selected, thereby not acquiring the image represented by the thumbnail from the digital camera 1-2 that is the server.

In contrast, if the check box of a thumbnail image in the image acquire mode is checked in the browse-time photo exchange mode, then the digital camera 1-1 that is the client selects the image represented by the checked thumbnail image as the image to be acquired, thereby acquiring that image represented by the checked thumbnail image from the digital camera 1-2 that is the server.

In step S262, the image acquire section 185 acquires, from the browse-time publicized list, the path of the image to be acquired. For example, in step S262, the image acquire section 185 acquires, from the browse-time publicized list, the path of the image that is one example of the address at which the image represented by the checked thumbnail image is stored.

It should be noted that the browse-time publicized list has already been acquired in step S203.

In step S263, the image acquire section 185 requests the digital camera 1-2 via the network 2 for the provision of the image of that path. In step S264, the image acquire section 185 causes the communication driver 103 and the communication I/F 49 to receive a response from the digital camera 1-2 that is the server via the network 2.

In step S265, the image acquire section 185 determines from the response received from the digital camera 1-2 that is the server whether the image exists on that path. If the image is found existing on that path in step S265, then the procedure goes to step S266, in which the image acquire section 185 starts acquiring the image from the digital camera 1-2 that is the server via the network 2.

While the digital camera 1-1 that is the client is acquiring (or downloading) the image represented by the thumbnail image from the digital camera 1-2 that is the server via the network 2, a check (an arrow, to be more specific) is shown in the check box of the thumbnail image. This allows the user of the digital camera 1-1 that is the client to know that the image represented by that thumbnail image is being downloaded.

In step S267, the image acquire section 185 determines on the basis of the information supplied from the communication driver 103 whether the condition of radio (or electromagnetic wave), or the transmission media of the network 2, is good or bad. If the condition of radio is found good in step S267, then the acquisition of the image from the digital camera 1-2 that is the server is continued via the network 2. When the image has been received in its entirety in step S268, then the image acquire section 185 records the fully received image to the recording media 60. At the same time, the classification section 186 classifies the acquired image into a group classified by adding the thumbnail image of that image in steps S207 and S209.

In step S269, the display control section 183 updates the display of the thumbnail images for each server and each group, upon which the processing comes to an end.

When the acquisition of the image represented by the thumbnail has been completed, an arrow having a color different from that of the arrow indicative of downloading is shown in the check box of the thumbnail image. This allows the user of the digital camera 1-1 that is the client to know that the downloading of the image represented by the thumbnail image has been completed.

If the condition of radio is found to be bad due to network disconnection for example in step S267, then the procedure goes to step S270, in which the image acquire section 185 determines on the basis of the information supplied from the communication driver 103 whether reconnection can be made via the network 2. If reconnection is found to be enabled in step S270, then the procedure goes to step S271, in which the image acquire section 185 causes the communication driver 103 and the communication I/F 49 to make reconnection via the network 2 to retry the acquisition of the image represented by the thumbnail image, upon which the procedure returns to step S267 to repeat the above-mentioned processing therefrom.

On the other hand, if reconnection is found to be disabled in step S270, then the procedure goes to step S272, in which the image acquire section 185 determines whether the image has been acquired halfway. If the image is found to have been acquired halfway in step S272, then the procedure goes to step S273, in which the image acquire section 185 deletes the image acquired halfway. In step S274, the image acquire section 185 and the display control section 183 execute error processing, such as displaying an error message on the LCD 20, for example, upon which the procedure goes to step S269.

If the image is found to have been not acquired halfway in step S272, then step S273 is skipped and the procedure goes to step S274, in which the processing corresponding the error is executed.

As described above, the image represented by a thumbnail image is acquired.

It should be noted that rechecking a checked thumbnail image cancels the acquisition of the image represented by the rechecked thumbnail image. In this case, as shown in FIG. 39, the arrow shown in the check box disappears. Checking the check box from which the arrow has disappeared acquires the image represented by the thumbnail image of which checked box is thus checked.

If the end of the browse-time photo exchange mode is specified at the client or the server while the acquisition of an image by the client from the server is being executed, a screen is displayed on each of the client and the server asking the user whether or not to really disconnect. If the user clicks "Disconnect" button or "Cancel" button or issues a command to that effect, then the acquisition of the image is discontinued or continued.

As described above, images to be acquired from the server can be selected one by one. It is also practicable to select, on a bulk basis, the images to be acquired for each bundle of thumbnail images.

Figure 40:
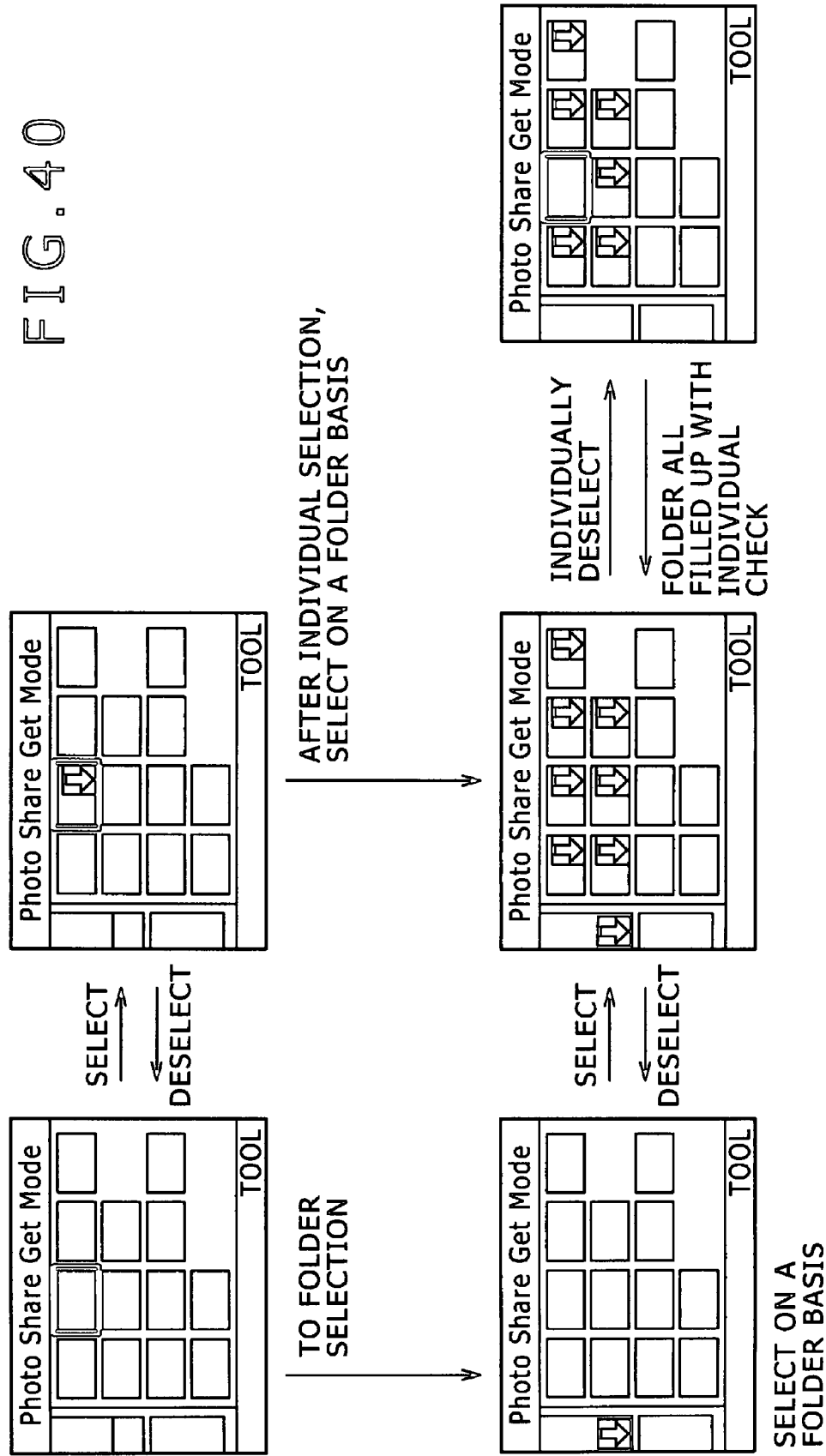
FIG. 40 is a diagram illustrating selection of thumbnail images in a lump manner.

As shown in FIG. 40, checking check box at the center of the image indicative of a bundle of thumbnail images arranged to the left side thereof checks all the thumbnail images in that bundle, thereby acquiring the images represented by these checked thumbnail images in a batch.

It should be noted that, if the check box of any of the bundled thumbnail images is checked, checking check box at the center of the image indicative of a bundle of thumbnail images arranged to the left side thereof checks the check boxes of all the other thumbnail images in that bundle, thereby acquiring the images represented by these checked thumbnail images in a batch.

If the check boxes of all the thumbnail images in a bundle are checked, rechecking the check box of a desired thumbnail image individually cancels the acquisition of the image represented by that rechecked thumbnail image.

Further, rechecking the check box at the center of the image indicative of a bundle of thumbnail images cancels the acquisition of the images represented by the thumbnail images in that bundle in a batch.

Figure 41:
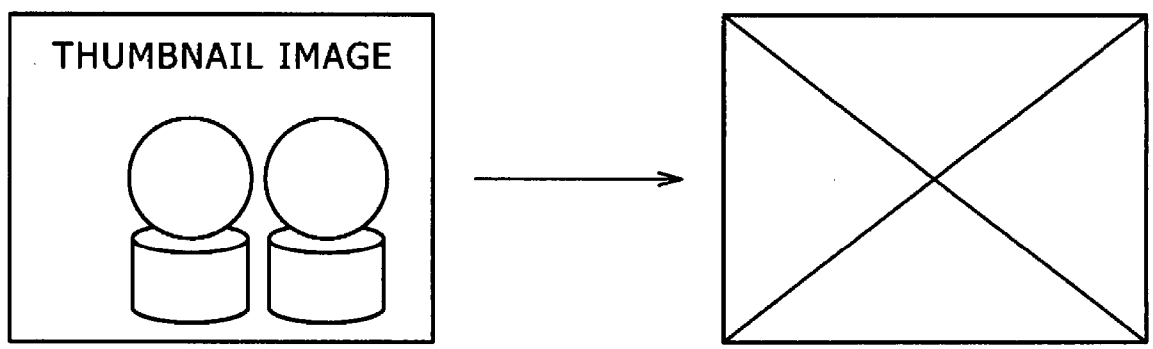
FIG. 41 is a diagram illustrating a display image indicative that publicity of an image has been canceled.

It should be noted that, if the publicizing of the image represented by any thumbnail image is canceled, the display of the thumbnail images will not be immediately updated. If the publicizing of the image represented by a thumbnail image displayed by the thumbnail image updating described with reference to the flowchart shown in FIG. 31 is canceled before the execution of the acquisition of the corresponding image, the display control section 183 updates, when the thumbnail image is selected, the thumbnail image display so as to display, instead of the thumbnail image, an image indicative of the cancellation of the publicizing of the image in step S269 shown in FIG. 41.

The above-mentioned setup allows the user of the digital camera 1-1 that is the client to know that the publicizing of the image represented by the thumbnail image has been canceled.

As described above, in the browse-time photo exchange mode, the digital cameras 1 can share images recorded to the recording media 60 loaded on any mate digital camera 1 interconnected via the network 2. This eliminates the time and labor otherwise necessary for exchanging images via a mass storage, for example.

It should be noted that, in the above-mentioned examples, various images, such as thumbnail images, are displayed on the LCD 20; however, it is also practicable to display these images on any other devices as far as they are image displayable, such as an organic EL (Electro Luminescence) display device or a LED (Light Emitting Diode) display device, for example.

In the above-mentioned examples, the network 2 takes an image of a subject and transmits the taken image; however, it is also practicable to use any other devices than the digital camera 1 as far as they can take and transmit an image of a subject, such as a digital video camera, a mobile phone, or a portable personal computer, for example.

As described above, in the above-mentioned configuration in which network communication schemes are selectable, the communication scheme of the network related with a current mode that is the single processing mode can be selected on the basis of a predetermined correlation between a single processing mode for not communicating with a mate of communication via a network, of the plurality of modes and a communication scheme of the network. The network processing mode related with a current mode that is the single processing mode can be selected on the basis of a predetermined correlation between the single processing mode of the plurality of modes and a network processing mode that is a mode for communicating with a mate of communication via the network of the plurality of modes. Communication can be controlled so as to start communication with a mate of communication via the network on the basis of the selected communication scheme of the network. It can be determined whether a mode to which a mate of communication makes a transition is a mode that is in concert with the selected network processing mode. If the mode to which the mate of communication makes a transition is found to be a mode that is in concert with the selected network processing mode, a mode transition can be controlled such that a transition is made to the selected network processing mode.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

As shown in FIG. 4, program recording media for storing programs that are installed on a computer for execution is made up of the removable media 60 that are package media made up of a magnetic disc (including a flexible disc), an optical disc (including CD-ROM (Compact Disc-Read Only Memory), a DVD (Digital Versatile Disc), and a magneto-optical disc), or a semiconductor memory, the flash ROM 83 in which programs are temporarily or permanently stored, or a hard disc drive. Storing of programs into program recording media is executed by use of wired or wireless communication media, such as the network 2, a LAN, the Internet, or digital satellite broadcasting, via the communication I/F 49 of an interface for such as a router and a modem, as necessary.

It should be noted herein that the steps for describing each program recorded in recording media include not only the processing operations which are sequentially executed in a time-dependent manner but also the processing operations which are executed concurrently or discretely.

It should also be noted that term "system" as used herein denotes an entire apparatus configured by a plurality of component units.

While preferred embodiments of the present invention have been described using specific terms, such description is for illustrative purpose, and it is to be understood that changes and variations may be made without departing from the spirit or scope of the following claims.

The invention claimed is:

1. An image-taking apparatus comprising:
    storing means for storing information pertaining to a number of predetermined correlations between a number of single processing modes and a number of communication schemes, respectively, in which the number of communication schemes include an ad hoc scheme and an infrastructure scheme, wherein each respective single processing mode defines processing of image data to be executed by the image-taking apparatus, under each single processing mode the image-taking apparatus is configured not to communicate with a mate of communication via a network, the mate of communication comprises another image-taking apparatus, each single processing mode corresponds to a network processing mode under which the image-taking apparatus operates in the corresponding single processing mode and is configured to communicate with a mate of communication via a network;
    first selection means for selecting a communication scheme, on the basis of the predetermined correlation between a single processing mode that the image-taking apparatus currently operates in and a communication scheme obtained from the storage means;
    second selection means for selecting, a network processing mode, on the basis of the single processing mode that the image-taking apparatus currently operates in;
    communication controlling means for controlling communication so as to start communication with the mate of communication via the network by the selected communication scheme;
    determination means for determining whether a mode to which the mate of communication makes a transition is a mode that is in concert with the selected network processing mode; and
    mode transition control means for controlling the image-taking apparatus to perform, if the mode to which the mate of communication makes a transition is found to be a mode that is in concert with the selected network processing mode, a mode transition to the selected network processing mode.

2. The image-taking apparatus according to claim 1, further comprising:
    image taking means for taking an image of a subject,
    wherein said second selection means selects, on the basis of a correlation between an image taking mode configured to take an image of said subject that is said single processing mode and an image taking-time photo exchange mode that is said network processing mode in which an image of said subject is taken and the taken image is transmitted to a mate of communication via said network, said image taking-time photo exchange mode related with said image taking mode that is a current mode.

3. The image-taking apparatus according to claim 1, further comprising:
    display means,
    wherein said second selection means selects, on the basis of a browse mode configured to display said taken image that is said single processing mode and a browse-time photo exchange mode that is said network processing mode in which said taken image is displayed and transmitted to a mate of communication via said network, said browse-time photo exchange mode related with said browse mode that is a current mode.

4. The image-taking apparatus according to claim 1, wherein said second selection means selects, on the basis of a correlation between a print mode that is said single processing mode in which an image is printed and a network print mode that is said network processing mode in which a mate of communication is made print an image via said network, said mate of communication is a printing device, said network print mode related with said print mode that is a current mode.

5. The image-taking apparatus according to claim 1, wherein said first selection means selects, on the basis of a predetermined correlation between said single processing mode and said network communication scheme that one of the ad hoc scheme and the infrastructure scheme, said communication scheme of said network based on one of said ad hoc scheme and said infrastructure scheme.

6. An information processing method configured to control an image-taking apparatus comprising:
    storing information in a storage means pertaining to a number of predetermined correlations between a number of single processing modes and a number of communications schemes, respectively, in which the number of communication schemes include an ad hoc scheme and an infrastructure scheme, wherein each respective single processing mode defines processing of image data to be executed by the image-taking apparatus, under each single processing mode the image-taking apparatus is configured not to communicate with a mate of communication via a network, the mate of communication comprises another image-taking apparatus, each single processing mode corresponds to a network processing mode under which the image-taking apparatus operates in the corresponding single processing mode and is configured to communicate with a mate of communication via a network;
    selecting, a communication scheme, on the basis of the predetermined correlation between a single processing mode that the image-taking apparatus currently operates in and a communication scheme obtained from the storage means;
    selecting, a network processing mode, on the basis of the single processing mode that the image-taking apparatus currently operates in;
    controlling communication so as to start communication with the mate of communication via the network by the selected communication scheme;
    determining whether a mode to which the mate of communication makes a transition is a mode that is in concert with the selected network processing mode; and
    controlling the image-taking apparatus to perform, if the mode to which the mate of communication makes a transition is found to be a mode that is in concert with the selected network processing mode, a mode transition to the selected network processing mode.

7. A non-transitory computer readable medium having stored thereon a program for controlling an image-taking apparatus comprising:

instructions for storing information pertaining to a number of predetermined correlations between a number of single processing modes and a number of communication schemes, respectively, in which the number of communication schemes include an ad hoc scheme and an infrastructure scheme, wherein each respective single processing mode defines processing of image data to be executed by the image-taking apparatus, under each single processing mode the image-taking apparatus is configured not to communicate with a mate of communication via a network, the mate of communication comprises another image-taking apparatus, each single processing mode corresponds to a network processing mode under which the image-taking apparatus operates in the corresponding single processing mode and is configured to communicate with a mate of communication via a network;

instructions for selecting, a communication scheme, on the basis of the predetermined correlation between a single processing mode that the image-taking apparatus currently operates in and a communication scheme of said network obtained from the storage means;

instructions for selecting, a network processing mode, on the basis of the single processing mode that the image-taking apparatus currently operates in;

instructions for controlling communication so as to start communication with the mate of communication via the network by the selected communication scheme;

instructions for determining whether a mode to which the mate of communication makes a transition is a mode that is in concert with the selected network processing mode; and instructions for controlling, if the mode to which the mate of communication makes a transition is found to be a mode that is in concert with the selected network processing mode, a mode transition to the selected network processing mode.

8. An image-taking apparatus comprising:

a storing section configured to store information pertaining to a number of predetermined correlations between a number of single processing modes and a number of communication schemes, wherein each respective single processing mode defines processing of image data to be executed by the image-taking apparatus, under each single processing mode the image-taking apparatus is configured not to communicate with a mate of communication via a network, the mate of communication comprises another image-taking apparatus, each single processing mode corresponds to a network processing mode under which the image-taking apparatus operates in the corresponding single processing mode and is configured to communicate with a mate of communication via a network;

a first selection section configured to select a communication scheme, on the basis of the predetermined correlation between a single processing mode that the image-taking apparatus currently operates in and a communication scheme obtained from the storage section;

a second selection section configured to select, a network processing mode, on the basis of the single processing mode that the image-taking apparatus currently operates in;

a communication controller configured to control communication so as to start communication with the mate of communication via the network by the selected communication scheme;

a determination section configured to determine whether a mode to which the mate of communication makes a transition is a mode that is in concert with the selected network processing mode; and a mode transition control section configured to control, if the mode to which the mate of communication makes a transition is found to be a mode that is in concert with the selected network processing mode, a mode transition such that a transition is made to the selected network processing mode.

* * * * *